(12) United States Patent
Kelsh et al.

(10) Patent No.: US 11,361,380 B2
(45) Date of Patent: Jun. 14, 2022

(54) ENHANCED IMAGE CAPTURE AND ANALYSIS OF DAMAGED TANGIBLE OBJECTS

(71) Applicant: Allstate Insurance Company, Northbrook, IL (US)

(72) Inventors: John P. Kelsh, Antioch, IL (US); Clint J. Marlow, Barrington Hills, IL (US); Nicole M. Hildebrandt, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 165 days.

(21) Appl. No.: 15/271,812

(22) Filed: Sep. 21, 2016

(65) Prior Publication Data
US 2018/0082378 A1    Mar. 22, 2018

(51) Int. Cl.
*G06Q 40/08* (2012.01)
*G06Q 30/02* (2012.01)
(Continued)

(52) U.S. Cl.
CPC ......... *G06Q 40/08* (2013.01); *G06Q 30/0283* (2013.01); *H04L 67/12* (2013.01); *H04N 5/23293* (2013.01); *H04W 4/90* (2018.02); *H04N 5/23222* (2013.01); *H04N 5/232935* (2018.08); *H04W 4/44* (2018.02)

(58) Field of Classification Search
CPC ............................... G06Q 40/08; G08G 1/205
See application file for complete search history.

(56) References Cited

U.S. PATENT DOCUMENTS 2,833,495 A    5/1958 Feeney et al.
4,198,864 A    4/1980 Breed
(Continued)

FOREIGN PATENT DOCUMENTS

AU    2002301438 B2    9/2006
AU    2007200869 A1    3/2007
(Continued)

OTHER PUBLICATIONS

When It Makes Sense to Skip Filing a Car Insurance Claim—TheStreet (Year: 2015).*
(Continued)

*Primary Examiner* — Christine M Behncke
*Assistant Examiner* — Mary M Gregg
(74) *Attorney, Agent, or Firm* — Foley & Lardner LLP

(57) ABSTRACT

Apparatuses, systems, and methods are provided for the usage of enhanced pictures (e.g., photos) of tangible objects (e.g., property, cars, etc.) damaged in an accident and answers to questions about the accident to better assess the effect of the damage (e.g., repair expenses and accompanying changes to an insurance policy). A pre-FNOL system may receive responses to one or more questions regarding an accident and one or more enhanced pictures of the tangible property damaged in the accident. The pre-FNOL system may use the responses to the one or more questions and the one or more enhanced pictures to determine repair costs associated with the damaged property and accompanying changes to the insurance policy if an insurance claim were to be filed to cover the determined repairs costs.

20 Claims, 13 Drawing Sheets

(51) Int. Cl.
  *H04L 67/12*    (2022.01)
  *H04W 4/90*    (2018.01)
  *H04N 5/232*   (2006.01)
  *H04W 4/44*    (2018.01)

(56) References Cited

U.S. PATENT DOCUMENTS

| | | |
|---|---|---|
| 4,716,458 A | 12/1987 | Heitzman et al. |
| 5,517,183 A | 5/1996 | Bozeman, Jr. |
| 5,521,822 A | 5/1996 | Wang |
| 5,719,554 A | 2/1998 | Gagnon |
| 5,736,970 A | 4/1998 | Bozeman, Jr. |
| 5,903,317 A * | 5/1999 | Sharir .................. G01S 3/7864 348/157 |
| 5,950,169 A | 9/1999 | Borghesi et al. |
| 5,963,128 A | 10/1999 | McClelland |
| 6,023,664 A | 2/2000 | Bennet |
| 6,060,989 A | 5/2000 | Gehlot |
| 6,061,610 A | 5/2000 | Boer |
| 6,076,028 A | 6/2000 | Donnelly et al. |
| 6,141,611 A | 10/2000 | Mackey et al. |
| 6,201,571 B1 * | 3/2001 | Ota ...................... H04N 1/2112 348/239 |
| 6,246,933 B1 | 6/2001 | Bague |
| 6,262,657 B1 | 7/2001 | Okuda et al. |
| 6,266,617 B1 | 7/2001 | Evans |
| 6,295,492 B1 | 9/2001 | Lang et al. |
| 6,330,499 B1 | 12/2001 | Chou et al. |
| 6,405,112 B1 | 6/2002 | Rayner |
| 6,438,475 B1 | 8/2002 | Gioutsos et al. |
| 6,472,982 B2 | 10/2002 | Eida et al. |
| 6,509,868 B2 | 1/2003 | Flick |
| 6,539,249 B1 | 3/2003 | Kadhiresan et al. |
| 6,553,308 B1 | 4/2003 | Uhlmann et al. |
| 6,573,831 B2 | 6/2003 | Ikeda et al. |
| 6,594,579 B1 | 7/2003 | Lowrey et al. |
| 6,611,740 B2 | 8/2003 | Lowrey et al. |
| 6,641,038 B2 | 11/2003 | Gehlot et al. |
| 6,642,844 B2 | 11/2003 | Montague |
| 6,701,234 B1 | 3/2004 | Vogelsang |
| 6,732,020 B2 | 5/2004 | Yamagishi |
| 6,732,031 B1 | 5/2004 | Lightner et al. |
| 6,741,168 B2 | 5/2004 | Webb et al. |
| 6,756,887 B2 | 6/2004 | Evans |
| 6,765,499 B2 | 7/2004 | Flick |
| 6,798,356 B2 | 9/2004 | Flick |
| 6,909,947 B2 | 6/2005 | Douros et al. |
| 6,925,425 B2 | 8/2005 | Remboski et al. |
| 6,946,966 B2 | 9/2005 | Koenig |
| 6,982,654 B2 | 1/2006 | Rau et al. |
| 6,988,033 B1 | 1/2006 | Lowrey et al. |
| 7,069,118 B2 | 6/2006 | Coletrane et al. |
| 7,082,359 B2 | 7/2006 | Breed |
| 7,092,803 B2 | 8/2006 | Kapolka et al. |
| 7,099,835 B2 | 8/2006 | Williams, III |
| 7,113,127 B1 | 9/2006 | Banet et al. |
| 7,119,669 B2 | 10/2006 | Lundsgaard et al. |
| 7,129,826 B2 | 10/2006 | Nitz et al. |
| 7,133,661 B2 | 11/2006 | Hatae et al. |
| 7,135,993 B2 | 11/2006 | Okamoto et al. |
| 7,155,259 B2 | 12/2006 | Bauchot et al. |
| 7,155,321 B2 | 12/2006 | Bromley et al. |
| 7,158,016 B2 | 1/2007 | Cuddihy et al. |
| 7,174,243 B1 | 2/2007 | Lightner et al. |
| 7,271,716 B2 | 9/2007 | Nou |
| 7,305,293 B2 | 12/2007 | Flick |
| 7,323,972 B2 | 1/2008 | Nobusawa |
| 7,323,973 B1 | 1/2008 | Ceglia et al. |
| 7,348,895 B2 | 3/2008 | Lagassey |
| 7,418,400 B1 | 8/2008 | Lorenz |
| 7,477,968 B1 | 1/2009 | Lowrey et al. |
| 7,504,965 B1 * | 3/2009 | Windover ............ G08G 1/0175 340/933 |
| 7,508,298 B2 | 3/2009 | Pisz et al. |
| 7,565,230 B2 | 7/2009 | Gardner et al. |
| 7,600,426 B2 | 10/2009 | Savolainen et al. |
| 7,624,031 B2 | 11/2009 | Simpson et al. |
| 7,650,235 B2 | 1/2010 | Lee et al. |
| 7,671,727 B2 | 3/2010 | Flick |
| 7,715,961 B1 | 5/2010 | Kargupta |
| 7,747,365 B1 | 6/2010 | Lowrey et al. |
| 7,872,636 B1 | 1/2011 | Gopi et al. |
| 7,908,921 B2 | 3/2011 | Binda et al. |
| 8,000,979 B2 | 8/2011 | Blom |
| 8,014,789 B2 | 9/2011 | Breed |
| 8,019,629 B1 | 9/2011 | Medina, III et al. |
| 8,022,845 B2 | 9/2011 | Zlojutro |
| 8,041,635 B1 | 10/2011 | Garcia et al. |
| 8,069,060 B2 | 11/2011 | Tipirneni |
| 8,090,598 B2 | 1/2012 | Bauer et al. |
| 8,140,358 B1 | 3/2012 | Ling et al. |
| 8,214,100 B2 | 7/2012 | Lowrey et al. |
| 8,229,759 B2 | 7/2012 | Zhu et al. |
| 8,255,275 B2 | 8/2012 | Collopy et al. |
| 8,260,639 B1 | 9/2012 | Medina, III et al. |
| 8,271,187 B2 | 9/2012 | Taylor et al. |
| 8,285,588 B2 | 10/2012 | Postrel |
| 8,311,858 B2 | 11/2012 | Everett et al. |
| 8,321,086 B2 | 11/2012 | Park et al. |
| 8,330,593 B2 | 12/2012 | Golenski |
| 8,370,254 B1 | 2/2013 | Hopkins, III et al. |
| 8,401,877 B2 | 3/2013 | Salvagio |
| 8,403,225 B2 | 3/2013 | Sharra et al. |
| 8,417,604 B2 | 4/2013 | Orr et al. |
| 8,423,239 B2 | 4/2013 | Blumer et al. |
| 8,432,262 B2 | 4/2013 | Talty et al. |
| 8,433,590 B2 | 4/2013 | Prescott |
| 8,438,049 B2 | 5/2013 | Ranicar, III et al. |
| 8,442,508 B2 | 5/2013 | Harter et al. |
| 8,442,797 B2 | 5/2013 | Kim et al. |
| 8,447,459 B2 | 5/2013 | Lowrey et al. |
| 8,452,486 B2 | 5/2013 | Banet et al. |
| 8,463,488 B1 | 6/2013 | Hart |
| 8,466,781 B2 | 6/2013 | Miller et al. |
| 8,478,514 B2 | 7/2013 | Kargupta |
| 8,484,113 B2 | 7/2013 | Collopy et al. |
| 8,494,938 B1 | 7/2013 | Kazenas |
| 8,510,133 B2 | 8/2013 | Peak et al. |
| 8,510,200 B2 | 8/2013 | Pearlman et al. |
| 8,527,135 B2 | 9/2013 | Lowrey et al. |
| 8,571,895 B1 | 10/2013 | Medina, III et al. |
| 8,577,703 B2 | 11/2013 | McClellan et al. |
| 8,581,712 B2 | 11/2013 | Morgan et al. |
| 8,589,015 B2 | 11/2013 | Willis et al. |
| 8,595,034 B2 | 11/2013 | Bauer et al. |
| 8,598,977 B2 | 12/2013 | Maalouf et al. |
| 8,620,692 B2 | 12/2013 | Collopy et al. |
| 8,630,768 B2 | 1/2014 | McClellan et al. |
| 8,633,985 B2 | 1/2014 | Haynes et al. |
| 8,635,091 B2 | 1/2014 | Amigo et al. |
| 8,688,380 B2 | 4/2014 | Cawse et al. |
| 8,712,893 B1 | 4/2014 | Brandmaier et al. |
| 8,751,270 B1 | 6/2014 | Hanson et al. |
| 8,799,034 B1 | 8/2014 | Brandmaier et al. |
| 8,930,581 B2 | 1/2015 | Anton et al. |
| 9,002,719 B2 | 4/2015 | Tofte |
| 9,165,325 B2 | 10/2015 | Chakravarty et al. |
| 9,324,201 B2 | 4/2016 | Jun |
| 9,361,735 B1 | 6/2016 | Leise |
| 9,659,331 B1 * | 5/2017 | Hanson .................. G06Q 40/08 |
| 9,672,719 B1 * | 6/2017 | Hollenstain ............ G08B 21/18 |
| 9,691,189 B1 * | 6/2017 | Creath .................... G07C 1/00 |
| 9,767,625 B1 | 9/2017 | Snyder et al. |
| 10,147,210 B1 * | 12/2018 | Desai ................. G06K 9/00228 |
| 10,430,885 B1 * | 10/2019 | Brandmaier ........... G06Q 40/08 |
| 10,580,075 B1 | 3/2020 | Brandmaier et al. |
| 10,657,647 B1 | 5/2020 | Chen et al. |
| 10,783,585 B1 * | 9/2020 | Banerjee ................ G06Q 40/08 |
| 2002/0003571 A1 | 1/2002 | Schofield et al. |
| 2002/0007289 A1 | 1/2002 | Malin et al. |
| 2002/0049535 A1 | 4/2002 | Rigo et al. |
| 2002/0055861 A1 | 5/2002 | King et al. |
| 2002/0103622 A1 | 8/2002 | Burge |
| 2002/0111725 A1 | 8/2002 | Burge |

(56) References Cited

U.S. PATENT DOCUMENTS

| | | |
|---|---|---|
| 2002/0161697 A1 | 10/2002 | Stephens et al. |
| 2003/0005765 A1 | 1/2003 | Brudis et al. |
| 2003/0076417 A1* | 4/2003 | Thomas ............... G07B 15/063 |
| | | 348/169 |
| 2003/0233261 A1 | 12/2003 | Kawahara et al. |
| 2004/0000992 A1 | 1/2004 | Cuddihy et al. |
| 2004/0068350 A1 | 4/2004 | Tomson |
| 2004/0083123 A1 | 4/2004 | Kim et al. |
| 2004/0088090 A1 | 5/2004 | Wee |
| 2004/0128065 A1 | 7/2004 | Taylor et al. |
| 2004/0145457 A1 | 7/2004 | Schofield et al. |
| 2004/0186744 A1 | 9/2004 | Lux |
| 2004/0189493 A1 | 9/2004 | Estus et al. |
| 2004/0189722 A1 | 9/2004 | Acres |
| 2004/0205622 A1 | 10/2004 | Jones et al. |
| 2005/0021374 A1 | 1/2005 | Allahyari |
| 2005/0104745 A1 | 5/2005 | Bachelder et al. |
| 2005/0119826 A1 | 6/2005 | Lee et al. |
| 2005/0161505 A1 | 7/2005 | Yin et al. |
| 2005/0216487 A1 | 9/2005 | Fisher et al. |
| 2005/0278082 A1 | 12/2005 | Weekes |
| 2006/0025897 A1 | 2/2006 | Shostak et al. |
| 2006/0055583 A1 | 3/2006 | Orr et al. |
| 2006/0067573 A1 | 3/2006 | Parr et al. |
| 2006/0192783 A1 | 8/2006 | Kass et al. |
| 2006/0224305 A1 | 10/2006 | Ansari et al. |
| 2006/0226960 A1 | 10/2006 | Pisz et al. |
| 2006/0282202 A1 | 12/2006 | Cashler et al. |
| 2007/0009136 A1 | 1/2007 | Pawlenko et al. |
| 2007/0027583 A1 | 2/2007 | Tamir et al. |
| 2007/0037610 A1 | 2/2007 | Logan |
| 2007/0043594 A1 | 2/2007 | Lavergne |
| 2007/0136162 A1 | 6/2007 | Thibodeau et al. |
| 2007/0162308 A1 | 7/2007 | Peters |
| 2007/0238954 A1* | 10/2007 | White ................... A61B 8/481 |
| | | 600/407 |
| 2007/0288268 A1 | 12/2007 | Weeks |
| 2008/0027761 A1 | 1/2008 | Bracha |
| 2008/0052134 A1 | 2/2008 | Nowak et al. |
| 2008/0078253 A1 | 4/2008 | Blackwood et al. |
| 2008/0215375 A1 | 9/2008 | Nakano et al. |
| 2008/0225118 A1* | 9/2008 | Suzuki ................. B60R 25/302 |
| | | 348/148 |
| 2008/0242261 A1 | 10/2008 | Shimanuki et al. |
| 2008/0255722 A1 | 10/2008 | McClellan et al. |
| 2008/0294690 A1 | 11/2008 | McClellan et al. |
| 2008/0300731 A1 | 12/2008 | Nakajima et al. |
| 2008/0306636 A1 | 12/2008 | Caspe-Detzer et al. |
| 2008/0306996 A1 | 12/2008 | McClellan et al. |
| 2008/0319665 A1 | 12/2008 | Berkobin et al. |
| 2009/0013755 A1 | 1/2009 | Tsai et al. |
| 2009/0036091 A1 | 2/2009 | Ball et al. |
| 2009/0063174 A1 | 3/2009 | Fricke |
| 2009/0099732 A1 | 4/2009 | Pisz |
| 2009/0106052 A1 | 4/2009 | Moldovan |
| 2009/0125180 A1 | 5/2009 | Berkobin et al. |
| 2009/0164504 A1 | 6/2009 | Flake et al. |
| 2009/0192688 A1 | 7/2009 | Padmanabhan et al. |
| 2009/0198772 A1 | 8/2009 | Kim et al. |
| 2009/0234678 A1 | 9/2009 | Arenas |
| 2009/0248283 A1 | 10/2009 | Bicego, Jr. |
| 2009/0254241 A1 | 10/2009 | Basir |
| 2009/0265385 A1 | 10/2009 | Beland et al. |
| 2010/0020170 A1 | 1/2010 | Higgins-Luthman et al. |
| 2010/0030540 A1 | 2/2010 | Choi et al. |
| 2010/0036595 A1 | 2/2010 | Coy et al. |
| 2010/0049552 A1 | 2/2010 | Fini et al. |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 | 7/2010 | Stender et al. |
| 2010/0205012 A1 | 8/2010 | McClellan |
| 2010/0219944 A1 | 9/2010 | McCormick et al. |
| 2010/0250369 A1 | 9/2010 | Peterson et al. |
| 2010/0323657 A1 | 12/2010 | Barnard et al. |
| 2011/0012720 A1 | 1/2011 | Hirschfeld |
| 2011/0060496 A1 | 3/2011 | Nielsen et al. |
| 2011/0070834 A1 | 3/2011 | Griffin et al. |
| 2011/0070864 A1 | 3/2011 | Karam et al. |
| 2011/0077028 A1 | 3/2011 | Wilkes, III et al. |
| 2011/0106449 A1 | 5/2011 | Chowdhary et al. |
| 2011/0118934 A1 | 5/2011 | Lowrey et al. |
| 2011/0153367 A1 | 6/2011 | Amigo et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0161119 A1 | 6/2011 | Collins |
| 2011/0185178 A1 | 7/2011 | Gotthardt |
| 2011/0281564 A1 | 11/2011 | Armitage et al. |
| 2011/0285874 A1 | 11/2011 | Showering et al. |
| 2011/0307119 A1 | 12/2011 | Basir et al. |
| 2011/0307188 A1 | 12/2011 | Peng et al. |
| 2011/0311130 A1* | 12/2011 | Ichimori ................. G06T 7/593 |
| | | 382/154 |
| 2012/0021386 A1* | 1/2012 | Anderson .............. G09B 9/042 |
| | | 434/66 |
| 2012/0028680 A1 | 2/2012 | Breed |
| 2012/0047203 A1 | 2/2012 | Brown et al. |
| 2012/0069051 A1 | 3/2012 | Hagbi et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1 | 5/2012 | McQuade et al. |
| 2012/0150412 A1 | 6/2012 | Yoon et al. |
| 2012/0191476 A1 | 7/2012 | Reid et al. |
| 2012/0192235 A1 | 7/2012 | Tapley et al. |
| 2012/0197486 A1 | 8/2012 | Elliott |
| 2012/0197669 A1 | 8/2012 | Kote et al. |
| 2012/0202551 A1 | 8/2012 | Mirbaha et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0069802 A1 | 3/2013 | Foghel et al. |
| 2013/0073318 A1 | 3/2013 | Feldman et al. |
| 2013/0073321 A1 | 3/2013 | Hofmann et al. |
| 2013/0090881 A1 | 4/2013 | Janardhanan et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197856 A1 | 8/2013 | Barfield et al. |
| 2013/0197945 A1 | 8/2013 | Anderson |
| 2013/0204645 A1* | 8/2013 | Lehman ................. G06Q 40/08 |
| | | 705/4 |
| 2013/0211660 A1 | 8/2013 | Mitchell |
| 2013/0226369 A1 | 8/2013 | Yorio et al. |
| 2013/0226397 A1 | 8/2013 | Kuphal et al. |
| 2013/0289819 A1 | 10/2013 | Hassib et al. |
| 2013/0290036 A1 | 10/2013 | Strange |
| 2013/0297097 A1 | 11/2013 | Fischer et al. |
| 2013/0297353 A1* | 11/2013 | Strange ................. G06Q 40/08 |
| | | 705/4 |

(56) References Cited

U.S. PATENT DOCUMENTS

| | | | |
|---|---|---|---|
| 2013/0297418 | A1 | 11/2013 | Collopy et al. |
| 2013/0300552 | A1 | 11/2013 | Chang |
| 2013/0311209 | A1 | 11/2013 | Kaminski et al. |
| 2013/0316310 | A1 | 11/2013 | Musicant et al. |
| 2013/0317860 | A1 | 11/2013 | Schumann, Jr. |
| 2013/0317865 | A1 | 11/2013 | Tofte et al. |
| 2013/0332026 | A1 | 12/2013 | McKown et al. |
| 2013/0336523 | A1 | 12/2013 | Ruan |
| 2013/0339062 | A1 | 12/2013 | Brewer et al. |
| 2014/0067429 | A1 | 3/2014 | Lowell |
| 2014/0081675 | A1 | 3/2014 | Ives et al. |
| 2014/0114691 | A1* | 4/2014 | Pearce ............... G06Q 40/08 705/4 |
| 2014/0121878 | A1 | 5/2014 | Pandhi et al. |
| 2014/0122012 | A1 | 5/2014 | Barfield |
| 2014/0132404 | A1 | 5/2014 | Katoh et al. |
| 2014/0195070 | A1 | 7/2014 | Shimizu et al. |
| 2014/0244312 | A1 | 8/2014 | Gray et al. |
| 2014/0244678 | A1 | 8/2014 | Zamer et al. |
| 2014/0277916 | A1* | 9/2014 | Mullen ............... G06Q 40/08 701/31.4 |
| 2014/0300739 | A1 | 10/2014 | Mimar |
| 2014/0313334 | A1* | 10/2014 | Slotky ............. H04N 5/23222 348/148 |
| 2014/0316825 | A1 | 10/2014 | van Dijk et al. |
| 2014/0344050 | A1 | 11/2014 | McKinley et al. |
| 2014/0368602 | A1 | 12/2014 | Woodgate et al. |
| 2015/0006023 | A1 | 1/2015 | Fuchs |
| 2015/0019267 | A1 | 1/2015 | Prieto et al. |
| 2015/0073834 | A1 | 3/2015 | Gurenko et al. |
| 2015/0088550 | A1 | 3/2015 | Bowers et al. |
| 2015/0106133 | A1* | 4/2015 | Smith, Jr. ............. G06Q 40/08 705/4 |
| 2015/0149218 | A1 | 5/2015 | Bayley et al. |
| 2015/0269791 | A1 | 9/2015 | Amigo et al. |
| 2015/0307048 | A1* | 10/2015 | Santora ............... G08G 1/205 348/148 |
| 2015/0324924 | A1 | 11/2015 | Wilson et al. |
| 2016/0094964 | A1 | 3/2016 | Barfield, Jr. et al. |
| 2016/0203703 | A1* | 7/2016 | Graeve ............... G08B 25/10 455/404.1 |
| 2016/0255282 | A1* | 9/2016 | Bostick ............ H04N 5/23238 348/39 |
| 2017/0089710 | A1* | 3/2017 | Slusar ................ G06T 15/205 |
| 2017/0293894 | A1* | 10/2017 | Taliwal ............... G06T 7/0004 |
| 2018/0033220 | A1 | 2/2018 | Pal et al. |

FOREIGN PATENT DOCUMENTS

| | | |
|---|---|---|
| CA | 2658219 A1 | 1/2008 |
| CN | 203025907 U | 6/2013 |
| CN | 103390326 A | 11/2013 |
| EP | 1488198 A2 | 12/2004 |
| EP | 1826734 A1 | 8/2007 |
| EP | 1965361 A2 | 9/2008 |
| EP | 2147320 A1 | 1/2010 |
| EP | 2481037 A1 | 8/2012 |
| GB | 2486384 A | 6/2012 |
| GB | 2488956 A | 9/2012 |
| KR | 2005112932 | 5/2004 |
| WO | 1998047109 A1 | 10/1998 |
| WO | 2002079934 A2 | 10/2002 |
| WO | WO-2006074682 A2 * | 7/2006 ........... G06Q 10/087 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |

OTHER PUBLICATIONS

When to make a car insurance claim by Bankrate company (Year: 2014).*
"Jaguar Land Rover Files United States Patent Application for Computing Apparatus and Method" by New Delhi (Year: 2015).*
Released—GReddy iPhone and iPod App, Jun. 28, 2010, The Octane Report [On-line], Retrieved from the Internet: http://www.octanereport.com.
"Automatic Crash Response, Car Safety, & Emergency Services—OnStar" OnStar, retrieved from <http://www.onstar.onstar.com/web/portal/emergencyexplore?tab=1&g=1> on Jan. 12, 2013.
Barometer-Aided Road Grade Estimation, Jussi Parviainen et al., Tampere University of Technology, Finland; 2009.
Charles Petzold, Accelerometer and Location Service in Windows Phone 7, Nov. 23, 2010 [On-line], Retrieved from the internet: http://www.c-sharpcorner.com/UploadFile/8c85cf/4363/.
"Encrypted QR Codes." qrworld. Nov. 27, 2011. Retrieved from http://qrworld.wordpress.com/2011/11/27/encrypted-qr-codes on Nov. 12, 2013.
Dash3 Instruction Manual, 2010, Race Technology Limited [On-line], Retrieved from the Internet: http://www.race-technology.com.
Dash4 Pro, 2011, Race Technology Ltd. [On-line], Retrieved from the Internet: http://www.race-technology.com/dash4_pro_2_31014.html.
AX22 Performance Computer, Race Technology Ltd. [On-line], Retrieved from the Internet: http://www.race-technology.com.
"Providing Accident Detection in Vehicular Networks through OBD-II Devices and Android-based Smart Phones." M. Narsing Rao et al., International Journal of Science and Research (ISSN: 2319-7064), vol. 2(9), Sep. 2013.
Fleet Management Features, 2011, RedTail Telematics [On-line], Retrieved from the Internet: http://www.redtailtelematics.com/fleet-management/features/.
"Near Field Communication: A Simple Exchange of Information." Samsung. Mar. 5, 2013. Retrieved from http://www.samsung.com/us/article/near-field-communication-a-simple-exchange-of-information on May 21, 2013.
"License Plate Scanner Obsoletes Meter Maid." Bertel Schmitt, The Truth About Cars. Feb. 1, 2011. Retrieved from http://www.thetruthaboutcars.com/2011/02/license-plate-scanner-obsoletes-meter-maid on Jun. 28, 2013.
"Car insurance firms revving up mobile app features." Mark Chalon Smith, Insurance.com, Feb. 6, 2012. Retrieved from http://www.insurance.com/auto-insurance/auto-insurance-basics/car-insurance-mobile-apps.html on Jun. 28, 2013.
"Snooper UK Store—Buy Direct from the Manufacturer." Snooper, retrieved from <http://snooper.uk/products/snooper-lynx-app/index.html> on Apr. 15, 2015.
Spevacek, C. E., Ledwith, J. F., Newman, T. R., & Lennes, John B.,Jr. (2001). Additional insured and indemnification issues affecting the insurance industry, coverage counsel, and defense counsel—legal advice and practice pointers. FDCC Quarterly, 52(1), 3-101. Retrieved from <http://search.proquest.com/docview/201215466?accountid=14753>.
"Vehicle Wrap Trends: What are QR Codes and why do I need one?" Sunrise Signs. Retrieved from http://www.sunrisesigns.com/our-blog/bid/34661/Vehicle-Wrap-Trends-What-are-QR-Codes-and-why-do-I-need-one on May 21, 2013.
"Using Smartphones to Detect Car Accidents and Provide Situational Awareness to First Responders." Christopher Thompson, Institute for Software Integrated Systems, Vanderbilt University; presented at the Third International ICST Conference on Mobile Wireless MiddleWARE, Operating Systems, and Applications; retrieved Dec. 22, 2014.
"Using Smartphones and Wireless Mobile Sensor Networks to Detect Car Accidents and Provide Situational Awareness to Emergency Responders." Christopher Thompson et al., Vanderbilt University; retrieved Dec. 22, 2014.
Verma, M., R. Lange, and D. McGarry. "A Study of US Crash Statistics from Automated Notification Data." In 20th international technical conference on the enhanced safety of vehicles conference (ESV). Lyon, France, pp. 18-21. 2007.

(56) References Cited

OTHER PUBLICATIONS

Insurance, 2011, Webtech Wireless [On-line], Retrieved from the Internet: http://www.wtwmail.com/en/industry_solutions/insurance/.
"Top 10 Technology Trends Impacting Life and PC Insurers in 2013." Juergen Weiss et al., Gartner. Mar. 27, 2013.
"WreckWatch: Automatic Traffic Accident Detection and Notification with Smartphones." J. White et al., Journal of Mobile Networks and Applications manuscript, retrieved Apr. 15, 2015.
"Insurance Tech Trends 2013: Elements of postdigital." Mark White et al., Deloitte Development LLC. 2013.
"Bump (application)." Wikipedia. Retrieved from http://en.wikipedia.org/wiki/Bump_(application) on Aug. 29, 2013.
CS-525H: Immersive Human-Computer Interaction, Oct. 25, 2010, Department of Computer Science, Worcester Polytechnic Institute.
GForce, 2011 [On-line], Retrieved from the Internet: http://gadgitech.com/uk/IPhone/Applications/GForce.html.
GMeter, 2008 [On-line], Retrieved from the Internet: http://hunter.pairsite.com/gmeter/.
IHUD an Aerospace inspired spatial motion visualization on the iPhone 3G and 3GS, and iPad [On-line], [retrieved on Apr. 14, 2011], Retrieved from the Internet: http://www.i-hud.com/.
K.A.T. Matrix 3-Axis Accelerometer (Car Performance Meter), 2011 [On-line], Retrieved from the Internet: http://www.amazon.com.
Race Technology Knowledge Base, 2008 [On-line], Retrieved from the Internet: http://www.race-technology.com/wiki/index.php/AnalysisTools.
Sep. 16, 2016—U.S. Non-Final Office Action—U.S. Appl. No. 14/685,067.
Feb. 2, 2017—U.S. Final Office Action—U.S. Appl. No. 14/685,067.
Mar. 10, 2017—U.S. Notice of Allowance—U.S. Appl. No. 15/339,966.
Jun. 6, 2017—U.S. Notice of Allowance—U.S. Appl. No. 14/685,067.
Dec. 1, 2017—U.S. Notice of Allowance—U.S. Appl. No. 15/665,710.
Nov. 30, 2017—(WO) International Search Report—PCT/US17/52199.
Vehicle productivity, security & safety, 2010, Acadian Companies [On-line], Retrieved from the Internet: http://www.acadian.com/site598.php.
Bubble Level, 2010, Apple Inc. [On-line], Retrieved from the Internet: http://developer.apple.com/library/ios/samplecode/BubbleLevel/Listings/ReadMe_txt.html.
"Information-Sharing in Out-of-Hospital Disaster Response: The Future Role of Information Technology." Jeffrey L. Arnold et al., Abstracts of Prehospital and Disaster Medicine. Retrieved from http://journals.cambridge.org/action/displayAbstract?fromPage=online&aid=8231246 on May 20, 2013.
"Automated Collision Notification (ACN) Field Operational Test (FOT) Evaluation Report." L.R. Bachman et al., NHTSA. Feb. 2001.
Vehicle Performance Computer Owner's Manual, 2011. Beltronics [On-line], Retrieved from the Internet: http://www.beltronics.com.
"Scan Someone's License Plate and Message Them Instantly with New Bump App." Rebecca Boyle, Popular Science, Sep. 17, 2010. Retrieved from http://www.popsci.com/cars/article/2010-09/social-networking-site-uses-license-plates-connect-drivers on Jun. 28, 2013.
DynoStorm, 2009, BunsenTech, LLC [On-line], Retrieved from the Internet: http://www.bunsentech.com/projects/dynostorm/.
"License plate readers allow police to quickly scan, check for offenders." Ann Marie Bush, The Capital-Journal, Mar. 17, 2013, Retrieved from http://cjonline.com/news/2013-03-17/license-plate-readers-allow-police-quickly-scan-check-offenders on Jun. 28, 2013.
Solution: Fleet Performance, 2009, Cadec Global Inc. [On-line], Retrieved from the Internet: http://www.cadec.com/solutions/executiveDashboards.php.
"Trends 2013—North American Insurance eBusiness and Channel Strategy." Ellen Carney, Forrester. May 16, 2013.
"SmoothDrive app", CelluDrive Ltd., May 11, 2011, <http://www.celludrive.com/ptasite/home.htm>.
"Automatic Crash Notification." ComCARE Alliance. Retrieved from <http://www.nhtsa.gov/DOT/NHTSA/NRD/Articles/ERD/PDF/Research/COMCARE_ACN_System.pdf> on Nov. 12, 2013.
"Course Notebook." Jeremy S. Daily, ME 4024: Machine Dynamics, University of Tulsa; Spring 2013.
Rev User Manual, Nov. 9, 2009, DevToaster, LLC [On-line], Retrieved from the Internet: http://www.devtoaster.com.
"The Automated Collision Notification System." Bruce R. Donnelly et al., NHTSA. Retrieved from <http://nhtsa.gov/DOT/NHTSA/NRD/Articles/EDR/PDF/Research/Automated_Collision_Notification_System_PDF> on Nov. 12, 2013.
DragTimes.com Density Altitude, DragTimes, Sep. 1, 2013 <https://play.google.com/store/apps/details?id=com.DragTimes&feature=search_result>.
"The driving quality app: Product Description." DriSMo, retrieved from <http://hovedprosjekter.hig.no/v2011/imt/in/drismo/index.php?option=com_content&view=article&id=5<emid=3> on Apr. 15, 2015.
"Fraunhofer offers secure NFC keys that can be shared via QR codes." Karl Dryer, NFC World. Mar. 20, 2013. Retrieved from http://www.nfcworld.com/2013/03/20/323184/fraunhofer-offers-secure-nfc-keys-that-can-be-shared-via-qr-codes on Nov. 13, 2013.
Carl Duzen, et al., Using an Accelerometer to Classify Motion, CAPE inc, 2001.
Everywhere Navigation: Integrated Solutions on Consumer Mobile Devices, Naser El-Sheimy et al., Inside GNSS, pp. 74-82, Oct. 2011.
"This App Turns Smartphones Into Safe Driving Tools." Kate Freeman, Mashable. Aug. 30, 2012. Retrieved from <http://mashable.com/2012/08/30/drivescribe-app-safe-driving> on Nov. 12, 2013.
"Automated Collision Notification (ACN) Field Operational Test—Final Report (FOT)." D. Funke et al., NHTSA. Oct. 31, 2000.
"Geico App—Android Apps on Google Play." Geico. Retrieved from <http://play.google.com/store/apps/details?id=com.geico.mobile&hl=en> Nov. 12, 2013.
Your Resource Highway to driver Safety, 2011, GeoPoint Partners, LLC [On-line], Retrieved from the Internet: http://www.geopointpartners.com/.
"Automatic License Plate Recognition (ALPR) Scanning Systems." Experienced Criminal Lawyers, Get Lawyer Leads, Inc., Retrieved from http://www.experiencedcriminallawyers.com/articles/automatic-license-plate-recognition-alpr-scanning-systems on Jun. 28, 2013.
Giuseppe Ghiani, et al., Multimodal PDA Interfaces to Assist Drivers in Monitoring Their Vehicles, ISTI-CNR.
"Safe Driving and Accidental Monitoring Using GPS System and Three Axis Accelerometer." R. Goregaonkar et al., International Journal of Emerging Technology and Advanced Engineering, vol. 3(11), Nov. 2013.
"New Technology Security Risks : QR codes and Near Field Communication." Charlotte Gray. Retrieved from http://www.qwiktag.com/index.php/knowledge-base/150-technology-security-risks-qr-codes on Nov. 13, 2013.
"G-tac." Liberty for One, retrieved from <http://apps.libertyforone.com/g-tac/> on Jun. 17, 2015.
Technical Plan, Harker Innovation Team [On-line], Retrieved from the Internet: http://fuelourfuturenow.discoveryeducation.com/pdfs/dash-plus/Harker_Plan.pdf.
Allen Hong, The Linear-Logic ScanGauge II Review, Jun. 10, 2007.
Car Accelerometer details, 2011, Hurtado Apps—iPhone/iPod applications [On-line], Retrieved from the Internet: http://apps.hurtado.cl/car/car-details.
"Fall Detection with Three-Axis Accelerometer and Magnetometer in a Smartphone." Soo-Young Hwang et al., National University, Korea, retrieved on Apr. 15, 2015.
"QR Code." IDL Services. Retrieved from http://www.internationaler-fuehrerschein.com/en/the-idd/qr-code-quick-response-code-feature-in-the-idd.html on May 21, 2013.
"Speed-Breaker Early Warning System." Mohit Jain et al., retrieved on Apr. 15, 2015.
"Design and implementation of a smart card based healthcare information system." Geylani Kardas et al., Computer Methods and Programs in Biomedicine 81. pp. 66-78. Sep. 27, 2003.

(56) References Cited

OTHER PUBLICATIONS

"Design and Development of a GSM Based Vehicle Theft Control System and Accident Detection by Wireless Sensor Network." V.B.Gopala Krishna et al., International Journal of Emerging Trends in Engineering and Development, Issue 2, vol. 5, pp. 529-540. Jul. 2012.

"The Potential for Automatic Crash Notification Systems to Reduce Road Fatalities." Julie A. Lahausse et al., Annals of Advances in Automotive Medicine, vol. 52, pp. 85-92. 2008. (retrieved from http://www.ncbi.nlm.nih.gov/pmc/articles/PMC3256762/ on Jan. 12, 2013).

"Portable Automatic Conjecturing and Announcing System for Real-Time Accident Detection." C.F. Lai et al., International Journal on Smart Sensing and Intelligent Systems, vol. 2(9), Jun. 2009.

"Privacy Policy." Lemon Wallet. Retrieved from http://lemon.com/privacy on May 20, 2013.

Vitalijs Lennojs, aGile Dashboard, Dec. 19, 2008 [On-line], Retrieved from the Internet: http://iphoneapplicationlist.com/app/id300133977/.

What Can You Do With a Barometer, Joe Levi, Pocketnow, Oct. 19, 2011, <http://pocketnow.com/android/what-can-you-do-with-a-barometer-on-a-smartphone>.

Maciag, A. K. (1980). Motor accident insurance and systems of compensation. (Order No. MK49023, University of Alberta (Canada)). ProQuest Dissertations and Theses, 1. Retrieved from <http://search.proquest.com/docview/303097892?accountid=14753>. (303097892).

"New Idea: QR Codes for License Plates." Andrew Maxwell, Heka Interactive. Feb. 11, 2011. Retrieved from http://www.andrewcmaxwell.com/2011/02/new-idea-qr-codes-for-license-plates on May 21, 2013.

Glossary III: Rise of the Smartphonesa, Scott McCormick, May 12, 2011 <http://floatlearning.com/2011/05/glossary-iii-rise-of-the-smartphones/>.

"Mercedes-Benz mbrace™." Mercedes-Benz, Oct. 22, 2010.

"Microsoft Tag Implementation Guide: Practical requirements and recommendations to ensure successful Tag production." Microsoft Tag. Aug. 2010.

"Nericell: Rich Monitoring of Road and Traffic Conditions using Mobile Smartphones." Prashanth Mohan et al., Microsoft Research India, Bangalore, ACM, 2008.

"For insurance companies, the day of digital reckoning." Henrik Naujoks et al., Bain & Company. 2013.

Doug Newcomb, Cool iPhone Car Applications, Nov. 20, 2008 [On-line], Retrieved from the Internet: http://edmunds.com.

"Introducing the Octagon Insurance Claims App," retrieved Jun. 3, 2016 from http://www.octagoninsurance.com/insurance-claim/octagon-insurance-mobile-claims-app., 3 pages.

"Insurance Claim Manager App," retrieved Jun. 3, 2016, from https://www.snappii.com/resource-center/snappii-insurance-claims-manager-app/, 4 pages.

"Liberty Mutual Mobile App: Connecting you to Liberty Mutual on the go," retrieved Jun. 3, 2016 from https://www.libertymutual.com/liberty-mutual-mobile/mobile-app, 4 pages.

"Vehicle Damage Claims," retrieved from Jun. 3, 2016 from https://www.statefarm.com/claims/resources/auto/vehicle-damage, 2 pages.

"Taking Advantage of the Pre-Claim Assistance Provision in your Professional Liability Policy," retrieved Jun. 3, 2016 from http://www.sugarmanlaw.com/News-Articles/ID/33/Taking-Advantage-of-the-Pre-Claim-Assistance-Provision_in_your-Professional_Liability_Policy, 2 pages.

"Financial Rights Legal Centre: Making a Claim on Your Car Insurance," retrieved from www.financialrights.org.au, 8 pages.

"When to File a Car Insurance Claim—and When Not To," retrieved Jun. 3, 2016 from https://www.nerdwallet.com/blog/insurance/when-to-file-car-insurance-claims/, 6 pages.

Apr. 13, 2015 U.S. Appl. No. 14/685,067.

May 23, 2018—U.S. Notice of Allowance—U.S. Appl. No. 15/900,958.

Jun. 6, 2018—U.S. Notice of Allowance—U.S. Appl. No. 15/880,187.

Sep. 20, 2018—U.S. Non-Final Office Action—U.S. Appl. No. 15/271,834.

"Filing an Auto Claim", Rocky Mountain Insurance, 3 pages (Year 2009).

Mar. 7, 2019—U.S. Notice of Allowance—U.S. Appl. No. 16/106,380.

Mar. 21, 2019—U.S. Final Office Action—U.S. Appl. No. 15/271,834.

Apr. 12, 2019 (WO) International Search Report—App. PCT/US2019/016324.

Apr. 12, 2019 (WO) Written Opinion of the International Searching Authority—App. PCT/US2019/016324.

Aug. 7, 2019—U.S. Non-Final Office Action—U.S. Appl. No. 16/106,380.

Jan. 15, 2020—U.S. Notice of Allowance—U.S. Appl. No. 16/106,380.

Jan. 24, 2020—U.S. Non-Final Office Action—U.S. Appl. No. 15/271,834.

Sep. 16, 2020—U.S. Notice of Allowance—U.S. Appl. No. 15/271,834.

Ensure High Contrast for Text Over Images by Harley (Year: 2015).

Oct. 26, 2020—U.S. Non-Final Office Action—U.S. Appl. No. 16/255,264.

Oct. 28, 2020—U.S. Non-Final Office Action—U.S. Appl. No. 16/848,196.

\* cited by examiner

FIG. 5A

Anticipated Repair Cost Tool — 508

Submit for Repair Cost
Enter your info and we will send you a message with a link to your repair costs when it is ready. It typically takes about 30 minutes to prepare.

Email
[ Pre-populate@Email.com ] — 508A

Confirm Email
[ ] — 508B

Text Message Phone Number
[ (___) ___-____ ] — 508C

[ Submit ]

Anticipated Repair Cost Tool — 510

— 510A

| Repair Cost | Deductible | Claim Payment |
|---|---|---|
| $1,800 | − $500 | = $1,300 |
| View Details > | View Policy > | |

Repair Time — 510B
Typical repair time for this repair is: 4 days

Find a Repair Shop >

Premium Impact — 510C
Premium (6 mos.)
$820.50
Expect roughly $335.00 in rate increase Learn More >

[ Save for Later ] — 510D    [ File a Claim ] — 510E

FIG. 5C

Anticipated Repair Cost Tool

Submit for Repair Cost
Enter your info and we will send you a message with a link to your repair costs when it is ready. It typically takes about 30 minutes to prepare.

Email — 608A
Pre-populate@Email.com

Confirm Email — 608B

Text Message Phone Number — 608C
(___) ___-____

[Submit]

608

---

Anticipated Repair Cost Tool

Repair Cost — 610A
Repair Cost Range: $1,500 - $2,200
Deductible: $500
Claim Payment: $1,000 - $1,800
Find a Repair Shop >

Repair Time — 610B
Typical repair time for this repair is: 4-7 days

Premium Impact — 610C
Premium (6 mos.): $828.00
Expect roughly $300-500 in rate increase at renewal
Learn More >

LOG IN / SIGN UP — 610D
Save time and get more accurate repair costs. The info we gather here will not affect your rates. You will have an option to file a claim after you see your repair cost.

[Save for Later] — 610E

ENHANCED IMAGE CAPTURE AND ANALYSIS OF DAMAGED TANGIBLE OBJECTS

TECHNICAL FIELD

Aspects described herein generally relate to systems and methods related to the usage of enhanced pictures (e.g., photos) of tangible objects (e.g., property, cars, etc.) damaged in an accident and answers to questions about the accident to better assess the effect of the damage (e.g., repair expenses and accompanying changes to an insurance policy).

BACKGROUND

When an insured item of property is damaged or destroyed during an adverse event, insurance policy holders may take advantage of conventional claims processing procedures to determine if they will receive compensation for their losses. While such conventional claims processing procedures are an industry standard in determining loss compensation, insurance policy holders have traditionally had very few options for quantifying the effect on their insurance policy responsive to the submission of an insurance claim. Accordingly, insurance policy holders often wonder about the amount of damage and whether filing a claim will adversely impact their insurance policy (e.g., result in higher premiums or dropped coverage) regardless of whether or not compensation is awarded to cover the cost of repairing the damages to their insured property. Thus, there may be a need for calculating damage compensation and associated effects to an insurance policy prior to the submission of an insurance claim.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure involve a streamlined and efficient process for pre-FNOL loss assessment and disclose methods, systems, and apparatuses for determining repair costs for insured property damaged in an accident and accompanying insurance policy changes associated with filing a claim to cover to the repair costs. A pre-FNOL system may receive an indication that insured property was damaged in an accident. In response to receiving the indication, the pre-FNOL system may provide questions regarding the accident to a mobile device associated with the owner of the insured property. Upon receiving answers to the questions, the pre-FNOL system may prompt the owner of the insured property to provide pictures of the damages to the property. Through analysis of the responses to the questions and the pictures of the damages, the pre-FNOL system may determine repair costs for the damages to the insured property and accompanying insurance policy changes associated with filing a claim to cover the repair costs.

In another aspect of the disclosure, the pre-FNOL system may receive an indication from the owner of the insured property that the owner would like to file a claim to cover the determined repair costs. Responsive to receiving such an indication, the pre-FNOL system may deposit a payment corresponding to the determined repair costs into a payment account associated with the owner of the property.

In another aspect of the disclosure, the pre-FNOL system may receive an indication from the owner of the insured property that the owner would not like to file a claim to cover the determined repair costs, but would like to receive assistance in getting the insured property repaired. Responsive to receiving such an indication, the pre-FNOL system may provide information regarding the accident to a repair clearinghouse. Through the repair clearinghouse, the pre-FNOL system may facilitate a repair agreement between the owner of the damaged property and a repair shop. Upon facilitating the repair agreement, the pre-FNOL system may provide the owner of the damaged property with repair updates associated with repairs performed on the damaged property.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5A shows a series of initial display screens displayed on a mobile computing device when a user commences the high accuracy pre-FNOL loss assessment method according to one or more aspects of the present disclosure.

FIG. 5C shows a series of display screens displayed on a mobile computing device for enabling a user to receive feedback from a pre-FNOL loss assessment server based on the high accuracy pre-FNOL loss assessment method according to one or more aspects of the present disclosure.

FIG. 6B shows a series of display screens displayed on a mobile computing device for enabling a user to receive feedback from a pre-FNOL loss assessment server based on the low accuracy pre-FNOL loss assessment method according to one or more aspects of the present disclosure.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
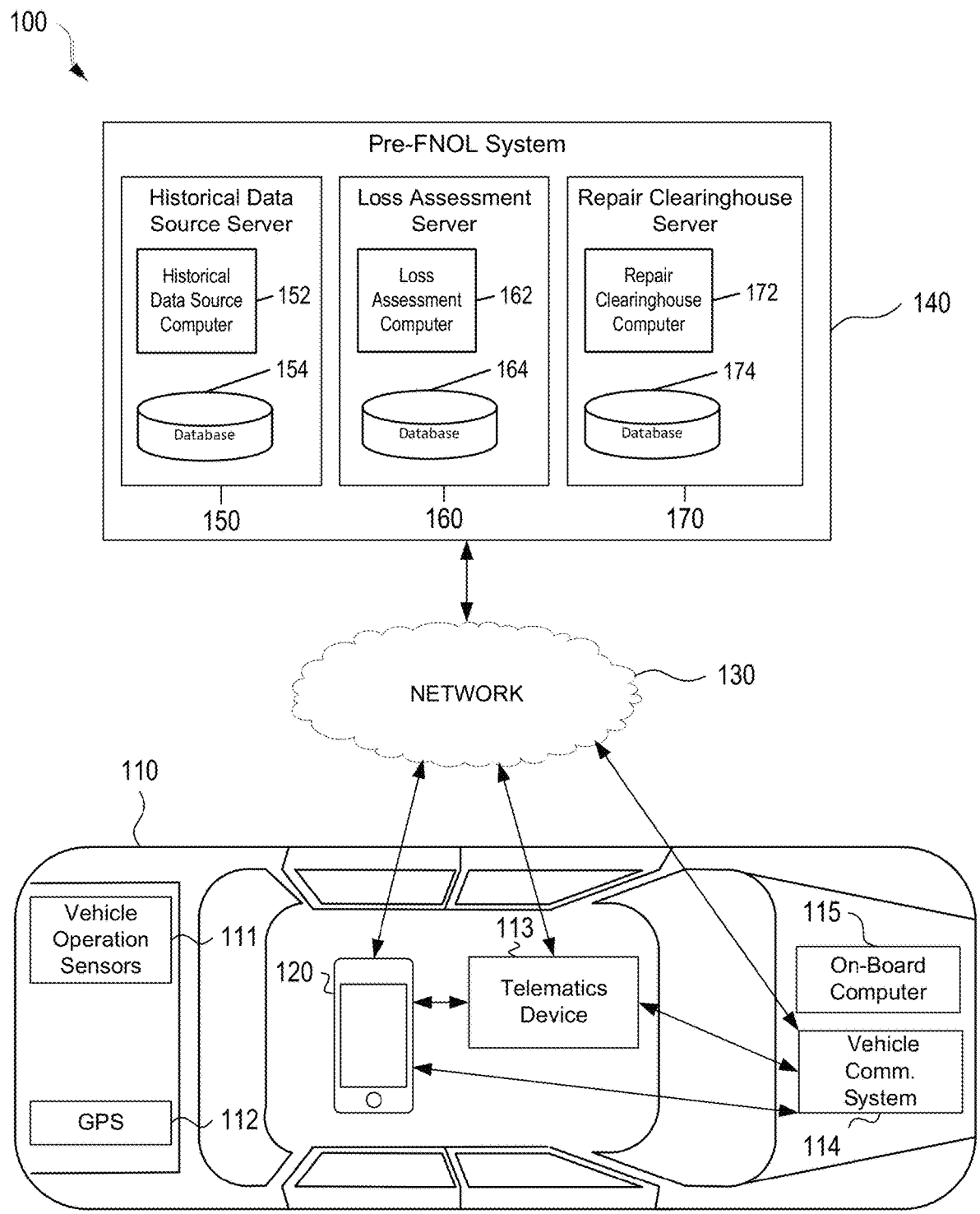
FIG. 1 illustrates a pre-FNOL loss assessment system according to one or more aspects of the present disclosure.

FIG. 1 is a diagram illustrating various example components of a pre-FNOL loss assessment system 100 according to one or more aspects of the disclosure. Pre-FNOL loss assessment system 100 may include a vehicle 110, a mobile computing device 120, a network 130, and a pre-FNOL system 140. Each component shown in FIG. 1 may be implemented in hardware, software, or a combination of the two. Additionally, each component of the pre-FNOL loss assessment system 100 may include a computing device (or system) having some or all of the structural components described below for computing device 801 as described below in regards to FIG. 10.

Vehicle 110 of the pre-FNOL loss assessment system 100 may be an automobile, motorcycle, scooter, bus, van, truck, semi-truck, train, boat, recreational vehicle, or other vehicle. The vehicle 110 may further be an autonomous vehicle, semi-autonomous vehicle, or non-autonomous vehicle. In some examples, vehicle 110 may include vehicle operation sensors 111 capable of detecting, recording, and/or transmitting various vehicle performance and/or operational data and environmental conditions data. For example, sensors 111 may detect, store, and/or transmit data corresponding to the vehicle's speed, rates of acceleration and/or deceleration, braking, swerving, and the like. Sensors 111 also may detect, store and/or transmit data received from the vehicle's internal systems, such as an impact to the body of the vehicle, air bag deployment, seatbelt usage, and the like.

Sensors 111 also may detect, store, and/or transmit data relating to moving violations and the observance of traffic signals and signs by the vehicle 110. Additional sensors 111 may detect, store, and/or transmit data relating to the maintenance of the vehicle 110, such as the engine status, oil level, engine coolant temperature, odometer reading, the level of fuel in the fuel tank, engine revolutions per minute (RPMs), and/or tire pressure. In some instances, vehicle 110 may include a Global Positioning System (GPS) 112 which may be used to detect the vehicle's position and/or location data associated with the vehicle.

Vehicle sensors 111 and GPS 112 may be configured to transmit data to one or more internal computing systems including telematics device 113 and/or vehicle on-board computer 115. Additionally, vehicle sensors 111 and GPS 112 may be configured to independently transmit the above-mentioned data to one or more external computing systems including mobile device 120 and/or pre-FNOL system 140. In some instances, the data transmission to the one or more external computing systems may be performed via telematics device 113 and/or vehicle communication system 114. In such cases, the vehicle sensors 111 and GPS 112 may be configured to transmit data to telematics device 113 and/or vehicle communication system 114 which, in turn, may be configured to transmit the data to the one or more external systems.

Telematics device 113 may be configured to receive vehicle performance and/or operational data in the form of a data stream from on-board computer 115 via a data port, Bluetooth interface, or any comparable communication interface of the vehicle 110. For example, telematics device 113 may include an on-board diagnostic (OBD) device adapter and may be connected to an OBD port of the vehicle 110. In certain embodiments, telematics device 113 may be configured to receive vehicle performance and/or operational data directly from vehicle sensors 111, GPS 112, on-board computer 115, and/or mobile device 120 via a wired or wireless connection. Telematics device 113 may include a memory to store data received from vehicle sensors 111, GPS 112, on-board computer 115, and/or mobile device 120.

In some embodiments, telematics device 113 may store in memory a vehicle identification number (VIN) of a vehicle 110 associated with an insurance policy of an insured driver to corroborate vehicle performance and/or operational data. The VIN associated with vehicle 110 may also be stored in memory associated with on-board computer 115. During operation of vehicle 110, the on-board computer 115 may attach the VIN of vehicle 110 to the data stream comprising the vehicle performance and/or operational data. On-board computer 115 may output the data stream comprising the VIN and vehicle performance and/or operational data to telematics device 113. Telematics device 113 may corroborate the VIN received in the data stream from on-board computer 115 to the VIN stored in memory. In doing so, telematics device 113 may determine whether or not it is operating in the vehicle associated with the insurance policy of the insured driver.

The vehicle performance and/or operational data may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO IS09141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 113 may also include sensors such as, but not limited, an accelerometer, compass, gyroscope, and GPS system. Telematics device 113 may include antennas to communicate with other devices wirelessly. For example, telematics device 113 may communicate with mobile device 120 and/or pre-FNOL system 140 over a wide area network (WAN), cellular network, Wi-Fi network, and the like. Telematics device 113 may also communicate with mobile device 120 via a Bluetooth connection. In certain embodiments, telematics device 113 may be configured to establish a secure communication link and/or channel with mobile device 120 and/or pre-FNOL system 140.

In some arrangements, telematics device 113 may be a telematics application operating on mobile computing device 120 and may utilize hardware components comprised therein (e.g., memory, processors, communication hardware, etc.) to receive, store, and/or transmit vehicle performance and/or operational data outputted by the on-board computer 115. In such an arrangement, telematics device 113 may also utilize sensors included within mobile device 120.

Vehicle communication systems 114 may be implemented using wireless protocols such as WLAN communication protocols (e.g., IEEE 802.11), Bluetooth (e.g., IEEE 802.15.1), one or more of the Communication Access for Land Mobiles (CALM) wireless communication protocols and air interfaces, and the like. In certain systems, communication systems 114 may include specialized hardware installed in vehicle 110 (e.g., transceivers, antennas, etc.), while in other examples the communication systems 114 may be implemented using existing vehicle hardware components (e.g., radio and satellite equipment, navigation computers). In some instances, the vehicle communication systems 114 may be configured to transmit data provided by vehicle sensors 111, GPS 112, and telematics device 113 to one or more external computing devices over a wide area network (WAN), cellular network, Wi-Fi network, and the like. Similarly, the communications systems 114 may be configured to receive data from one or more external computing systems. In some instances, vehicle communication systems 114 may be configured to transmit data to one or more external computing systems Vehicle control computer 115 may contain some or all of the hardware/software components as the computing device 801 depicted in FIG. 10, and may be configured to operate aspects of the driving, or other operation of vehicle 110, including but not limited to, acceleration, braking, steering, and/or route navigation. Furthermore, vehicle control computer 115 may be configured to operate one or more internal vehicle systems and/or components including at least a vehicle sound system, dashboard display and/or heads-up display system, interior lighting system, climate control system, door locking systems, and the like. Similarly, vehicle control computer 115 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 115 may be configured to receive and analyze vehicle performance and operational data provided by vehicle sensors 111, GPS 112, telematics device 113, and mobile device 120 in order to determine that an accident has occurred and to participate in the pre-FNOL procedures described in further detail below.

In certain embodiments, mobile computing device 120 may be included within the vehicle 110 and may be used to independently collect vehicle driving data and/or to receive vehicle driving data from one or more vehicle systems. Mobile computing device 120 may be, for example, a mobile phone, personal digital assistant (PDA), or tablet computer of the driver or passenger(s) of vehicle 110. Software applications executing on mobile computing device 120 may be configured to independently detect certain driving data. For example, mobile device 120 may be equipped with one or more accelerometers and/or GPS systems which may be accessed by software applications executing on mobile computing device 120 to determine vehicle location, speed, direction, and other basic driving data. As stated above, mobile computing device 120 may be configured to transmit the independently collected vehicle driving data and/or the received vehicle driving data and environmental conditions data to one or more external computing devices (e.g., pre-FNOL system 140). In other examples, software on mobile computing device 120 may be configured to receive some or all of the driving data collected by vehicle sensors 111 and GPS 112. Mobile computing device 120 may also determine that an accident has occurred and participate in the pre-FNOL procedures described herein.

The pre-FNOL loss assessment system 100 may include a pre-FNOL system 140 including a historical data source server 150, a loss assessment server 160, and a repair clearinghouse server 170. The pre-FNOL system 140 and each of the historical data source server 150, loss assessment server 160, and repair clearinghouse server 170 may contain some or all of the hardware/software components as the computing device 801 depicted in FIG. 10.

Historical data source server 150 may comprise a historical data source computer 152 for receiving and/or processing historical data including insurance claims, accident reports, loss assessment profiles, vehicle operations data associated with insurance claims and accident reports, and the like. The historical data source server 150 may also comprise a database 154 used to store the historical data collected by any of the computing devices in pre-FNOL loss assessment system 100. In specific regards to the loss assessment profiles, historical data source database 154 may store a loss assessment matrix and an accident photo gallery for each loss assessment profile. In some instances, the loss assessment matrices for each of the loss assessment profiles may include vehicle damage costs and insurance policy changes associated with an accident. The historical data source server 150 may be configured to transmit the historical data stored in historical data source database 154 to loss assessment server 160, repair clearinghouse server 170, mobile device 120, telematics device 113, and/or on-board computer 115 for aiding in the pre-FNOL procedures described herein.

Loss assessment server 160 may comprise a loss assessment computer 162 for receiving, processing, and/or transmitting vehicle operational data, responses to preliminary questions regarding an accident, user vehicle selection information (or vehicle profile information), detailed and general damage information and pictures, and the like. The loss assessment server 160 may also comprise a loss assessment database 164 used to store the vehicle operational data, responses to preliminary questions regarding an accident, user vehicle selection information (or vehicle profile information), detailed and general damage information and pictures, and the like received by loss assessment computer 162. In some instances, the loss assessment database 164 may be configured to temporarily store data received from historical data source server 150 and repair clearinghouse server 170. The loss assessment server 160 may be configured to transmit data stored in loss assessment database 164 to historical data source server 150, repair clearinghouse server 170, mobile device 120, telematics device 113 and/or on-board computer 115 for aiding in the pre-FNOL procedures described herein.

Loss assessment computer 162 of loss assessment server 160 may be able to determine, based on the vehicle operational data received from telematics device 113, on-board computer 115 via vehicle communication systems 114, and/or mobile device 120, that vehicle 110 has been involved in an accident. For example, upon receiving data indicating that vehicle 110 has rapidly decelerated from 60 mph to 0 mph without also receiving breaking data, loss assessment computer 162 of loss assessment server 160 may determine that vehicle 110 has been in an accident. In some instances, loss assessment computer 162 of loss assessment server 160 may be configured to receive an indication from a mobile device 120 associated with a driver of vehicle 110 that an accident has occurred. Such an indication may be a driver-provided notification that vehicle 110 was involved in accident. After receiving data and/or a user indication that vehicle 110 was involved in an accident, loss assessment computer 162 of loss assessment server 160 may be configured to conduct post-accident assistance measures for the driver of vehicle 110 involved in the accident. As will be discussed in further detail below, such post-accident assistance measures may include notifying emergency response personnel that an accident has occurred and providing the user of mobile device 120 (e.g., the driver of vehicle 110) with a post-accident checklist.

Responsive to completing the post-accident assistance measures, loss assessment computer 162 of loss assessment server 160 may be configured to perform pre-FNOL loss assessment methods in conjunction with historical data source server 150 and repair clearinghouse server 170 in order to determine costs associated with the damages to vehicle 110 and accompanying changes to an insurance policy associated with vehicle 110 if a claim is filed to cover the determined costs of the damages. Aspects of the pre-FNOL loss assessment method performed by loss assessment computer 162 of loss assessment server 160 may include receiving responses to preliminary questions regarding an accident, determining pre-FNOL loss assessment eligibility based on the responses to the preliminary questions, performing high accuracy and/or low accuracy pre-FNOL loss assessment calculations, and providing payment to a user at the competition of the pre-FNOL loss assessment. In some instances, loss assessment server 160 may be configured to perform pre-FNOL loss assessment methods without conducting post-accident assistance measures.

Repair clearinghouse server 170 may comprise a repair clearinghouse computer 172 and repair clearinghouse database 174 to facilitate the repair of vehicle 110 after being involved in an accident. In some instances, repair clearinghouse database 174 may store data associated with repair shops, car rental agencies, and tow truck companies such as profiles, user ratings, availability schedules, and the like. Repair clearinghouse computer 172 may be configured to provide a sortable list and/or map comprising data corresponding to repair shops, car rental agencies, and tow truck companies to a driver of vehicle 110. In some instances, repair clearinghouse computer 172 may be able to consolidate the repair shop, car rental agency, and tow truck company data presented to the driver of vehicle 110 based on vehicle location data provided by GPS 112, telematics device 113, and/or mobile computing device 120. Additionally and/or alternatively, repair clearinghouse computer 172 may be configured to consolidate the repair shop, car rental agency, and tow truck company data presented to the user based on location information (e.g., a zip code) provided by a user and/or associated with an insurance policy of the user.

The repair clearinghouse computer 172 of repair clearinghouse server 170 may be configured to facilitate a repair agreement between a user and a repair shop in instances in which the user does, or does not, file a claim to cover the determined repair costs. In facilitating the repair agreement, repair clearinghouse computer 172 of repair clearinghouse server 170 may be configured to provide the information corresponding to the accident (e.g., vehicle operational data and accident data provided by the driver of vehicle 110 during the pre-FNOL loss assessment measures) to one or more repair shops in the vicinity of the user. After providing the accident information to the one or more repair shops, repair clearinghouse computer 172 of repair clearinghouse server 170 may be configured to coordinate interactions between the user and the one or more repair shops to reach a repair agreement. Upon reaching a repair agreement, repair clearinghouse computer 172 may be configured to provide repair updates associated with the vehicle to the user.

In one example, the repair clearinghouse computer 172 of repair clearinghouse server 170 may create an auction-style platform on which repair shops in the vicinity of the user may place bids on the cost of repairing vehicle 110 after an accident has occurred based on vehicle operational data provided by telematics device 113, on-board computer 115 via vehicle communication systems 114, and/or mobile device 120, as well as accident data provided by the driver of vehicle 110 during the pre-FNOL loss assessment measures. The cost of repair bids provided by the repair shops may be fixed bids (e.g., bids for the exact cost of repair) or may be upper-bound bids (e.g., bids for the maximum amount for the cost of repair). In some instances, the cost of repair bids may also include a fixed repair completion time estimate, or an upper-bound completion time estimate. A user associated with vehicle 110 may view the cost of repair bids provided by the repair shops, the ratings of each of the repair shops, and the location each of the repair shops.

The following steps that are described in regards to FIGS. 2-7 may be implemented by one or more of the components of FIGS. 1 and 8 (described in detail below) and/or other components, including other computing devices.

In accordance with aspects of the disclosure, pre-FNOL system 140 may receive an indication that vehicle 110 has been in an accident. In some instances, the indication that an accident has occurred may be determined by the loss assessment server 160 of pre-FNOL system 140 through analysis of vehicle operational data received from any one, or combination of, vehicle operation sensors 111, telematics device 113, on-board computer 115 via vehicle communication system 114, and mobile computing device 120. In other instances, the indication that an accident has occurred may be provided by a driver of vehicle 110 via a pre-FNOL loss assessment application operating on mobile computing device 120 associated with the driver. Alternatively, the indication that an accident has occurred may be provided by a driver of vehicle 110 through a webpage associated with the pre-FNOL system via mobile computing device 120. In some instances, the indication that an accident has occurred may be provided by an insurance agent through either a pre-FNOL loss assessment application or a webpage associated with the pre-FNOL system 140 and the user inputted information, as described below, may be provided by the insurance agent working on behalf of the user.

In some embodiments, after receiving an indication of an accident, pre-FNOL system 140 may perform post-accident assistance measures. The post-accident assistance measures may include notifying emergency personnel that an accident has occurred and providing emergency personnel with vehicle information at the time of the accident (e.g., velocity, seatbelt usage, location data, etc.). In some instances, the post-accident assistance measures may also include dispatching a tow truck from a tow truck company to the site of the accident and/or dispatching a rental car from a rental car agency to the site of the accident.

Additionally, the post-accident assistance measures may include providing a post-accident checklist to a driver of vehicle 110 through a pre-FNOL loss assessment application operating on mobile device 120 and/or a webpage associated with the pre-FNOL system 140 being utilized and/or accessed by mobile device 120. The post-accident check list may include a list of tasks to be performed by a driver of vehicle 110 in order to be eligible to receive insurance compensation for the accident and/or be able to be eligible for pre-FNOL loss assessment. Such tasks may include acquiring insurance information from other drivers of other vehicles involved in the accident, taking photos of areas of vehicle 110 damaged in the accident, taking photos of areas of other vehicles damaged in the accident, and the like. In some instances, performance of post-accident assistance measures may be optional.

Upon completion of the post-accident assistance measures and/or receiving an indication that an accident has occurred, a user of mobile device 120 may provide answers to one or more questions regarding the accident and one or more pictures associated with damage to vehicle 110. The user may then transmit the answers to the one or more questions and one or more photos to pre-FNOL system 140 for loss assessment processing. Pre-FNOL system 140 may analyze the one or more answers provided by the user and the one or more photos to determine a cost to repair the damages to vehicle 110 and accompanying insurance policy changes associated with filing a claim to cover the repair costs. In some instances, pre-FNOL system 140 may incorporate vehicle operation data received from any one, or combination of, vehicle operation sensors 111, telematics device 113, on-board computer 115 via vehicle communication system 114, and mobile computing device 120 and historical data provided by historical data source server 150 in determining the cost to repair the damages to vehicle 110 and accompanying insurance policy changes.

After determining the cost to repair the damages to the vehicle and accompanying insurance policy changes associated with filing a claim to cover the determined repair costs, the pre-FNOL system 140 may transmit the determined repair costs and the accompanying insurance policy changes to a mobile device 120 associated with vehicle 110. Subsequent to providing the cost to repair the damages to vehicle 110 and associated insurance policy changes to be incurred if a claim is filed to, pre-FNOL system 140 may receive an indication from a user of mobile device 120 that the user would like to file a claim to cover the cost of the damages. After receiving such an indication, the pre-FNOL system 140 may deposit payment into a payment account associated with the user for the calculated repair costs.

In some instances, after providing the repair cost information and associated insurance policy change data to the user, pre-FNOL system 140 may receive an indication from the user of mobile device 120 that the user would not like to file a claim to cover the cost of the damages, but would instead like assistance in facilitating the repair of the vehicle. After receiving such an indication, the pre-FNOL system 140 may be configured to provide the information corresponding to the accident (e.g., vehicle operational data and accident data provided by the driver of vehicle 110 during the pre-FNOL loss assessment measures) to one or more repair shops in the vicinity of the user. After providing the accident information to the one or more repair shops, pre-FNOL system 140 may be configured to facilitate a repair agreement between a user and a repair shop. In facilitating the repair agreement, pre-FNOL system 140 may be configured may be configured to coordinate interactions between the user and the one or more repair shops to reach a repair agreement. Upon reaching a repair agreement, repair clearinghouse computer 172 may be configured to provide repair updates associated with the vehicle to the user.

Although embodiments of the disclosure discussed herein relate to an insured vehicle analyzed by pre-FNOL loss assessment system 100, one of ordinary skill in the art would recognize that other types of insured items, including homes, may be employed with a similar scheme.

Figure 2:
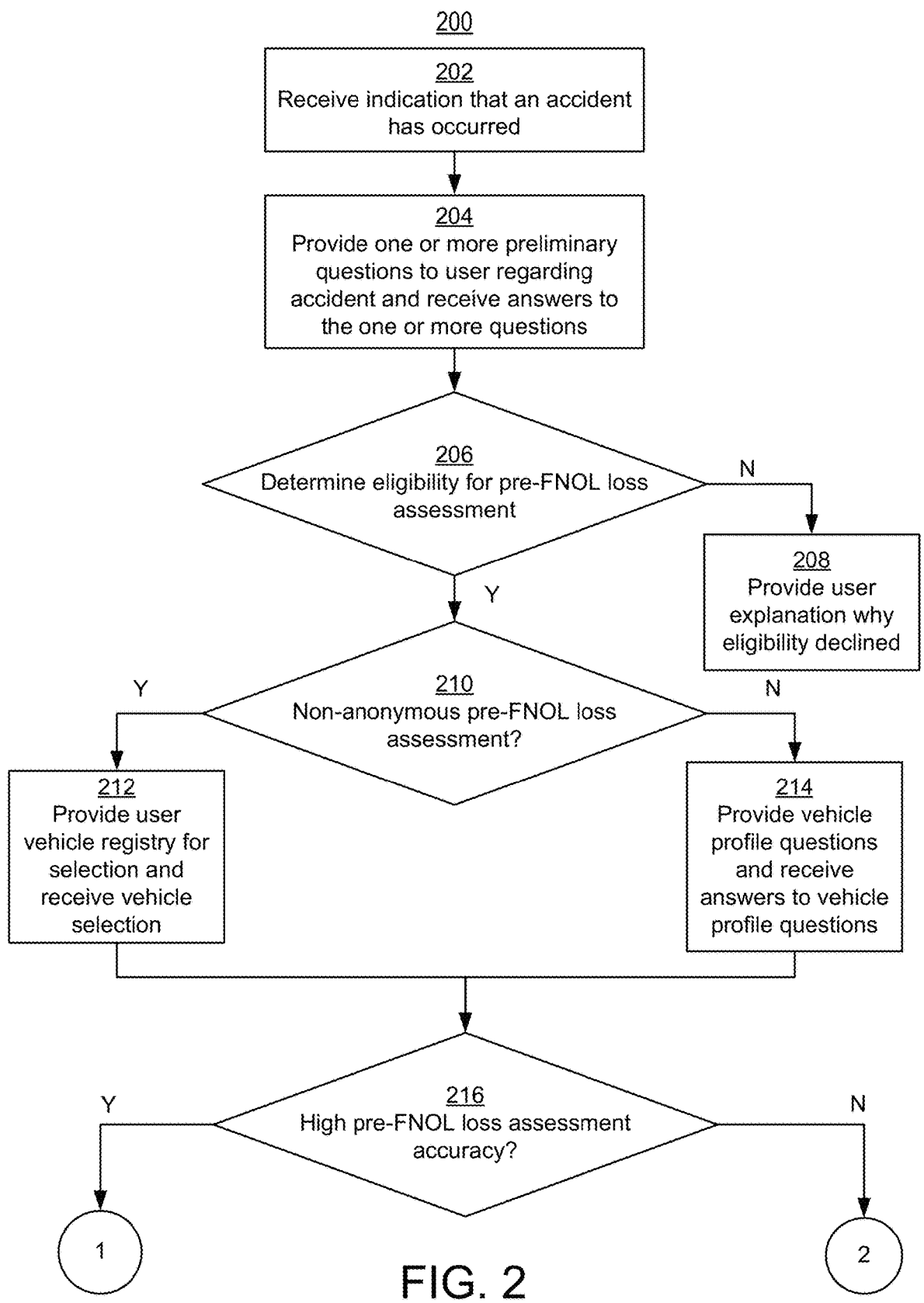
FIG. 2 depicts an initial flow chart for a pre-FNOL loss assessment method according to one or more aspects of the present disclosure.

FIG. 2 depicts a flow chart for a pre-FNOL loss assessment method according to one or more aspects of the disclosure. In some examples, pre-FNOL loss assessment method may be included in an application downloaded from pre-FNOL system 140 onto a mobile computing device associated with a user. The downloaded application may interface with pre-FNOL system 140 in order to perform the pre-FNOL loss assessment method described herein. Furthermore, such an application may be a multi-functional application and may also include a telematics method enabling mobile device 120 to receive vehicle operation data from telematics device 113 and/or detect vehicle operation data through one or more sensors (e.g., accelerometer, GPS, etc.) included in mobile device 120. Additionally and/or alternatively, the pre-FNOL loss assessment method may be a web-based application performed on pre-FNOL system 140. In such instances, mobile device 120 may access a webpage associated with pre-FNOL system 140 in order to participate in the pre-FNOL loss assessment method described herein.

The method of FIG. 2 may commence at step 202 wherein an indication that an accident has occurred is received by pre-FNOL system 140. In one example, the indication may come in the form of vehicle operational data received from telematics device 113, vehicle control computer on-board computer 115 via vehicle communication systems 114, and/or mobile device 120. Such vehicle performance data may include each item of vehicle data described herein (e.g., velocity, rates of acceleration and/or deceleration, braking, swerving, impact to the body of the vehicle, air bag deployment, and the like). When received, the vehicle performance data may be analyzed by the pre-FNOL system 140 in order to determine that an accident has occurred. For example, pre-FNOL system 140 may receive vehicle operation data indicating that vehicle 110 has decelerated from 45 mph to 0 mph with high rotational velocity (e.g., swerving) and air bag deployment. Such data, when analyzed by pre-FNOL system 140, may indicate that vehicle 110 has been involved in an accident.

Additionally and/or alternatively, the indication may come in the form of a notification from a user associated with mobile device 120 indicating that the user was involved in an accident. In some instances, such an indication may come in response to an accident verification request provided by pre-FNOL system 140 to mobile device 120. For example, pre-FNOL system 140 may receive vehicle operation data suggesting that an accident was likely to have occurred. Responsive to receiving such data, pre-FNOL system 140 may issue an accident verification request to mobile device 120 in order to confirm that an accident has indeed occurred. The pre-FNOL system 140 may receive a user response to the accident verification request confirming that vehicle 110 associated with the user was involved in an accident. In other instances, the user notification may be provided by the user of mobile device 120 without pre-FNOL system 140 providing an accident verification request.

In some arrangements, a crash notification may be used to provide an indication that an accident has occurred. For instance, arrangements described U.S. patent application Ser. No. 14/685,067 entitled, "Automatic Crash Detection" filed on Apr. 4, 2015, which is incorporated herein by reference (and a copy of which is submitted concurrent with the filing of this application in an Information Disclosure Statement), may be used in conjunction with aspects described in the present disclosure to determine that a vehicle has been involved in an accident.

In one example, after receiving an indication that an accident has occurred, pre-FNOL system 140 may provide an alert to emergency personnel. The alert may include vehicle operational data received from telematics device 113, vehicle control computer on-board computer 115 via vehicle communication systems 114, and/or mobile device 120. Such vehicle operational data may include at least the velocity of the vehicle at the time of the accident, an indication of seat belt use and airbag deployment, and a GPS location associated with the vehicle. Additionally, the pre-FNOL system 140 may also dispatch a tow truck and/or a rental car to the location of the vehicle. In some instances, the dispatch may be performed upon user request.

The pre-FNOL system 140 may additionally provide a post-accident checklist to a driver of vehicle 110 through a pre-FNOL loss assessment application operating on mobile device 120 and/or a webpage associated with the pre-FNOL system 140 being utilized and/or accessed by mobile device 120. The post-accident check list may include a list of tasks to be performed by a driver of vehicle 110 in order to be eligible to receive insurance compensation for the accident and/or be able to be eligible for pre-FNOL loss assessment. Such tasks may include acquiring insurance information from other drivers of other vehicles involved in the accident, taking photos of areas of vehicle 110 damaged in the accident, taking photos of areas of other vehicles damaged in the accident, and the like.

At step 204, pre-FNOL system 140 may provide one or more preliminary questions to a driver of vehicle 110 regarding the accident. Such questions may be provided through mobile device 120 associated with the driver of vehicle 110. As shown in screen 502 of FIG. 5A and screen 602 of FIG. 6A, the questions (e.g., 502A/602A, 502B/602B, 502C/602C, and 502D/602D) may include whether or not there were any injuries to the driver and/or passengers of vehicle 110 and/or injuries to other parties involved in the accident (e.g., pedestrians, driver and/or passengers of other vehicles, etc.), whether or not vehicle 110 is driveable, how many vehicles were damaged in the accident including vehicle 110, and what level of detail of repair costs a user is looking for (e.g., fixed bid or upper-bound bid). In some instances, additional questions may be included regarding the geographical location of the accident and type of accident (e.g., head-on collision, broadside collision, etc.).

Additionally, the screen 502 may include a field (not shown) through which a user may be able to enter a previously received unique control number from a previously submitted anonymous pre-FNOL loss assessment. Upon entry of such a control number, the pre-FNOL system 140 may populate the previously entered data with the information corresponding to the pre-FNOL loss assessment associated with the control number. Responsive to populating the previously entered data, the user may be able to revise the entered data, file a claim, and/or initiate services outside of a traditional claim as described below.

Responsive to providing the preliminary questions, pre-FNOL system 140 may receive responses to the one or more preliminary questions from the driver of vehicle 110 via mobile device 120. Based on the responses provided, pre-FNOL system 140 may determine whether or not the driver is eligible for pre-FNOL loss assessment in step 206. For example, if the driver reports that injuries were sustained in the accident, vehicle 110 is no longer driveable, and that three vehicles were involved in the accident, pre-FNOL system 140 may conclude that pre-FNOL loss assessment is not applicable. In determining ineligibility, pre-FNOL system 140 may incorporate data from historical data source server 150. Alternatively, pre-FNOL system 140 may determine ineligibility based upon pre-set criteria that, if fulfilled, yield a determination of ineligibility. For example, pre-set criteria may include an accident in excess of four or more vehicles wherein there are injuries and vehicle 110 is deemed undriveable. In another example, the pre-set criteria may include whether or not injuries were sustained in the accident. Such examples of pre-set criteria are illustrative and other arrangements are possible.

In the event that pre-FNOL system 140 determines that pre-FNOL loss assessment is not applicable, a notification may be provided to mobile device 120 in step 208 indicating that the user is ineligible for pre-FNOL loss assessment. The notification may include an indication as to why the user was deemed ineligible (e.g., four or more vehicles were involved in the accident, injuries were reported, and vehicle 110 was undriveable, etc.) and a suggestion to file a formal claim to assess the damages incurred during the accident. The notification may also provide a login portal through which the user may access an account associated with an insurance provider in order to file a formal claim. Upon successful login, the pre-FNOL system 140 may provide the received vehicle operation data and the responses to the one or more preliminary questions to the insurance provider to aid in the claim filing process.

In the event that the pre-FNOL system 140 determines that pre-FNOL loss assessment is applicable in step 206, pre-FNOL system 140 may then determine whether or not the pre-FNOL loss assessment is an anonymous or non-anonymous loss assessment in step 210. For example, after receiving answers to the questions put forth in screens 502/602, the pre-FNOL loss assessment system 140 may then provide the user with an option to log in to an account associated with an insurance provider of the user. For a non-anonymous pre-FNOL loss assessment, the user may log into an associated insurance account. For an anonymous pre-FNOL loss assessment, the user may decline the option to log in to an associated insurance account. In such instances, the pre-FNOL system 140 may generate a unique control number associated with the anonymous pre-FNOL loss assessment that identifies the user initiating the anonymous pre-FNOL loss assessment in order to track usage of the pre-FNOL system 140 either through the application on mobile device 120 and/or the web application being accessed by mobile device 120. Additionally, the unique control number may enable the pre-FNOL system 140 to determine changes made by the user to the information provided in the anonymous pre-FNOL loss assessment, as well as to convert an existing anonymous pre-FNOL loss assessment to a claim or initiate services in instances in which a traditional claim is not filed.

In some instances, step 210 may be performed concurrently with, or prior to, step 206. In one example, the insurance provider account login portal (e.g., 502E/602E) may be presented to a user with the one or more preliminary questions shown in screen 502 of FIG. 5A and 602 of FIG. 6A. Upon selection of the insurance provider account log in portal, a pop-up screen may be presented to the user in order to enable the user to provide account information (e.g., insurance provider, policy number, username, and password). As such, the determination of whether or not the pre-FNOL loss assessment is an anonymous or non-anonymous loss assessment may occur prior to receiving the responses to the one or more preliminary questions. In another example, insurance provider, policy number, username, and password fields may be presented in-line with the one or more preliminary questions. In such instances, steps 206 and 210 may be performed simultaneously upon receipt of the user submission of the login information and answers to the one or more preliminary questions.

Figure 5A:
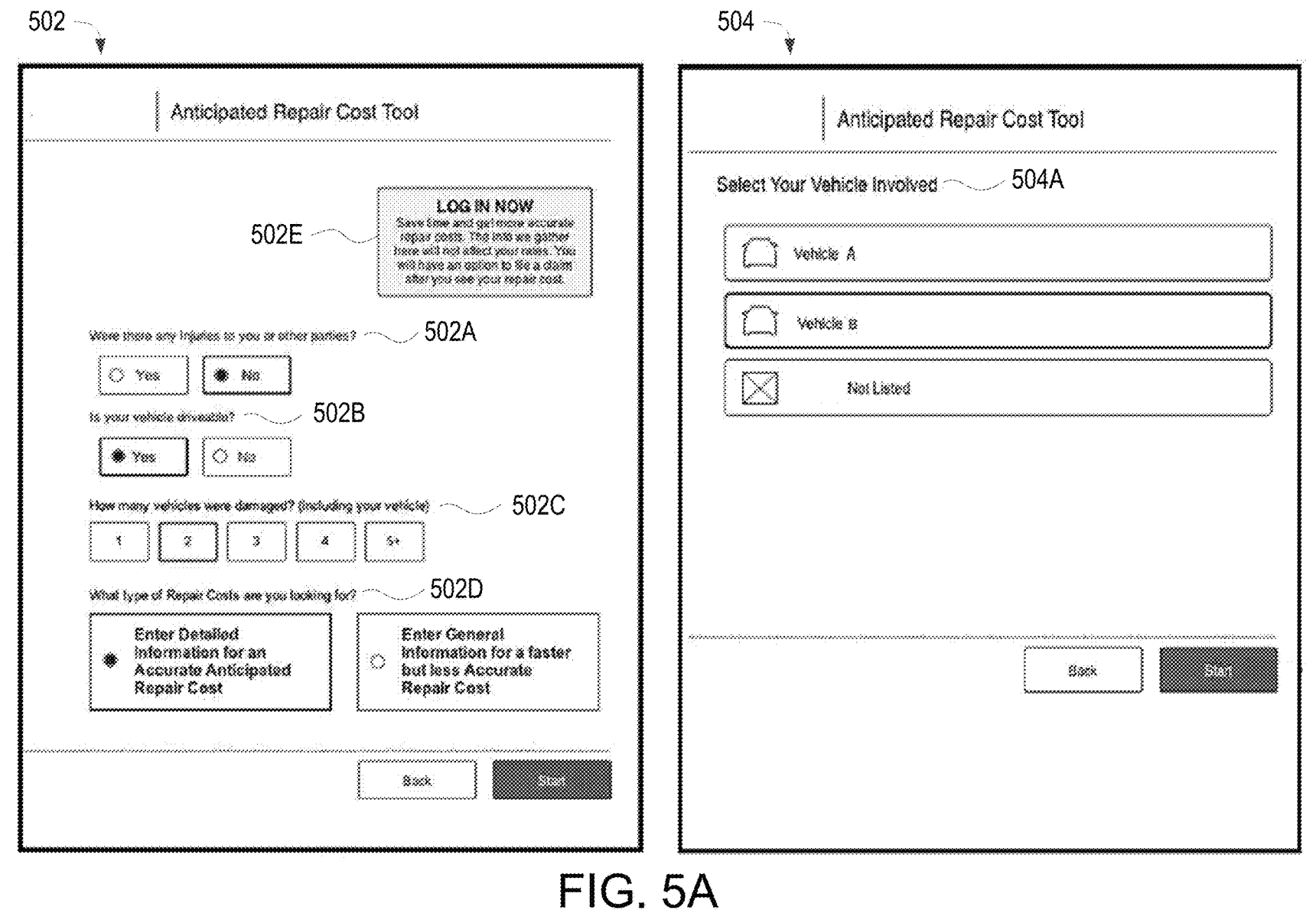
Figure 5B:
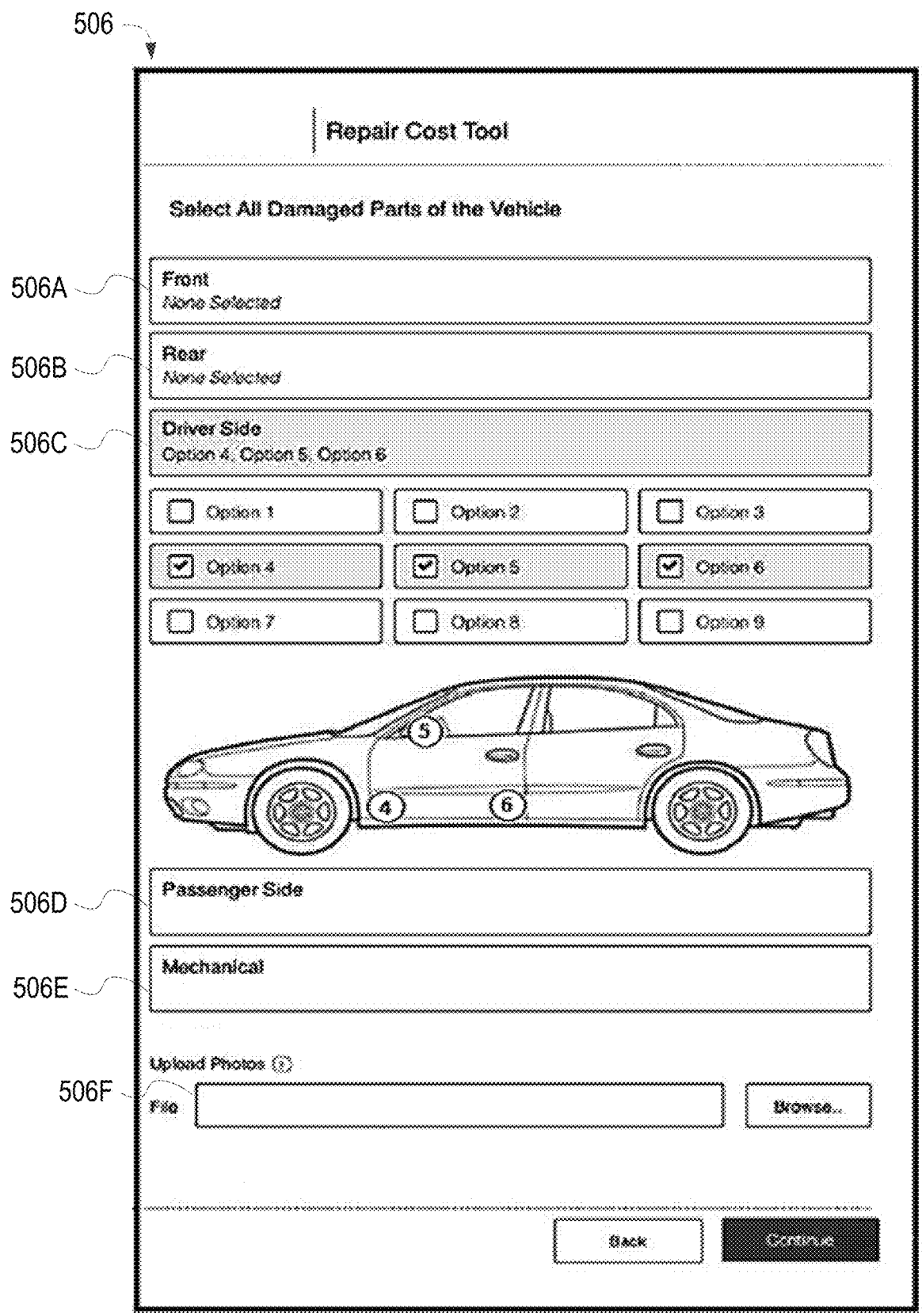
FIG. 5B shows a display screen displayed on a mobile computing device as a user provides details about damages to a vehicle based on the high accuracy pre-FNOL loss assessment method according to one or more aspects of the present disclosure.
Figure 6A:
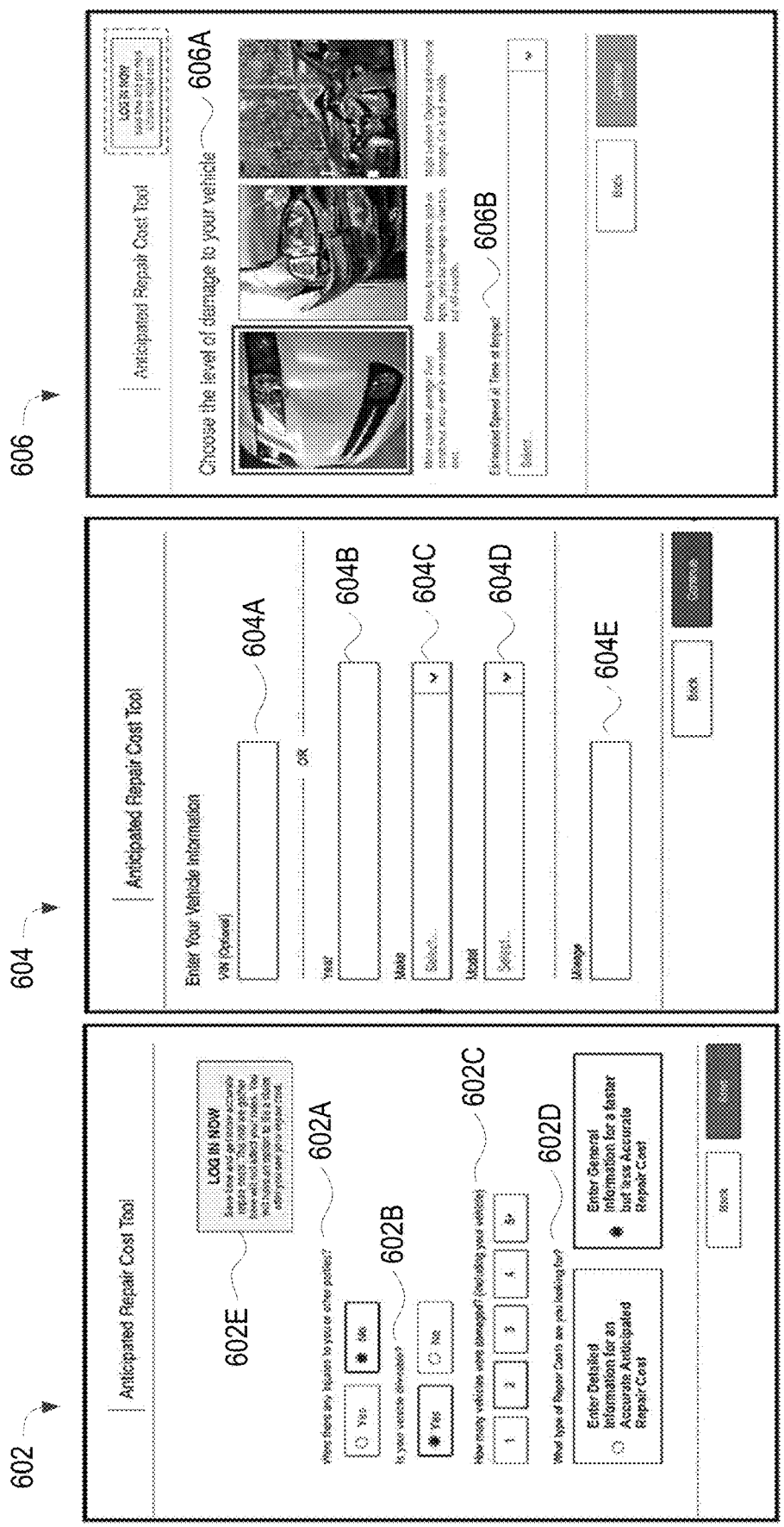
FIG. 6A shows a series of initial display screens displayed on a mobile computing device when a user commences the low accuracy pre-FNOL loss assessment method according to one or more aspects of the present disclosure.

In any case, the pre-FNOL system may either proceed to step 212 and provide the user with screen 504 as shown in FIG. 5A in the event of a non-anonymous pre-FNOL loss assessment or proceed to step 214 and provide the user with screen 604 as shown in FIG. 6A in the event of an anonymous pre-FNOL loss assessment.

For the non-anonymous pre-FNOL loss assessment, the user may be presented with screen 504 depicted in FIG. 5A at step 212. The screen 504 may include a vehicle registry and a prompt 504A for the user to select a vehicle associated with the insurance account of the user that was involved in the accident. In the example shown in screen 504, the user may have two vehicles (e.g., Vehicle A and Vehicle B). Vehicles A and B may correspond to any of the vehicles discussed herein with respect to vehicle 110 (e.g., an automobile, motorcycle, scooter, bus, van, truck, semi-truck, train, boat, recreational vehicle, or other vehicle). In particular, the vehicles A and B may denote a specific make and model of vehicle (e.g., 2010 Toyota® Camry, 2016 Kia® Sorrento, etc.) and may be further associated with the VIN of the vehicle. The information corresponding to vehicles A and B may be previously entered by a user associated with the insurance account and pre-stored in pre-FNOL system 140. Accordingly, screen 504 may depict as many vehicles as the user has previously entered.

In some instances, screen 504 may also present a "Not Listed" option for user selection, which may be appropriate for instances in which the user is involved in an accident while driving a rental vehicle, borrowed vehicle (e.g., from a relative or a friend), company vehicle, and/or a vehicle not previously entered by the user. In response to the selection of "Not Listed", pre-FNOL system 140 may present the user with a screen similar to that shown by screen 604 of FIG. 6A wherein the user is required to answer questions about the vehicle before pre-FNOL assessment can be conducted.

For the anonymous pre-FNOL loss assessment, the user may be presented with screen 604 depicted in FIG. 6A at step 214. The screen 604 may include one or more vehicle profile questions (e.g., 604A, 604B, 604C, 604D, and 604E) regarding vehicle 110 including the VIN, which may be optional, year, make, model, and mileage. As stated above, such questions may be similar to those presented to a user conducting a non-anonymous pre-FNOL loss assessment responsive to a selection of the "Not Listed" option shown in screen 504 of FIG. 5A.

Upon receiving either the vehicle selection in step 212 for a non-anonymous pre-FNOL loss assessment or responses to the vehicle profile questions in step 214 for an anonymous pre-FNOL loss assessment, pre-FNOL system 140 may proceed to step 216 and determine whether the user has requested a high accuracy pre-FNOL loss assessment (e.g., accurate anticipated repair cost and/or fixed repair cost) or a low accuracy pre-FNOL loss assessment (e.g., less accurate anticipated repair cost and/or upper-bound repair cost). A user selection of a high accuracy pre-FNOL loss assessment is shown in screen 502 of FIG. 5A in response to question 502D and a user selection a low accuracy pre-FNOL loss assessment is shown in screen 602 of FIG. 6A in response to question 602D.

In some instances, step 216 may be performed concurrently with steps 206 and 210. For example, the pre-FNOL system 140 may receive a user's insurance login information and the user's answers to the one or more preliminary questions including what type of repair costs the user is looking for (e.g., 502D/602D). In such instances, steps 206, 210, and 216 may be performed simultaneously upon receipt of the user submission of the login information and answers to the one or more preliminary questions.

Figure 3:
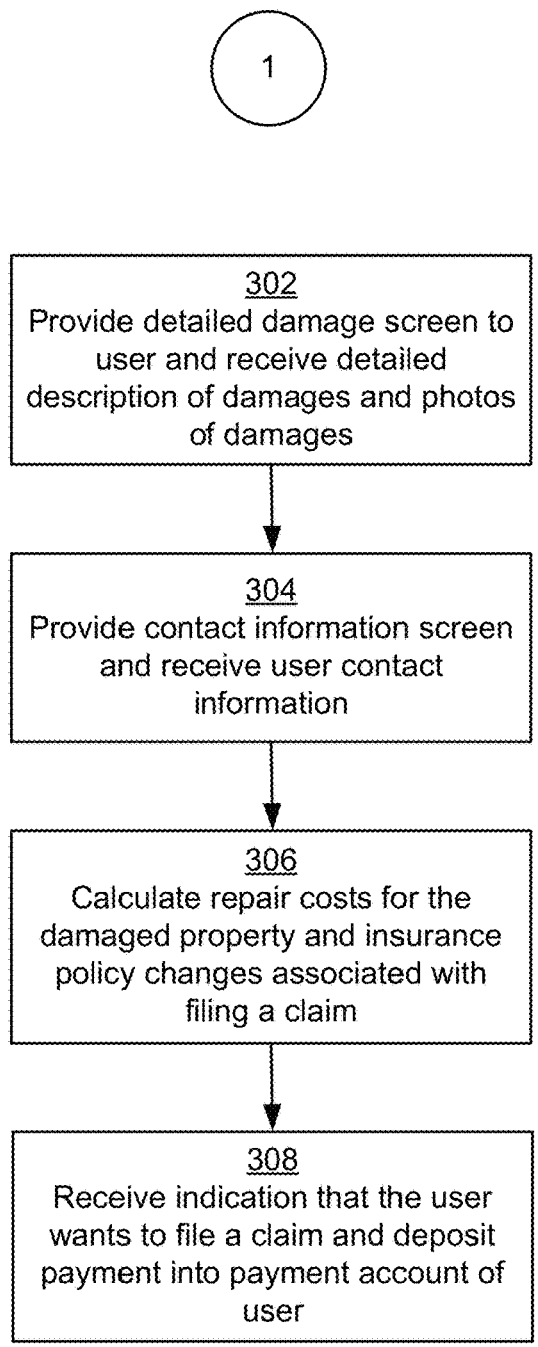
FIG. 3 depicts a high accuracy flow chart for the pre-FNOL loss assessment method of FIG. 2 according to one or more aspects of the present disclosure.

In the event that the user has selected a high accuracy pre-FNOL loss assessment (e.g., accurate anticipated repair cost and/or fixed repair cost), the pre-FNOL system 140 may proceed to step 302 of the high accuracy pre-FNOL loss assessment method shown in FIG. 3. In some instances, the user may not need to be logged in to an account of an associated insurance provider in order to receive a high accuracy pre-FNOL loss assessment. However, in other instances, the user may need to be logged in to an account of an associated insurance provider in order to receive a high accuracy pre-FNOL loss assessment.

At step 302, the pre-FNOL system 140 may provide the detailed damage description screen 506, as shown in FIG. 5B, to a user of vehicle 110 regarding the accident. The detailed damage description screen 506 may include a plurality of accordion-type, selectable fields (e.g., 506A, 506B, 506C, and 506D) corresponding to macro areas of the vehicle 110 that may or may not have been damaged in the accident such as the front, rear, driver side, and passenger side. The selection of one or more of the plurality of accordion-type, selectable fields may serve as an indication to pre-FNOL system 140 that the macro area corresponding to the particular field selected was damaged during the accident.

Upon selection, the accordion-type field may reveal a plurality of selectable sub-options corresponding to micro damage areas within the larger, macro location denoted by the accordion-type field itself. For example, in regards to accordion-type, selectable field 506C corresponding to the driver side of vehicle 110, upon selection, a plurality of additional micro damage areas (e.g., Option 1-Option 9)

may become available to the user. Each of the micro damage areas may correspond to a more specific area within the driver side of the vehicle 110 (e.g., driver side front tire, driver side front door, driver side rear door, etc.). In some instances, more than nine options may be available to the user for selection and each of the options may be labeled in accordance with the portion of vehicle 110 they represent. Additionally, the options may be labeled according to a reference scheme developed by the manufacturer of the vehicle in order to streamline terminology used during the course of repair.

The options 1-9, when selected by the user, may be labeled on a rendering of the vehicle 110, which may be produced at an orientation corresponding to that of the accordion-type, selectable field. For example, when accordion-type, selectable field 506C corresponding to the driver side of vehicle 110 is selected, a driver side rendering of vehicle 110 may be produced. In some instances, the renderings of the vehicle may correspond to the vehicle selected by the user in step 212 (e.g., Vehicle A or Vehicle B). However, in other instances, the renderings of the vehicle may correspond to a generic vehicle of a class similar to that of the vehicle selected by the user in step 212 (e.g., truck, sedan, coupe, hatchback, etc.).

In one example, the area of the vehicle corresponding to the option selected is labeled with the number of the option (e.g., 1, 2, 5, etc.). In another example, the area of the vehicle corresponding to the option selected is highlighted, shaded, outlined, and/or marked in a way indicating that it corresponds to the option selected.

Additionally and/or alternatively, the options may also be accordion-type, selectable fields that, when selected by the user, reveal a slidable damage scale associated with the area of the vehicle corresponding to the option. The slidable damage scale may be linearly displaced by the user from a lower bound corresponding to no damage to an upper bound corresponding to severe damage, and the area of the vehicle corresponding to the option may depict a variable degree of damage corresponding to the linear displacement of the slidable scale. Through the utilization of the slidable damage scale, a user may be able to visually perceive damage to specific areas of the vehicle in a manner quantifiable by pre-FNOL system 140.

In some instances, a user may be required to provide one or more pictures of the areas of the vehicle damaged in the accident. The required pictures may correspond to the area of the vehicle denoted by the accordion-type, selectable fields 506A, 506B, 506C, and/or 506D (e.g., front, rear, driver side, and/or passenger sides of the vehicle) selected by the user as being damaged in the accident. Additionally and/or alternatively, the required pictures may correspond to the one or more sub-options (e.g., Option 1-Option 9) selected by the user as being damaged by the accident. For instance, in the example shown in screen 506 of FIG. 5B wherein the user has selected accordion-type, selectable field 506C and sub-options 4, 5, and 6, the user may be required to take one or more photos of the driver side of the vehicle and one or more photos of the areas denoted 4, 5, and 6 in the rendering of the vehicle.

The pre-FNOL system 140 may be configured to initially process the pictures submitted by the user in order to determine if they are of a quality, size, and shape suitable to perform the pre-FNOL loss assessment methods described herein. In some instances, the pre-FNOL server 140 may be further configured to analyze the photos provided by the user to determine whether or not they correspond to the areas identified by the user selected accordion-type, selectable fields and the user selected sub-options.

In one example, responsive to receiving a user selection of an accordion-type, selectable field of the plurality of accordion-type, selectable fields corresponding to a particular macro area of the vehicle (e.g., front, rear, driver side, passenger side), pre-FNOL system 140 may activate a camera on mobile device 120 and accompanying user interface. As shown in FIG. 8, when activated, the user interface associated with the camera of mobile device 120 may generate a semi-translucent overlay 802C on the viewport 802A of the mobile device. In some instances, the semi-translucent overlay 802C may correspond to the macro area of the vehicle corresponding to the user selected accordion-type field. For example, in the event that the user selected the accordion-type, selectable field corresponding to the front of the vehicle, the user interface associated with the camera of mobile device 120 may generate a semi-translucent overlay 802C corresponding to the front of the vehicle. In some instances, the semi-translucent overlay 802C may correspond to the vehicle selected by the user in step 212 (e.g., Vehicle A or Vehicle B). However, in other instances, the semi-translucent overlay of the vehicle may correspond to a generic vehicle of a class similar to that of the vehicle selected by the user in step 212 (e.g., truck, sedan, coupe, hatchback, etc.). In one example, the semi-translucent overlay may correspond to the outline of the vehicle (either the user-selected vehicle or the generic vehicle of the class similar to that of the user-selected vehicle) and in another example, the semi-translucent overlay may correspond to the outline of vehicle with lines denoting the additional structure included therein. Alternatively, the semi-translucent overlay may be a geometric shape such as an oval, circle, rectangle, square, and the like.

The semi-translucent overlay may serve as an aide for the user in capturing an image suitable for the pre-FNOL system 140 to conduct the pre-FNOL loss assessment calculations. In some instances, before the pre-FNOL system 140 activates the camera on mobile device 120 and the accompanying user interface including the semi-translucent overlay, a tutorial screen may be presented to the user demonstrating the proper use of the semi-translucent overlay. The tutorial screen may provide the user with a plurality of user interface screen shots depicting correct and incorrect usages of the semi-translucent overlay. In regards to correct usages, the tutorial screen may show a green check mark corresponding to instances in which the semi-translucent overlay is properly aligned with a vehicle. In regards to incorrect usages, the tutorial screen may show a red 'X' corresponding to instances in which the semi-translucent overlay is not properly aligned with the vehicle. Through the presentation of the tutorial screen, the user may be able to better understand how to use the semi translucent overlay in capturing pictures of the damaged areas of the vehicle suitable for the pre-FNOL system 140 to conduct the pre-FNOL loss assessment calculations.

Figure 8:
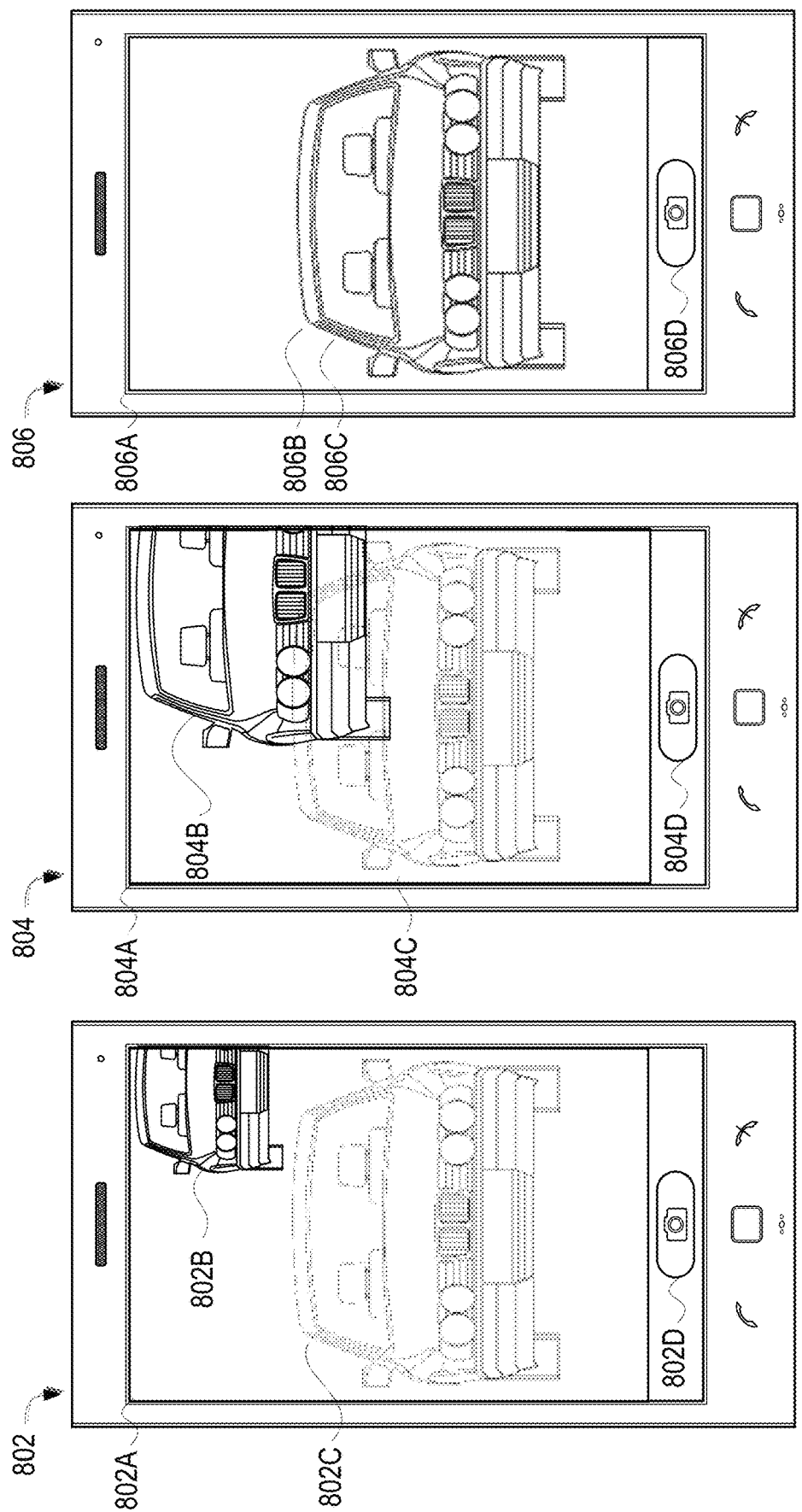
FIG. 8 depicts a series of display screens displayed on a mobile device as a user takes photos of a macro area of a damaged vehicle in accordance with one or more aspects of the disclosure.

In one example depicted in FIG. 8, after a user has proceeded past the tutorial screen, the camera of mobile device 120 may be activated and the user interface associated with the camera of mobile device 120 may generate a semi-translucent overlay 802C on the viewport 802A of the mobile device. The semi-translucent overlay 802C may be semi-opaque and, as such, may allow for viewing of the image data captured by the camera of the mobile device 120 through the semi-translucent overlay 802C. As shown in screen 802, the semi-translucent overlay 802C may be generated in a center portion of viewport 802A. Additionally, image data corresponding to the vehicle of the user (e.g., 802B) may also be displayed in the viewport 802A in instances in which the vehicle is in the perceptible range of the camera of the mobile device. As shown in screen 804, as the user of mobile device 120 approaches the damaged vehicle, the image data corresponding to the damaged vehicle of the user (e.g., 804B) may take up more area in the viewport 804A of mobile device 120. Conversely, the size of the semi-transparent overlay 804B may remain fixed compared to the size of the semi-transparent overlay 802C depicted in screen 802. Furthermore, as shown in screen 804, the image data corresponding to the vehicle of the user (e.g., 804B) may be viewable through the semi-translucent overlay 804C in instances in which the semi-translucent overlay 804C and the image data corresponding to the vehicle are overlapped. As shown in screen 806, the user may be able to orient the mobile device 120 relative to the user's damaged vehicle in such a way as to cause the image data corresponding to the vehicle of the user (e.g., 806B) to be aligned with the semi-translucent overlay 806C.

The user may be able to take a photo at any time after the camera of mobile device 120 is activated and the user interface associated with the camera of the mobile device 120 generates the semi-translucent overlay 802C on the viewport 802A of the mobile device. To take the photo, the user may select the photo button (e.g., 802D/804D/806D) or may press a physical button on the mobile device typically used to take a photo (e.g., volume button). In some instances, the image data of the photo captured by the user may correspond to the area within the semi-transparent overlay. Stated differently, while the entire viewport of the mobile device may show an image corresponding to the image data captured by the camera of the mobile device, only the image data included within the semi-translucent overlay is captured and retained (e.g., not discarded) when a photo is taken. As such, the semi-translucent overlay may serve as an outer boundary for photos captured by the user, wherein the outer boundary traces the border of the semi-translucent overlay. In other instances, the image data of the photo captured by the user may correspond to an area larger than the semi-transparent overlay. The larger area may correspond to a border of one or more pixels surrounding the semi-transparent overlay. Thus, the data captured by the photo may include the area of the semi-transparent overlay in addition to the border of one or more pixels surrounding the overlay. Alternatively, the image data of the photo captured by the user may correspond to entire image rendered by the camera of the mobile device in the viewport.

After the photo has been taken, mobile device 120 may transmit the data corresponding to the photo to pre-FNOL system 140 for processing. In instances in which the captured image data corresponds to the area of the semi-transparent overlay, the pre-FNOL system 140 may analyze the image data provided by mobile device 120 to determine if the provided image data corresponds to the area of the vehicle corresponding to the semi-transparent overlay. For example, the pre-FNOL system 140 may compare the received image data to one or more stored images corresponding to the make and model of the vehicle of the user and the macro area corresponding to the semi-transparent overlay. If the received image data is determined to correspond to the one or more stored images, the pre-FNOL system 140 may accept the photo and provide notification to mobile device 120 of the user that the photo was accepted. However, if the received image data is determined not to correspond to the one or more stored images, the pre-FNOL system 140 may decline the photo and provide notification to mobile device 120 that a retake of the photo is required.

Similarly, in instances in which the captured image data corresponds to the area of the semi-transparent overlay in addition to one or more pixels bordering the outline of the semi-transparent overlay, pre-FNOL system 140 may analyze the image data provided by mobile device 120 to determine if the provided image data corresponds to the area of the vehicle corresponding to the semi-transparent overlay. For example, the pre-FNOL system 140 may compare the received image data to one or more stored images corresponding to the make and model of the vehicle of the user and the macro area corresponding to the semi-transparent overlay. If the received image data is determined to correspond to the one or more stored images, the pre-FNOL system 140 may accept the photo and provide notification to mobile device 120 of the user that the photo was accepted. However, if the received image data is determined not to correspond to the one or more stored images, the pre-FNOL system 140 may decline the photo and provide notification to mobile device 120 that a retake of the photo is required.

Alternatively, in instances in which the image data of the photo captured by the user corresponds to the entire image rendered by the camera of the mobile device in the entire area of the viewport, The pre-FNOL system 140 may analyze the image data provided by mobile device 120 to determine if the provided image data corresponds to the area of the vehicle corresponding to the semi-transparent overlay. For example, the pre-FNOL system 140 may compare the received image data to one or more stored images corresponding to the make and model of the vehicle of the user and the macro area corresponding to the semi-transparent overlay. If the received image data is determined to correspond to the one or more stored images, the pre-FNOL system 140 may accept the photo and provide notification to mobile device 120 of the user that the photo was accepted. However, if the received image data is determined not to correspond to the one or more stored images, the pre-FNOL system 140 may decline the photo and provide notification to mobile device 120 that a retake of the photo is required. In some examples where the captured image data corresponds to the entire viewport, the pre-FNOL system 140 may, once the appropriate portion of the full image data corresponding to the overlay has been identified (either manually and/or in automated way), discard the extraneous image data outside of the boundary of the overlay. As a result, the final image data requires less space and bandwidth than the full image data, in those examples.

In some instances in which the image data of the photo captured by the user corresponds to the entire image rendered by the camera of the mobile device in the entire area of the viewport, mobile device 120 may subsequently discard data outside of the semi-translucent overlay generated on the viewport. Such discarding may either occur at mobile device 120 or at pre-FNOL system 140. In either case, the remaining, non-discarded image data may be stored by pre-FNOL system 140 the remaining, non-discarded image data may be smaller in size than the captured image data.

Through the utilization of the semi-translucent overlay, the pre-FNOL system may create a catalog and/or database of standardized pictures of specific sizes and orientations. Such standardization may the improve the functionality of the pre-FNOL system 140 in performing the pre-FNOL loss assessment measures described herein by increasing processing efficiency and bandwidth, decreasing required processing power, and maximizing available memory. Furthermore, as will be appreciated by one of ordinary skill in the art, the performance improvements of pre-FNOL system 140 may be further increased in instances in which the captured image data corresponds to the area of the semi-transparent overlay and instances in which the captured image data corresponds to the area of the semi-transparent overlay in addition to one or more pixels bordering the outline of the semi-transparent overlay due to the reduction in size of the image files.

Figure 9:
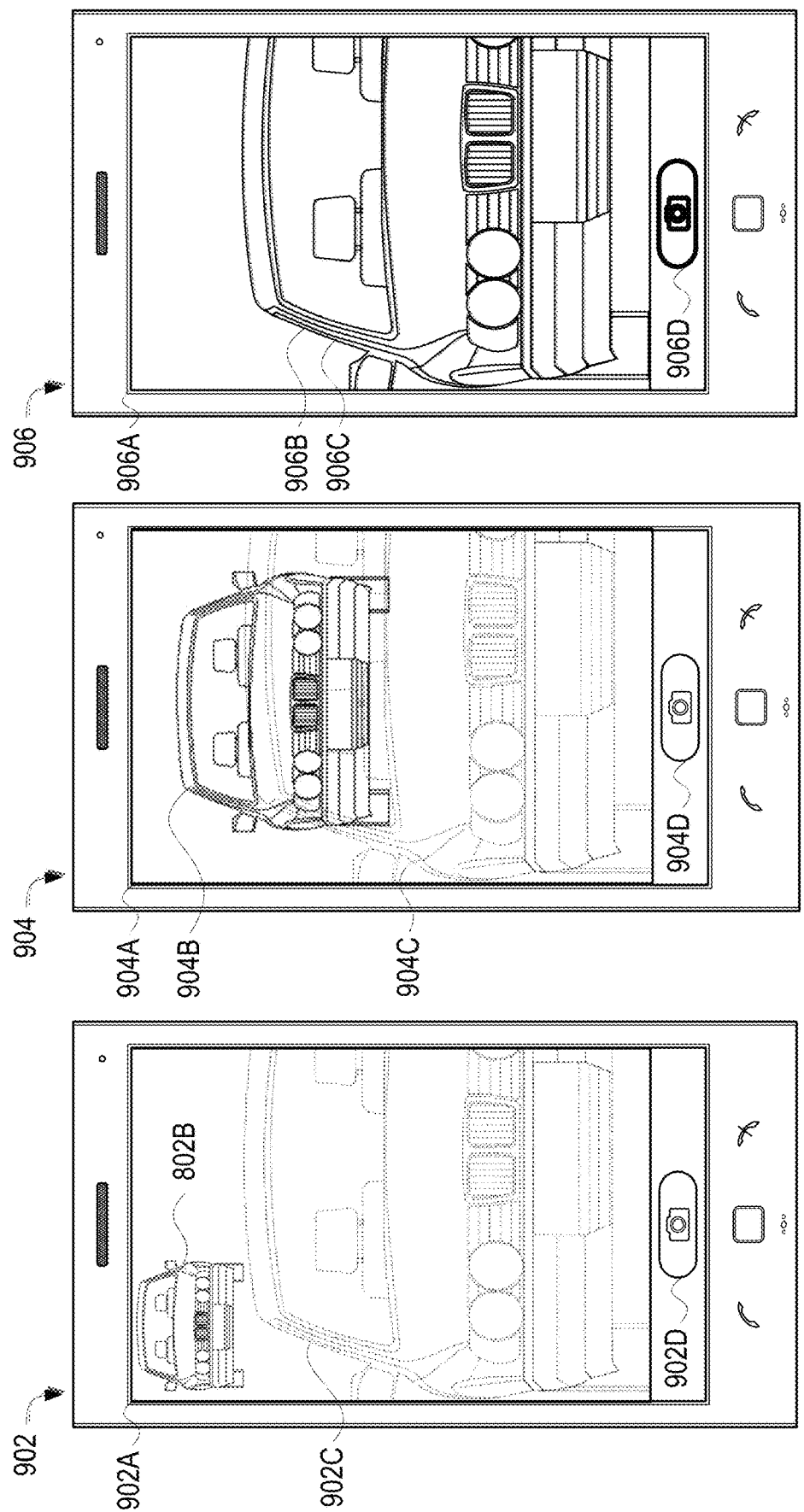
FIG. 9 depicts a series of display screens displayed on a mobile device as a user takes photos of a micro area of a damaged vehicle in accordance with one or more aspects of the disclosure.

Furthermore, pre-FNOL system 140 may generate a similar semi-translucent overlay for the area of the vehicle corresponding to each of the user selected sub-options within the greater accordion-type, selectable field. In one example, responsive to receiving a user selection of a sub-option corresponding to a particular micro area of the vehicle within the larger macro area, pre-FNOL system 140 may activate a camera on mobile device 120 and accompanying user interface. As shown in FIG. 9, when activated, the user interface associated with the camera of mobile device 120 may generate a semi-translucent overlay 902C on the viewport 902A of the mobile device. In some instances, the semi-translucent overlay 902C may correspond to the micro area of the vehicle corresponding to the user selected sub-option. For example, in the event that the user selected the sub-option corresponding to damage to the passenger side headlight, the user interface associated with the camera of mobile device 120 may generate a semi-translucent overlay 902C corresponding to the micro area of the front of the vehicle corresponding to the passenger side headlight. In some instances, the semi-translucent overlay 902C may correspond to the vehicle selected by the user in step 212 (e.g., Vehicle A or Vehicle B). However, in other instances, the semi-translucent overlay of the vehicle may correspond to a generic vehicle of a class similar to that of the vehicle selected by the user in step 212 (e.g., truck, sedan, coupe, hatchback, etc.). In one example, the semi-translucent overlay may correspond to the outline of the vehicle (either the user-selected vehicle or the generic vehicle of the class similar to that of the user-selected vehicle) and in another example, the semi-translucent overlay may correspond to the outline of vehicle with lines denoting the additional structure included therein. Alternatively, the semi-translucent overlay may be a geometric shape such as an oval, circle, rectangle, square, and the like.

In one example depicted in FIG. 9, after user selection of the sub-option, the camera of mobile device 120 may be activated and the graphical user interface associated with the camera of mobile device 120 may generate a semi-translucent overlay 902C on the viewport 902A of the mobile device. The semi-translucent overlay 902C may be similar to the semi-translucent overlay(s) described above in regards to FIG. 8.

As shown in screen 902, the semi-translucent overlay 902C may be generated in a center portion of viewport 902A. Additionally, image data corresponding to the vehicle of the user (e.g., 902B) may also be displayed in the viewport 902A in instances in which the vehicle is in the perceptible range of the camera of the mobile device. As shown in screen 904, as the user of mobile device 120 approaches the damaged vehicle, the image data corresponding to the damaged vehicle of the user (e.g., 904B) may take up more area in the viewport 904A of mobile device 120. Conversely, the size of the semi-transparent overlay 904B may remain fixed compared to the size of the semi-transparent overlay 902C depicted in screen 902. Furthermore, as shown in screen 904, the image data corresponding to the vehicle of the user (e.g., 904B) may be viewable through the semi-translucent overlay 904C in instances in which the semi-translucent overlay 904C and the image data corresponding to the vehicle are overlapped. As shown in screen 906, the user may be able to orient the mobile device 120 relative to the user's damaged vehicle in such a way as to cause the image data corresponding to the vehicle of the user (e.g., 906B) to be aligned with the semi-translucent overlay 906C.

The user may be able to take a photo at any time after the camera of mobile device 120 is activated and the user interface associated with the camera of the mobile device 120 generates the semi-translucent overlay 902C on the viewport 902A of the mobile device. To take the photo, the user may select the photo button (e.g., 902D/904D/906D) or may press a physical button on the mobile device typically used to take a photo (e.g., volume button). In some instances, the image data of the photo captured by the user may correspond to the area within the semi-transparent overlay. Stated differently, while the entire viewport of the mobile device may show an image corresponding to the image data captured by the camera of the mobile device, only the image data included within the semi-translucent overlay is captured when a photo is taken. In other instances, the image data of the photo captured by the user may correspond to an area larger than the semi-transparent overlay. The larger area may correspond to a border of one or more pixels surrounding the semi-transparent overlay. Thus, the data captured by the photo may include the area of the semi-transparent overlay in addition to the border of one or more pixels surrounding the overlay. Alternatively, the image data of the photo captured by the user may correspond to entire image rendered by the camera of the mobile device in the viewport. After the photo has been taken, mobile device 120 may transmit the data corresponding to the photo to pre-FNOL system 140 for processing. Such processing may be similar to the processing described above in regards to FIG. 8.

In some embodiments, the screen 506 may further include an accordion-type, selectable field 506E wherein a user can report mechanical issues with the vehicle. After selection, the accordion-type 506E may expand and present the user with a plurality of sub-options to specify the type and/or location of mechanical issues being experienced (e.g., vehicle won't start, engine making uncommon noises and/or rattling, etc.).

After receiving the detailed damage information and the pictures of the damages, pre-FNOL system 140 may proceed to step 304 and provide the user with contact information screen 508 as shown in FIG. 5C. The contact information screen 508 may include fields 508A, 508B, and 508C wherein a user can provide contact information such as an email address and a phone number. In some instances, the user may be required to confirm the email address and phone number by providing a second entry matching that of the first entry.

In the event of a non-anonymous pre-FNOL loss assessment in which the user has previously provided login credentials associated with an insurance account, the user may not be presented with screen 508 and not required to provide the required contact information denoted by fields 508A, 508B, and 508C. However, in some instances, the user may be required to provide the contact information stipulated by screen 508 regardless of whether or not a non-anonymous pre-FNOL loss assessment is being conducted.

In the event of an anonymous pre-FNOL loss assessment, the user may be presented with screen 508 and required to provide the required contact information denoted by fields 508A, 508B, and 508C. Additionally, the pre-FNOL system 140 may present the user with the unique control number generated at step 210 associated with the anonymous pre-FNOL loss assessment that identifies the user. In such instances, screen 508 may comprise information further detailing the unique control. Such information may include an indication that the unique control number can be entered to re-access data previously entered during the pre-FNOL loss assessment after submission and, further, that the unique control number can be used to convert a previously submitted pre-FNOL loss assessment in to a claim or initiate services in instances in which a traditional claim is not filed.

In some instances, contact information screen 508 may additionally include a payment preference field in which a user can specify a method for receiving payment at the conclusion of the pre-FNOL loss assessment procedures and subsequent claim filing. The payment account may be a banking and/or checking account, PayPal® account, Bitcoin account, or the like. Payment, responsive to filing a claim, may come in the form of direct deposit or, in some instances, check. However, in the event of a non-anonymous pre-FNOL loss assessment, such information regarding payment account preference may be previously provided by a user and stored in pre-FNOL system 140.

Alternatively, in the event of an anonymous pre-FNOL loss assessment, in some instances, contact information screen 508 may only present the user with the unique contact control number and further information about the unique control number. As such, information screen 508 may not contain the contact information fields 508A, 508B, and 508C.

After receiving the contact information, pre-FNOL system 140 may proceed to step 306 and analyze the vehicle operation data received in step 202, the responses to the preliminary questions received in step 204, and the detailed damage descriptions and photos received in step 302 in order to determine repair costs for the damages to the vehicle and insurance policy effects associated with filing an insurance claim to cover the determined repair costs. In some instances, the loss assessment analysis may be performed by loss assessment server 160 in conjunction with historical data source server 150 and repair clearinghouse server 170.

For example, upon receiving the vehicle operation data, the responses to the preliminary questions, the user vehicle selection information, and the detailed damage descriptions and photos of the areas of the vehicle damaged in the accident, loss assessment server 160 may generate a loss assessment profile associated with the user who submitted the information. The loss assessment profile may include a loss assessment matrix comprising the data associated with the accident (e.g., vehicle operation data, responses to the preliminary questions, vehicle selection information, and the detailed damages descriptions) and an accident photo gallery including the photos of the areas of the vehicle damaged in the accident.

The loss assessment matrix may be a standardized m-by-n matrix storing the data associated with the accident in numerical form. The data may be entered by the loss assessment server 160 in the order in which the category corresponding to the data is received from mobile device 120 (e.g., vehicle operational data first, responses to the preliminary questions second, user vehicle selection information third, and the detailed damage descriptions fourth). The order in which the data categories are received may further correspond to the row or column of the loss assessment matrix into which the data is entered and stored. In other words, the first category of data received (e.g., vehicle operational data) may occupy the first row or first column of the loss assessment matrix. From there, loss assessment server 160 may enter each individual data item within the first category along the first row or the first column in sequential matrix elements comprised within the first row or the first column. For example, in regards to the received vehicle operational data (e.g., the first category), the first element within the first row or first column may be vehicle velocity at the time of the accident, the second element within the first row or first column may be vehicle acceleration at the time of the accident, the third element within the first row or first column may be the degree of brake activation during the time of the accident, and so on until each of the received data elements within the first category are entered into the first row or first column. After entering each of the received data elements associated with the first category, the loss assessment matrix may enter each of the received data elements within the second, third, and fourth categories in a manner similar to that described above with respect to the first category.

In some instances, the loss assessment matrix may further include a fifth category occupying a fifth row and/or column. The fifth category may be reserved for the type of damage to the vehicle, costs of repairing damages to the vehicle, type of repairs needed to fix the damages to the vehicle, repair completion time, and accompanying insurance policy changes associated with filing a claim to cover the calculated costs of repairing damages to the vehicle. As will be described in further detail below, the loss assessment matrix may also include a sixth category occupying a sixth row and/or column. The sixth category may correspond to instances in which the user is provided with general damage screen 606.

The entry of each data element within the rows or columns of the matrix may be done in accordance with predetermined loss assessment matrix generation guidelines. As such, each of the loss assessment matrices generated by the loss assessment server 160 may be of a standardized format wherein each column and row position corresponds to a specific data element. For example, the first data element of the first row and the first column may correspond to the velocity of the vehicle at the time of the accident in each loss assessment matrix generated by loss assessment server 160. Similarly, as will be discussed in further detail below, each of the loss assessment matrices stored in historical data source database 154 may be of the same standardized format as that of the loss assessment matrices generated by loss assessment server 160 wherein each column and row position corresponds to a specific data element.

In some instances, the data elements within a specific category may be greater or less than the data elements of other categories. For example, the first category (e.g., vehicle operational data) may include 25 data elements, the second category (responses to preliminary questions) may include 7 data elements, the third category (e.g., user vehicle selection information) may include 4 data elements, and the fourth category (e.g., detailed damage descriptions) may include 20 data elements. In such instances, the category with the largest amount of data elements (e.g., the first category) may define the number of columns in the loss assessment matrix or the number of rows in the loss assessment matrix depending on whether or not the data elements are entered in a row or column. Each of the remaining categories with fewer data elements may include naught entries corresponding to the difference in data elements. For example, if the first category has 25 data elements and the second category has 7 data elements, the second category will include 18 naught entries.

Naught entries may also be provided for data expected to be received by loss assessment server 160, but not provided by telematics device 113, on-board computer 115 via vehicle communication systems 114, and/or mobile device 120.

The accident photo gallery may include photos provided by the user through mobile device 120 of the areas of the vehicle damaged in the accident. Upon receipt of the photos, loss assessment server 160 may initially store the photos in one or more folders in the accident photo gallery based on the areas of the vehicle damaged in the photos (e.g., front, rear, driver side, and/or passenger side). Responsive to storing the photos in the one or more folders, loss assessment server 160 may sort the photos of the damaged areas of the vehicle within the one or more folders from a macro scale to micro scale in a manner similar to that of the accordion-type, selectable fields discussed in regards to FIG. 5B and the sub-options included therein.

For example, in the event that the driver side portion of a vehicle was damaged in an accident and photos were provided to loss assessment server 160 capturing the damages to the driver side, the loss assessment server 160 may initially store each of the driver side damage photos in the driver side folder of the accident photo gallery. Responsive to storing the photos, loss assessment server 160 may arrange the photos in the folder from the macro scale (e.g., the one or more photos of the entire driver side of the vehicle) to the micro scale (e.g., the one or more photos of the specific damaged areas of the vehicle on the driver side).

In some instances, the micro scale photos may be arranged behind the macro scale photos according to the number of the option associated with the reported damage. For instance, with respect to the example depicted in FIG. 5B, the photos taken corresponding to option 4 would be ordered ahead of the photos taken corresponding to option 5, which would ordered ahead of the photos taken corresponding to option 6. Through storing and storing the photos in such a fashion, loss assessment server may be able to increase processing speed associated with the calculation of the pre-FNOL loss assessment discussed below.

After loss assessment server 160 has generated the loss assessment matrix and the accident photo gallery of the loss assessment profile for the accident associated with the user, loss assessment server 160 may transmit the generated loss assessment matrix to the historical data source server 150. The historical data source server 150 may compare the loss assessment matrix of the loss assessment profile against the totality of historical loss assessment matrices of historical loss assessment profiles stored in historical data source database 154.

In determining a match and/or a hit of the loss assessment matrix against the totality of the historical loss assessment matrices stored in the historical data source database 154, the historical data source server 150 may identify matches and/or hits based upon the correlation of one or more data elements shared by the matrices. Additionally, the historical data source server 150 may further associate a level of confidence to the overall quality of the match of the loss assessment matrix to each of the matched historical loss assessment matrices based upon the total number of correlated data elements. For example, a correlation of one data element will be given a minimum confidence level, whereas a correlation of each and every data element will be given a maximum confidence level.

In some instances, each of the data elements of loss assessment matrices may be weighted. The weight for each of the data elements may be determined based upon the impact the data element has in determining the cost of repairing damage to the vehicle and accompanying changes to the insurance policy. For example, the data elements associated with the make and model of the vehicle may be weighted more heavily than the data element associated with the level of braking at the time of the accident. The weights associated with each of the data elements may contribute to the determination of the level of confidence to the overall quality of the match of the loss assessment matrix to each of the matched historical loss assessment matrices based upon the total number of correlated data elements. For example, a correlation of one data element associated with a higher weight (e.g., vehicle model) will be given a higher confidence level than a correlation of one data element associated with a lower weight (e.g., level of braking at the time of the accident).

In other instances, each of the data elements of the loss assessment matrices may be associated with two weights. The first weight for each of the data elements may be determined based upon the impact the data element has in determining the cost of repairing damage to the vehicle. The second weight for each of the data elements may be determined based upon the impact the data element has in determining the accompanying changes to the insurance policy. The first weight and the second weight for each data element may be independent of each other. For example, in regards to the data element corresponding to the model of a vehicle, the first weight associated with the cost of repairing damage to the vehicle may be greater than the second weight associated with the accompanying changes to the insurance policy. Similarly, in regards to the data element corresponding to the velocity of the vehicle at the time of accident, the first weight associated with the cost of repairing damage to the vehicle may be less than the second weight associated with the accompanying changes to the insurance policy.

In such instances in which a first and a second weight are associated with each data element of the loss assessment matrices, the historical data source server 150 may determine a first confidence rating for the overall quality of the match of the loss assessment matrix to each of the historical loss assessment matrices based upon the total number of correlated data elements in regards to the cost of repairing the vehicle and a second confidence rating in regards to the accompanying changes to the insurance policy. For example, the loss assessment matrix may be matched against a historical loss assessment matrix based on a correlation of one data element. The data element may be associated with a first weight and second weight, wherein the first weight is greater than the second weight. Accordingly, the first confidence rating in regards to the cost of repairing the vehicle may be greater than the second confidence rating in regards to the accompanying changes to the insurance policy.

The weight(s) associated with each data element of the plurality of data elements comprised within the loss assessment matrices and the confidence level(s) and/or rating(s) associated with the quality of the overall match of the loss assessment matrix to one or more historical loss assessment matrices may be configured to dynamically change over time. The changes may be determined by machine learning algorithms (e.g., Hidden Markov Model, Recurrent Neural Net, etc.) configured to place additional emphasis on the most recent historical loss assessment profile data included in historical data source database 154.

In another example, the historical data source server 150 may perform a preliminary search of the loss assessment matrix against the historical loss assessment matrices stored in the historical data source database 154. Specifically, the historical data source server 150 may conduct a search of the historical loss assessment matrices stored in the historical data source database 154 based on the vehicle make, model, and damage location indicated by the associated data elements within the loss assessment matrix. In the event that a plurality of hits and/or matches are determined, historical data source server 150 may perform a second search of the loss assessment matrix against the preliminarily matched historical loss assessment matrices based on the remainder of the data elements of the loss assessment matrix. The second search may be performed to determine the overall quality of the match of the loss assessment matrix to each of the matched historical loss assessment matrices in the manner described in any of the above-mentioned examples.

After the historical data source server 150 has compared the loss assessment matrix of the loss assessment profile against the totality of historical loss assessment matrices of historical loss assessment profiles stored in historical data source database 154 and has determined one or more matches and/or hits, historical data source server 150 may transmit the historical loss assessment profiles corresponding to the historical loss assessment matrices of the one or more matches and/or hits stored in historical data source database 154 to loss assessment server 160.

In some instances, historical data source server 150 may only transmit historical loss assessment profiles stored in historical data source database 154 including historical loss assessment matrices that are matched against the loss assessment matrix with a specific level of confidence (e.g., 50% confidence, 90% confidence, greater than or equal to 70% confidence, greater than 85% confidence, etc.). In other instances, historical data source server 150 may only transmit historical loss assessment profiles including historical loss assessment matrices comprising a certain amount of matched data elements (e.g., 10 matched data elements, 35 matched data elements, etc.). Alternatively, historical data source server 150 may transmit all historical loss assessment profiles to loss assessment server 160, historical loss assessment profiles with historical loss assessment matrices including data elements corresponding to the make and model comprised within the loss assessment matrix, or historical loss assessment profiles with historical loss assessment matrices including data elements corresponding to the make, model, and damage location (e.g., front, rear, passenger side, driver side) corresponding to the make, model, and damaged location comprised within the loss assessment matrix.

In one example, historical data source server 150 may transmit a first group of historical loss assessment profiles and a second group of historical loss assessment profiles. The first group of historical loss assessment profiles sent by historical data source server 150 to loss assessment server 160 may be associated with the first confidence rating for the overall quality of the match of the loss assessment matrix to each of the historical loss assessment matrices based upon the total number of correlated data elements in regards to the cost of repairing the vehicle. The second group of historical loss assessment profiles sent by historical data source server 150 to loss assessment server 160 may be associated with the second confidence rating for the overall quality of the match of the loss assessment matrix to each of the historical loss assessment matrices based upon the total number of correlated data elements in regards to the accompanying changes to the insurance policy. Historical data source server 150 may only transmit historical loss assessment profiles of the first group and the second group that are matched against the loss assessment matrix with a specific confidence rating (e.g., 50% confidence, 90% confidence, greater than or equal to 70% confidence, greater than 85% confidence, etc.). In other instances, historical data source server 150 may only transmit historical loss assessment profiles of the first and second groups including historical loss assessment matrices comprising a certain amount of matched data elements (e.g., 10 matched data elements, 35 matched data elements, etc.). Alternatively, historical data source server 150 may transmit all historical loss assessment profiles of the first and second groups to loss assessment server 160, historical loss assessment profiles of the first and second groups with historical loss assessment matrices including data elements corresponding to the make and model comprised within the loss assessment matrix, or historical loss assessment profiles of the first and second groups with historical loss assessment matrices including data elements corresponding to the make, model, and damage location (e.g., front, rear, passenger side, driver side) corresponding to the make, model, and damaged location comprised within the loss assessment matrix.

Upon receiving the historical loss assessment profiles from historical data source server 150, loss assessment server 160 may compare the one or more vehicle damage pictures stored in the accident photo gallery to the one or more historical vehicle damage pictures included in the historical accident photo galleries of the historical loss assessment profiles received from historical data source server 150. The comparison may be done through image recognition analysis, pattern recognition analysis, and/or object recognition analysis.

During the comparison, loss assessment server 160 may sequentially compare the vehicle damage pictures stored in the accident photo gallery to each of the historical vehicle damage photos stored in the historical accident photo galleries. The comparison performed by loss assessment server 160 may commence with a comparison of the historical accident photo gallery associated with the historical loss assessment matrix matched with the highest level of confidence by historical data source server 150. In instances in which first and second confidence levels were determined, loss assessment server may base commencement off of the first confidence level (e.g., confidence level associated with calculating the cost of repairing the vehicle). Loss assessment server 160 may perform the comparison by first comparing the macro damage pictures of the front, rear, driver side, and/or passenger side of the user's vehicle to the one or more historical macro damage pictures associated with the corresponding vehicle areas and then comparing the micro damage pictures of the of the specific damage areas of the vehicle within the front, rear, driver side, and/or passenger side to the corresponding vehicle areas with the one or more historical micro damage pictures.

The damage comparison of the macro and micro damage pictures performed through image recognition analysis, pattern recognition analysis, and/or object recognition analysis may generate a match rating corresponding to the overall similarities between the compared macro and micro pictures. Based on the match rating, loss assessment server 160 may determine whether or not an additional damage comparison needs to be performed for the historical accident photo gallery associated with the historical loss assessment matrix matched with the next highest level of confidence. For example, if the match rating exceeds a certain score threshold, loss assessment server 160 may be able to determine that the match is of a quality necessary to provide the user with a high accuracy repair cost estimation (e.g., fixed bid estimate). Conversely, if the match rating does not exceed a certain score threshold, loss assessment server 160 may be able to determine that analysis of the other historical accident photo galleries provided by historical data source server 150 is necessary. In response to such a determination, loss assessment server 160 may proceed to analyze the historical accident photo gallery associated with the historical loss assessment matrix matched with the next highest level of confidence. The loss assessment server 160 may sequentially analyze the historical accident photo galleries in the above-mentioned fashion until a match rating is yielded exceeding the threshold necessary to provide the user with a high-accuracy repair cost estimation.

In some instances, the loss assessment server 160 may perform a first damage comparison to consolidate the historical vehicle damage pictures provided by the historical data source server 150 and a second damage comparison to determine match ratings for the specific historical vehicle damage pictures from the consolidated historical vehicle damage pictures produced by the first damage comparison.

During the first damage comparison, loss assessment server 160 may compare the one or more macro damage pictures of the front, rear, driver side, and/or passenger side of the user's vehicle provided in step 302 to the one or more historical macro damage pictures associated with the corresponding vehicle areas. For example, in the event that the driver side portion of the user's vehicle was damaged in an accident and macro pictures were provided to loss assessment server 160 of the damages to the driver side of the user's vehicle, the first damage comparison performed by loss assessment server 160 may compare each of the macro vehicle driver side damage pictures to each of the historical macro vehicle driver side damage pictures. The loss assessment server 160 may consolidate the number of historical accident photo galleries based on hits and/or matches yielded during the first damage comparison by only adding hit and/or matched historical accident photo galleries to the comparison pool for the second damage comparison.

In some instances, the hits and/or matches yielded during the first damage comparison may be determined based on a correlation of the specific location of damage within the larger area of the vehicle. For example, in the event that the driver side front door of the user's vehicle was damaged in the accident and the macro pictures provided to the loss assessment server 160 captured such damage, hits and/or matches would be determined for macro historical vehicle pictures also indicating damage to the driver side front door. Additionally, and/or alternatively, the hits and/or matches yielded during the first damage comparison may be determined in a piecemeal manner. For example, in the event that driver side front door and the driver side rear tire well of the vehicle were damaged in the accident, loss assessment server 160 may determine one or more matches and/or hits corresponding to the damage to the driver side front door, one or more matches and/or hits corresponding to the damage to the driver side rear tire well, and/or one or more matches and/or hits corresponding to the damage to both the driver side front door and the driver side rear tire well of the vehicle.

Responsive to generating one or more hits and/or matches from the first damage comparison, the loss assessment server 160 may then perform a second damage comparison in which the one or more micro damage pictures of specific areas of the front, rear, driver side, and/or passenger side of the user's vehicle are compared to the one or more historical micro damage pictures associated with the corresponding specific vehicle areas. As stated above, the second damage comparison may be performed against a consolidated list generated by the first damage comparison in order to determine match ratings for the micro pictures. For example, in the event that the driver side front door panel of the user's vehicle was damaged in an accident and micro pictures were provided to loss assessment server 160 of the damages to the driver side front door panel, the second comparison performed by loss assessment server 160 may compare each of the micro vehicle driver side damage pictures to each of the historical micro vehicle driver side damage pictures from the consolidated list.

The second damage comparison performed by loss assessment server 160 may generate match ratings corresponding to the overall similarities between the compared micro pictures. The loss assessment server 160 may analyze each of the generated match ratings to determine which, if any, of the match ratings exceeds a first match rating threshold required for generating a high-accuracy repair cost estimation (e.g., fixed bid estimate). In the event that multiple match ratings exceed the first match rating threshold, loss assessment server 160 may order the historical loss assessment profiles associated with the match ratings based on the level of confidence that the historical loss assessment matrix corresponding to historical loss assessment profile comprising the historical accident photo gallery was given by historical data source server 150 in the loss assessment matrix analysis described above. In instances in which first and second confidence levels were determined by the historical data source server 150, loss assessment server 160 may order the historical loss assessment profiles based off of the first confidence level (e.g., confidence level associated with calculating the cost of repairing the vehicle).

In the event that none of the match ratings exceed the first match rating threshold, loss assessment server 160 may determine which, if any, of the match ratings exceeds a second match rating threshold, less than the first match rating threshold, required for generating a low accuracy repair cost estimation (e.g., upper-bound estimate) as will be described in further detail below. In instances in which multiple match ratings exceed the second match rating threshold, loss assessment server 160 may order the historical loss assessment profiles associated with the match ratings based on the level of confidence the historical loss assessment matrix corresponding to historical loss assessment profile comprising the historical accident photo gallery was given by historical data source server 150 in the loss assessment matrix analysis. In instances in which first and second confidence levels were determined by the historical data source server 150, loss assessment server 160 may order the historical loss assessment profiles based off of the first confidence.

If none of the match ratings exceed either the first or second match rating thresholds, loss assessment server 160 may provide notification to the user requesting pre-FNOL loss assessment that pre-FNOL loss assessment is unable to be determined and that traditional claims processing is necessary. In such instances, loss assessment server 160 may provide the user with a notification similar to that described at step 208.

Responsive to performing the damage comparison of the macro and micro damage pictures and determining one or more matches and/or hits of the macro and micro pictures stored in the accident photo gallery against the historical micro and macro pictures stored in the historical accident photo gallery, loss assessment server 160 may provide the user with a high-accuracy pre-FNOL loss assessment. In providing the user with the high-accuracy pre-FNOL loss assessment, loss assessment server 160 may extract repair data from the fifth category occupying the fifth row and/or column of the historical loss assessment matrix corresponding to the matched and/or hit historical accident photo gallery.

For example, after generating a match rating for a historical accident photo gallery exceeding the threshold necessary to provide the user with a high-accuracy repair cost estimation, loss assessment server 160 may extract data from the historical loss assessment matrix corresponding to the historical accident photo gallery associated with the generated match rating. The data extracted from the historical loss assessment matrix may be repair data stored in the fifth category occupying the fifth row and/or column of the historical loss assessment matrix. Specifically, loss assessment server 160 may extract repair data corresponding to the type of damage to the vehicle (e.g., damage to the driver side front door window of the vehicle, damage to the rear left taillight of the vehicle, etc.), calculated costs of repairing damages to the vehicle (e.g., repair costs associated with fixing the damage to the driver side front door window of the vehicle, repair costs associated with fixing the damage to the rear left taillight of the vehicle, etc.), repair time needed to fix the damages to the vehicle (e.g., amount of time required to repair the driver side front door window and the rear left taillight of the vehicle, etc.), and type of repairs needed to fix the damages to the vehicle (e.g., replacement of power window mechanism of the driver side front door window of the vehicle, replacement of rear left taillight of the vehicle, etc.).

In some instances, after extracting the above-mentioned repair data, loss assessment server 160 may further analyze the historical loss assessment matrix corresponding to the extracted data in order to determine a year associated with the accident detailed by the historical loss assessment profile comprising the historical loss assessment matrix. Responsive to determining the year associated with the accident, loss assessment server 160 may adjust the associated repair costs to account for inflation.

Additionally and/or alternatively, loss assessment server 160 may perform a part availability and cost analysis in relation to the type of repairs needed to fix the vehicle. Such an analysis may be performed with respect to vehicles in excess of 10 years old. For example, in the event that the user's vehicle is a 1995 Volvo 850 which sustained damage to the rear bumper during an accident requiring replacement of the bumper, loss assessment server may perform an analysis of the availability of 1995 Volvo 850 rear bumpers and the costs associated therein. Responsive to performing such an analysis, in some instances, loss assessment server 160 may determine that the part required to repair the damage to the vehicle is unavailable. In such instances, loss assessment server 160 may perform a further analysis to determine whether or not the unavailable part is interchangeable with a coinciding part with a more contemporary vehicle of the same make. If the coinciding part of a more contemporary vehicle is determined to be interchangeable, loss assessment server 160 may determine a cost associated with the corresponding part as well as the labor costs associated with installing the coinciding part. However, if the coinciding part of a more contemporary vehicle is not determined to be interchangeable, loss assessment server 160 may perform an additional analysis to determine if the vehicle should be written off. Alternatively, the loss assessment server 160 may provide notification to the user requesting pre-FNOL loss assessment that pre-FNOL loss assessment is unable to be determined and that traditional claims processing is necessary. In such instances, loss assessment server 160 may provide the user with a notification similar to that described at step 208.

After extracting the repair data from the historical loss assessment matrix, loss assessment server 160 may incorporate the extracted repair data into the fifth category occupying the fifth row and/or column of the loss assessment matrix corresponding to the loss assessment profile associated with the user. The incorporated repair data may comprise the adjusted repair costs to account for inflation, the applicability of using an interchangeable part and the costs associated therein, and the costs associated with installing the interchangeable part.

Upon incorporating the extracted repair data from the historical loss assessment matrix into the loss assessment matrix corresponding to the loss assessment profile of the user, loss assessment server 160 may then determine the accompanying insurance changes associated with filing a claim to cover the vehicle repair costs. In one example, loss assessment server 160 may determine the accompanying insurance changes based on the insurance change data stored in the historical loss assessment matrix associated with the historical accident photo gallery from which the repair costs were determined. In such an example, the loss assessment server 160 determine an insurance premium percentage increase for the historical loss assessment profile and apply a similar insurance premium percentage increase to an insurance premium corresponding to the loss assessment profile of the user.

In another example, the loss assessment server 160 may determine the accompanying insurance changes associated with filing a claim to cover the vehicle repair costs based upon an analysis of the historical loss assessment profiles sent by historical data source server 150 included within the second group associated with the second confidence rating corresponding to the accompanying changes to the insurance policy. During the analysis, loss assessment server 160 may calculate an insurance premium percentage increase for the historical loss assessment profile of the second group associated with the highest second confidence rating. The loss assessment server 160 may then apply a similar insurance premium percentage increase to an insurance premium corresponding to the loss assessment profile of the user.

In either scenario, after determining the accompanying insurance policy changes associated with filing a claim to cover the vehicle repair costs, loss assessment server 160 may incorporate the determined accompanying insurance policy changes into the fifth category occupying the fifth row and/or column of the loss assessment matrix corresponding to the loss assessment profile associated with the user.

Upon determining the repair costs and accompanying insurance policy changes, loss assessment server 160 may provide the determined repair costs and the accompanying insurance policy changes to the user. Loss assessment server 160 may transmit the determined repair costs and the accompanying insurance policy changes to the user via email and/or text message to the email address and/or the phone number provided by the user at step 304 through contact information screen 508. Additionally and/or alternatively, loss assessment server 160 may be configured to transmit the determined repair costs and the accompanying insurance policy changes to the user via a pre-FNOL loss assessment application operating on mobile device 120 of the user and/or a pre-FNOL loss assessment web application being accessed by an internet browser application operating on mobile device 120.

In instances in which loss assessment server 160 transmits the determined repair costs and the accompanying insurance policy changes to the user via a pre-FNOL loss assessment application and/or a pre-FNOL loss assessment web application, the user may be presented with loss assessment completion screen 510 shown in FIG. 5C. The loss assessment completion screen 510 may include repair cost field 510A, repair time field 510B, premium impact field 510C, "Save for Later" button 510D, and "File a Claim" button 510E.

The repair cost field 510A may include the determined repair cost of the vehicle, the user's deducible, and the claim payment amount (e.g., the numerical difference between the cost of repair and the deductible) if a claim were to be filed. In regards to the determined repair cost of the vehicle, there may be an option for the user to "View Details" regarding the determined repair costs. After user selection of the "View Details" option, loss assessment server 160 may provide the user with an itemized breakdown of the damages and the costs related thereto including the type of damage to the vehicle, calculated costs of repairing damages to the vehicle, and type of repairs needed to fix the damages to the vehicle.

In regards to the user's deductible, depending on whether or not the user previously provided login information associated with an insurance policy account of the user, the deductible may be a filled entry as shown in loss assessment completion screen 510 or the deductible may be a fillable entry (not shown). For example, in the event that the user has not previously provided insurance account login information to pre-FNOL system 140, the user may be able and/or required to type in their deducible into the deductible area of repair cost field 510A. Alternatively, in instances in which the user has previously provided insurance account login information to pre-FNOL system 140, the loss assessment server 160 may embed the deductible associated with the user's insurance account into the repair cost field 510A. Additionally, there may be a selectable "View Policy" option that the user may be able to select in order to receive detailed information regarding the user's insurance policy. After user selection of the "View Policy" option, loss assessment server 160 may provide the user with detailed information about the user's insurance policy. In some instances, loss assessment server 160 may also provide the contact information of the user's insurance agent so that the user may discuss their insurance plan with the agent.

In instances in which the user has not previously provided insurance account login information to pre-FNOL system 140, the loss assessment server 160 may prompt the user to provide insurance account login information and/or to enter their deductible before calculating the claim payment amount. As will be discussed in further detail below, the user may be required to provide login information associated with their insurance account in order to be able to file a claim to cover the determined repairs costs.

The repair time field 510B may include an estimated repair completion time associated with the time estimated for repairing the damage to the user's vehicle and a user-selectable "Find a Repair Shop" option. The estimated repair completion time may be determined by loss assessment server 160 by extracting the completed repair time from the historical loss assessment matrix used in determining the repair costs for the vehicle. In some instances, as will be discussed below, the estimated repair completion time may be dependent on the user's selection of a repair shop under the "Find a Repair Shop" option.

The "Find a Repair Shop" option may be a user-selectable option that, when selected, causes loss assessment server 160 to transmit the user's loss assessment profile to repair clearinghouse server 170. Upon receipt of the user's loss assessment profile, repair clearinghouse server 170 may extract geographical location information corresponding to the user and may generate a map through the pre-FNOL loss assessment application operating on mobile device 120 of the user and/or a pre-FNOL loss assessment web application being accessed by an internet browser application operating on mobile device 120. The geographical location associated with the mobile device 120 of the user may be used by repair clearinghouse server 170 to localize the map corresponding to the user's geographical location. Additionally, repair clearinghouse server 170 may render one or more pins on the map corresponding to repair shops in the user's immediate area based on the user's geographical location. Each of the pins associated with a particular repair shop may be a user-selectable pin. Once selected, repair clearinghouse server 170 may generate a repair shop specific screen on the pre-FNOL loss assessment application and/or the pre-FNOL loss assessment web application. The repair shop specific screen may provide data about the repair shop such as an address, telephone number, pictures of the repair shop, pictures of repair shop employees, types of services performed by the repair shop, and the like. Furthermore, the repair shop specific screen may display a rating and comment section wherein patrons of the repair shop may provide feedback and a repair shop availability schedule. Through the repair shop availability schedule, a user may be able to see the repair shop's availability, forecast a repair completion time for the type of repairs needed, and schedule a repair with the repair shop.

In regards to forecasting a repair completion time, repair clearinghouse server 170 may associate the repair cost with one of three colors corresponding to an estimated time range needed to perform repairs based on the determined repair cost. For example, if the repair cost of the vehicle is less than or equal to $3,000, repair clearinghouse server 170 may associate the repair cost with the color green, if the repair cost is greater than $3,000 but less than or equal to $6,000, repair clearinghouse server 170 may associate the repair cost with the color yellow, and if the repair cost is greater than $6,000, repair clearinghouse server 170 may associate the repair cost with the color red. Each of the repair colors (e.g., green, yellow, and red) may be associated with a time of repair completion range. For instance, green repairs may be associated with a range of one to ten days, yellow repairs may be associated with a range of ten to 25 days, and red repairs may be associated with a range of 25 to 50 days.

Additionally, each of the repair shops may list availability based on the repair colors (e.g., green, yellow, and red). For example, a repair shop proximate to the user's geographical location may have ten slots per month available for green repairs, seven slots per month available for yellow repairs, and two slots per month available for red repairs. The forecasted repair completion time for each of the respective repair colors may vary within the approximate ranges based on the number of vehicles associated with the specific color currently undergoing repair and/or scheduled to be repaired. For example, if a vehicle determined as a green repair schedules a repair at a repair shop with no green repairs underway and/or scheduled, the forecasted repair completion time may be one day. Conversely, if a vehicle determined as a green repair schedules a repair at a repair shop with no green repairs underway but six green repairs scheduled ahead of the vehicle, the forecasted repair completion time may be six days. Thus, responsive to scheduling a repair with a repair shop, the repair time field 510B of screen 510 may indicate a repair completion time specific to the repair shop.

In some instances, the "Find a Repair Shop" option may be a user-selectable option that, when selected, causes repair clearinghouse server 170 to generate a sortable list through the pre-FNOL loss assessment application operating on mobile device 120 of the user and/or a pre-FNOL loss assessment web application being accessed by an internet browser application operating on mobile device 120. The sortable list may display each of the repair shops within the geographical location associated with the mobile device 120 of the user, starting with the nearest repair shop to the geographical location associated with the mobile device 120 and terminating with the repair shop furthest from the geographical location associated with the mobile device 120. The user of mobile device 120 may be able to sort the repair shop data comprised within the sortable list based on factors such as highest repair ranking, nearest location, repair color availability, and the like. In some instances, the user may be able to toggle between the map interface and the sortable list interface.

The premium impact field 510C may include insurance policy update information that a user may expect responsive to filing a claim to cover the determined repair costs. In particular, the premium impact field 510C may include the six month total premium cost and the expected rate increase of the insurance premium. The calculation of the six month total premium cost and the expected rate increase of the insurance premium may depend on whether or not the user previously provided login information associated with an insurance policy account of the user. For example, in the event that the user has not previously provided insurance account login information to pre-FNOL system 140, the user may be able and/or required to provide login information associated with an insurance account covering the damaged vehicle in order to receive the premium increase calculations. Alternatively, the user may be able to enter their current six month premium cost information into field 510C and loss assessment server 160 may be able to calculate the six month premium changes based on the user entered six month premium cost information.

Additionally, in the premium impact field 510C, there may be a selectable "Learn More" option that the user may be able to select in order to receive detailed information regarding the cost increases to the user's insurance premium. After user selection of the "Learn More" option, loss assessment server 160 may provide the user with detailed information about the user's insurance policy and the cost increases to the user's insurance premium. In some instances, loss assessment server 160 may provide the contact information of the user's insurance agent so that the user may discuss cost increases to the user's insurance premium associated with filing a claim.

At the bottom of loss assessment completion screen 510 there may be a "Save for Later" user-selectable button 510D and a "File a Claim" user-selectable button 510E. Responsive to a user selection of the "Save for Later" button 510D, loss assessment server 160 store the information shown in fields 510A, 510B, and 510C for later review by the user. Additionally, loss assessment server 160 may indicate a time period in which the captured repair cost information and accompanying insurance policy change information will be held. The loss assessment server 160 may further indicate to the user that after expiration of the time period, the captured repair cost information and accompanying insurance policy change information may change.

At step 308, responsive to a user selection of the "File a Claim" button 510E, loss assessment server 160 may determine whether or not the user has previously logged into an insurance account associated with the damaged vehicle. In the event that the user has previously logged into the insurance account, loss assessment server 160 may provide claim payment equivalent to the claim payment amount shown in field 510A (e.g., the difference between the user's deductible and the determined repair costs). The claim payment may be provided to the user in the manner specified by the user through the payment preference field (e.g., through direct deposit to a banking and/or checking account, PayPal® account, Bitcoin account, or the like). Depending on the user specified preference, in some instances, the loss assessment server 160 may facilitate payment in the form of a check.

In some instances, after the user has selected the "File a Claim" button 510E and payment has been provided to the user by loss assessment server 160, repair clearinghouse server 170 may provide the user with the sortable list and/or map of repair shops proximate to the geographical location associated with the mobile device 120 of the user. The presentation of the sortable list and/or map of repair shops and the functionality related therein may be similar to that described above in regards to the user selection of the "Find a Repair Shop" option. Alternatively, in the event that the user previously selected a specific repair shop at which to repair the damages to their vehicle, repair clearinghouse server 170 may not provide the user with the sortable list and/or map of repair shops.

Additionally, after the user has selected the "File a Claim" button 510E and selected a repair shop, repair clearinghouse server 170 may extract the user's response to field 502B of screen 502 in FIG. 5A regarding the drivability of the user's vehicle. In the event that the user has responded that the user's vehicle is not driveable, repair clearinghouse server 170 may provide the user with a sortable list and/or map of tow truck companies proximate to the geographical location associated with the mobile device 120 of the user. The presentation of the sortable list and/or map of tow truck companies and the functionality related therein may be similar to that described above in regards to the user selection of the "Find a Repair Shop" option. Furthermore, repair clearinghouse sever 170 may also provide the user with a sortable list and/or map of rental car agencies proximate to the user's geographical location. In some instances, the repair clearinghouse server 170 may enable the user to populate the sortable list and/or map with both rental car agencies and tow truck companies proximate to the user. The presentation of the sortable list and/or map of rental car agencies and the functionality related therein may be similar to that described above in regards to the user selection of the "Find a Repair Shop" option.

Figure 4:
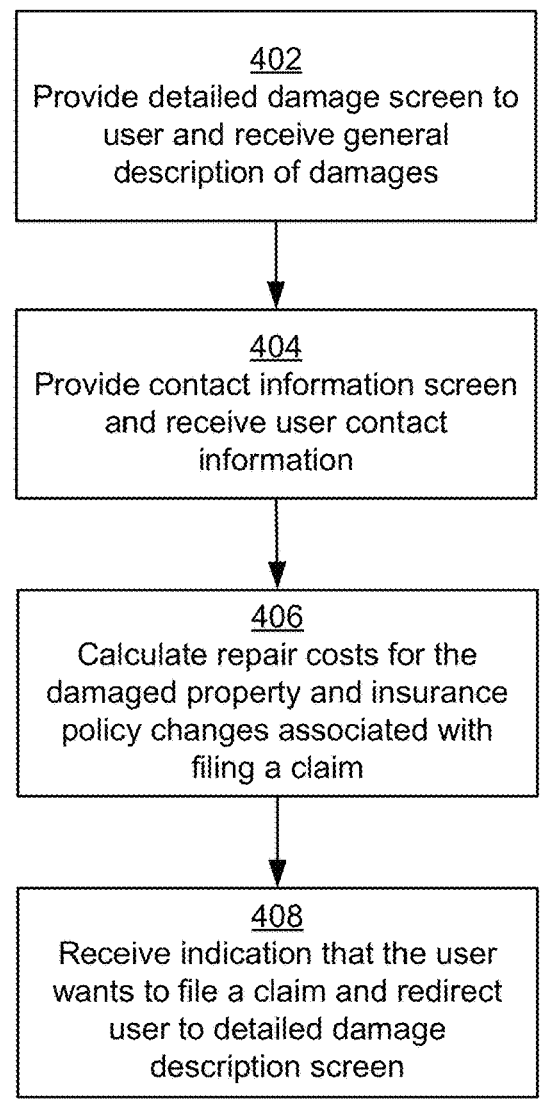
FIG. 4 depicts a low accuracy flow chart for the pre-FNOL loss assessment method of FIG. 2 according to one or more aspects of the present disclosure.

Alternatively, in the event that the user has selected a low accuracy pre-FNOL loss assessment (e.g., less accurate anticipated repair cost and/or upper bound repair cost) at step 216 of the pre-FNOL loss assessment method shown in FIG. 2, the pre-FNOL system 140 may proceed to step 402 of the low accuracy pre-FNOL loss assessment method shown in FIG. 4. In some instances, the user may not need to be logged in to an account of an associated insurance provider in order to receive a low accuracy pre-FNOL loss assessment. However, in other instances, the user may need to be logged in to an account of an associated insurance provider in order to receive a low accuracy pre-FNOL loss assessment.

At step 402, the pre-FNOL system 140 may provide the general damage description screen 606, as shown in FIG. 6A, to the mobile device 120 of the driver of vehicle 110 regarding the accident. The general damage description screen 606 may include a damage level selection field 606A and an estimated speed at time of impact field 606B.

The damage level selection field 606A may present the user with a plurality of historical vehicle damage photos. The historical vehicle damage photos presented to the user may be reproduced from one or more of the historical accident photo galleries stored in the historical data source database 154 of historical data source server 150. In the example shown in general damage description screen 606, pre-FNOL system 140 may present the user with three historical damage photos. Each of the three historical damage photos presented to the user may correspond to a different damage level. For example, the first historical damage picture may correspond to a first damage level, the second historical damage picture may correspond to a second damage level greater than the first damage level, and the third historical damage picture may correspond to a third damage level greater than the first and second damage levels. Additionally, each of the first, second, and third damage level pictures may be accompanied with a short text segment providing further description of the particular damage level of which it accompanies. In some instances, the historical damage pictures may be of a random make and model, while in other instances, the historical damage pictures may be of the make and model of the user's vehicle.

In another example, pre-FNOL damage system 140 may present the user with a plurality of rounds of historical vehicle damage pictures. The first round of historical vehicle damage pictures may include three historical damage pictures associated with the three most common types of vehicle accidents. For example, the first historical damage picture may be of damage to the rear portion of the vehicle, the second historical damage picture may be of damage to the front portion of the vehicle, and the third historical vehicle damage picture may be of damage to a side of the vehicle. Alternatively, the first round of historical vehicle damage pictures may include three historical damage pictures associated with the three most commonly selected historical vehicle damage pictures. As such, the first round of pictures presented to the user may change over time responsive to user input. In either instance, the damage level selection field 606A may further include a user-selectable "Damage Not Listed" button that, if selected by the user, causes pre-FNOL system 140 to display three new historical vehicle damage pictures corresponding to either the next three most common types of vehicle accidents or the next three most commonly selected vehicle damage pictures.

After the user selection of one or more of the displayed historical damage pictures in the first round, pre-FNOL system 140 may present the user with a second round of historical vehicle damage pictures. The three historical vehicle damage pictures comprised within the second round of historical vehicle damage pictures may be determined by pre-FNOL system 140 based on the user's one or more historical vehicle damage picture selections from the first round. For example, in the event that the first round of historical damage pictures included historical damage pictures associated with the three most common types of vehicle accidents and the user selected a historical vehicle damage picture depicting damage to the rear of a vehicle, pre-FNOL system 140 may present the user with three historical damage pictures in the second round corresponding to a variance of damage location within the rear location of the vehicle. For instance, the three historical damage pictures presented to the user in the second round may depict damage to the bumper of a vehicle, back windshield of a vehicle, taillight of a vehicle, and the like. In some instances, the three historical damage pictures presented to the user in the second round may correspond to the three most commonly damaged areas of the vehicle corresponding to the type of accident in which the vehicle was involved. Furthermore, the damage level selection field 606A may still include the user-selectable "Damage Not Listed" button that, if selected by the user, causes pre-FNOL system 140 to display three new historical vehicle damage pictures corresponding to either three new areas of vehicle damage within the larger area of the vehicle or the next three most commonly damaged areas of the vehicle within the larger vehicle area.

Similarly, in the event that the first round of historical damage pictures included the three most commonly selected historical damage pictures, pre-FNOL system 140 may present the user with three historical damage pictures in the second round that are most commonly selected by users in relation to their selection of one or more pictures in the first round. For example, in the event that the user selected a historical damage picture depicting damage to the front of a vehicle in the first round, pre-FNOL system 140 may present the user with three historical damage pictures in the second round of the most commonly selected historical vehicle damage pictures corresponding to the front of the vehicle. For instance, the historical damage pictures presented to the user in the second round may correspond to damage areas within the front portion of the vehicle most commonly selected by users (e.g., hood, front bumper, headlight, etc.). In some instances, a user selection of the user-selectable "Damage Not Listed" button may cause pre-FNOL system 140 to display three new historical vehicle damage pictures corresponding to the next three most commonly selected historical vehicle damage pictures in relation to the one or more historical vehicle damage pictures selected by the user in the first round.

In some instances, the rounds may be further associated with a historical vehicle damage theme. For example, the first round of historical vehicle damage photos may be concerned with ascertainment of a macro damage location (e.g., front of vehicle, rear of vehicle, driver side of vehicle, passenger side of vehicle). The second round of historical vehicle damage pictures may be concerned with the ascertainment of a micro damage location within the greater macro damage location determined in the first round. A third round of historical damage pictures may be concerned with the ascertainment of a level of damage to the micro area of the greater macro area determined in the first and second rounds. In some instances, the historical vehicle damage themes may be presented in multiple rounds depending on user selections of the historical vehicle damage pictures. For example, the determination of the macro damage location may occur across the first and second rounds, the determination of the micro damage location within the macro damage location may occur across the third and fourth rounds, and the determination of the level of damage to the micro location within the macro location may occur in the fifth and sixth rounds.

Pre-FONL system 140 may provide the user with rounds of historical damage pictures until a certain level of confidence is reached based the user selections required to provide the user with a low accuracy pre-FNOL loss assessment. As such, the user may be provided with a plurality of rounds of historical damage pictures (e.g., one round, two rounds, five rounds, etc.) wherein each round is associated with a particular amount of confidence points (e.g., 1 point, 3 points, etc.). The amount of points awarded per round may increase, decrease, or remain constants. Additionally and/or alternatively, each of the historical damage pictures included with each round may be associated with different confidence point amounts. For example, a first historical damage picture in the first round may be associated with 1 confidence point, a second historical damage picture in the first round may be associated with 3 confidence points, and the third historical damage picture in the first round may by associated with 2 confidence points. The pre-FNOL system 140 may provide the user with rounds of historical damage photos until a particular confidence level (e.g., particular confidence point tally) is reached. The confidence point tally may be 10 points, 15 points, 30 points, etc.

Once the user has surpassed the necessary point tally required to perform the low accuracy loss assessment, pre-FNOL system 140 may cease to provide the user with additional rounds of historical damage pictures. However, in some instances, pre-FNOL system 140 may provide a message to the user upon reaching the necessary point tally associated with performing the low accuracy pre-FNOL loss assessment inquiring whether or not the user would like to provide responses to additional rounds of historical damage pictures in order to be able to receive a high accuracy loss assessment. Upon receiving a user response in the affirmative, pre-FNOL system 140 may provide additional rounds of historical loss assessment pictures until a confidence point tally is reached associated with performing a high accuracy loss assessment. The confidence point tally associated with performing the high accuracy loss assessment may be 20 points, 30 points, 60 points, etc.

Regardless of whether the user performs a low accuracy pre-FNOL loss assessment or a high accuracy pre-FNOL via the general damage description screen 606, pre-FNOL system 140, in some instances, may require a user to provide one or more photos of areas of their vehicle damaged in accident responsive to the user surpassing the confidence point tally associated with the either the low or high accuracy assessment. The one or more accident pictures provided by the user may be utilized by pre-FNOL system 140 to determine if the user has selected historical damage pictures corresponding to the damages of their vehicle.

Furthermore, general damage description screen 606 may include estimated speed at time of impact field 606B. The estimated speed at time of impact field 606B may be a dropdown field which, when selected, provides the user with a plurality of velocity values from which to choose (e.g., 0 mph, 20 mph, 60 mph, etc.). In some instances, the user may be prompted with the estimated speed at time of impact field 606B prior to the historical damage pictures are provided to the user. Thus, pre-FNOL system 140 may be able to provide the user with historical vehicle damage pictures associated with the velocity of the user's vehicle at the time of the accident and, as such, provide the user with more accurate historical damage pictures.

In some instances, general damage description screen 606 may include a plurality of additional dropdown fields similar to that of estimated speed at time of impact field 606B. Such dropdown fields may include a macro vehicle damage location field (e.g., front, rear, driver side, passenger side), a type of vehicle accident field (frontal collision, rear end collision, T-bone collision, etc.), and the like. Based upon the user's selections to the questions put forth by the additional dropdown fields, pre-FNOL system 140 may be able to provide the user with historical damage pictures more efficiently and accurately.

Alternatively, in instances in which pre-FNOL system 140 received vehicle operational data at step 202 including data corresponding to the vehicle velocity at the time of the accident, pre-FNOL system 140 may not include estimated speed at time of impact field 606B in general damage description screen 606. Instead, pre-FNOL system 140 may only include the plurality of additional dropdown fields described above (e.g., macro vehicle damage field, type of vehicle accident field, and the like).

In any event, after receiving the general damage information, pre-FNOL system 140 may proceed to step 404 and provide the user with contact information screen 608 as shown in FIG. 6B. The contact information screen 608 may be similar to that of contact information screen 508 as described in detail above. Accordingly, contact information screen 608 may include fields 608A, 608B, and 608C wherein a user can provide contact information such as an email address and a phone number. In some instances, the user may be required to confirm the email address and phone number by providing a second entry matching that of the first entry.

In the event of a non-anonymous pre-FNOL loss assessment in which the user has previously provided login credentials associated with an insurance account, the user may not be presented with screen 608 and not required to provide the required contact information denoted by fields 608A, 608B, and 608C. However, in some instances, the user may be required to provide the contact information stipulated by screen 608 regardless of whether or not a non-anonymous pre-FNOL loss assessment is being conducted. In the event of an anonymous pre-FNOL loss assessment, the user may be presented with screen 608 and required to provide the required contact information denoted by fields 608A, 608B, and 608C.

In some instances, contact information screen 608 may additionally include a payment preference field in which a user can specify a method for receiving payment at the conclusion of the pre-FNOL loss assessment procedures and subsequent claim filing. The payment account may be a banking and/or checking account, PayPal® account, Bitcoin account, or the like. Payment, responsive to filing a claim, may come in the form of direct deposit or, in some instances, check. However, in the event of a non-anonymous pre-FNOL loss assessment, such information regarding payment account preference may be previously provided by a user and stored in pre-FNOL system 140.

After receiving the contact information, pre-FNOL system 140 may proceed to step 406 and analyze the vehicle operation data received in step 202, the responses to the preliminary questions received in step 204, the vehicle selection data received in step 212 (or the vehicle profile data received in step 214), and the general damage descriptions received in step 402 in order to determine repair costs for the damages to the vehicle and insurance policy effects associated with filing an insurance claim to cover the determined repair costs. In some instances, the loss assessment analysis may be performed by loss assessment server 160 in conjunction with historical data source server 150 and repair clearinghouse server 170.

For example, upon receiving the vehicle operational data, the responses to the preliminary questions, the user vehicle selection information (or the vehicle profile information), and the general damage descriptions of the vehicle damaged in the accident, loss assessment server 160 may generate a loss assessment profile associated with the user who submitted the information. The loss assessment profile may include a loss assessment matrix comprising the data associated with the accident (e.g., vehicle operation data, responses to the preliminary questions, vehicle selection information, and the detailed damages descriptions) and an accident photo gallery including the photos of the areas of the vehicle damaged in the accident.

The loss assessment matrix produced by loss assessment server 160 may be similar to the loss assessment matrices described above. However, in regards to the fourth category occupying the fourth row or column, which corresponds to the detailed damage description data, loss assessment server 160 may insert naught entries for each of the data elements. Instead, loss assessment server 160 may fill the sixth category occupying the sixth row or column with data provided by the user via general damage description screen 606. Loss assessment server 160 may enter each individual data item within the sixth category along the sixth row or the sixth column in sequential matrix elements comprised within the sixth row or the sixth column. In the first element within the sixth row or column, loss assessment server 160 may enter data corresponding to the estimated speed at time of impact field 606B. In the event that such data was previously received at step 202, loss assessment server 160 may enter a naught entry in the first element. Next, loss assessment server 160 may enter data corresponding to the additional dropdown fields in sequential data elements. In instances in which such fields are not provided to the user in general damage screen 606, loss assessment server 160 may enter naught entries for those data elements. In regards damage level selection field 606A, loss assessment server may enter a numerical identifier associated with each chosen historical vehicle damage picture in sequential data elements.

After loss assessment server 160 has created the loss assessment matrix, loss assessment server may create an accident photo gallery for the loss assessment profile of the user. In the accident photo gallery, loss assessment server 160 may include the one or more vehicle damage pictures provided by the user after the confidence point tally for either of the low accuracy pre-FNOL loss assessment or high accuracy pre-FNOL loss assessment has been reached.

Upon generation of the loss assessment matrix and the accident photo gallery of the loss assessment profile associated with the user, loss assessment server 160 may provide the loss assessment matrix to historical data source server 150. The historical data source server 150 may compare the loss assessment matrix of the loss assessment profile against the totality of historical loss assessment matrices of historical loss assessment profiles stored in historical data source database 154.

Historical data source server 150 may perform a first comparison of the loss assessment matrix against the totality of the historical loss assessment matrices stored in the historical data source database 154 in regards to the repair costs associated with repairing damages to the user's vehicle and a second comparison of the loss assessment matrix against the totality of the historical loss assessment matrices 154 in regards to the accompanying insurance policy changes associated with filing a claim to cover the repair costs.

In the first comparison, historical data source server 150 may compare the numerical identifiers corresponding to the first and last historical vehicle damage picture selections of the user during the presentation of historical vehicle damage pictures by damage level selection field 606A. In determining a match and/or a hit of the loss assessment matrix against the totality of the historical loss assessment matrices stored in the historical data source database 154 during the first comparison, the historical data source server 150 may identify matches and/or hits based on the correlation of the numerical identifier corresponding to either the first and/or last user selected historical vehicle damage picture. As such, historical data source server 150 may determine one or more hits and/or matches corresponding to the first numerical identifier, one or more hits and/or matches corresponding to the last numerical identifier and, in some instances, one or more hits corresponding to the first and last numerical identifiers.

In the second comparison, historical data source server 150 may perform a comparison of the loss assessment matrix against each of the plurality of loss assessment matrices in the manner described above in regards to the high accuracy pre-FNOL loss assessment. For example, historical data source server 150 server may compare each data element comprised in the loss assessment matrix against each and data element comprised within each of the historical loss assessment matrices. Each of the data elements comprised within the loss assessment matrix may be associated with a weight corresponding to the effect the particular data element has in determining the insurance policy increases associated with filing a claim to cover the determined repair costs. The weight associated with each of the data elements may contribute to the determination of the level of confidence to the overall quality of the match of the loss assessment matrix to each of the matched historical loss assessment matrices based upon the total number of correlated data elements. For example, a correlation of one data element associated with a higher weight will be given a higher confidence level than a correlation of one data element associated with a lower weight.

Responsive to performing the first and second comparisons, historical data source server 150 may transmit the historical loss assessment profiles corresponding to the matches and/or hits determined during the first and second comparisons to loss assessment server 160 in order for the repair costs and the accompanying insurance policy changes to be determined. Upon receiving the historical loss assessment profiles, loss assessment server 160 may extract the repair cost data from each of the historical loss assessment matrices comprising the numerical identifier corresponding to the first user selected historical vehicle damage picture and repair cost data from each of the historical loss assessment matrices comprising the numerical identifier corresponding to the last user selected historical vehicle damage picture. In determining the repair cost data, the loss assessment server 160 may take the average of the repair cost data extracted from each of the historical loss assessment matrices comprising the numerical identifier corresponding to the first user selected historical vehicle damage picture. Additionally, loss assessment server 160 may take the average of the repair cost data extracted from each of the historical loss assessment matrices comprising the numerical identifier corresponding to the last user selected historical vehicle damage picture. Responsive to producing the averaged repair cost data corresponding to the first and last user selected historical vehicle damage pictures, loss assessment server 160 may create a repair cost range.

After extracting the repair cost data from each of the historical loss assessment matrices and determining the repair cost range, loss assessment server 160 may incorporate the extracted repair cost data into the fifth category occupying the fifth row and/or column of the loss assessment matrix corresponding to the loss assessment profile associated with the user. The incorporated repair data may comprise the adjusted repair costs to account for inflation, the applicability of using an interchangeable part and the costs associated therein, and the costs associated with installing the interchangeable part.

Upon incorporating the extracted repair data from the historical loss assessment matrix into the loss assessment matrix corresponding to the loss assessment profile of the user, loss assessment server 160 may then determine the accompanying insurance changes associated with filing a claim to cover the vehicle repair costs. In one example, the loss assessment server 160 may determine the accompanying insurance changes associated with filing a claim to cover the vehicle repair costs based upon an analysis of the historical loss assessment profiles sent by historical data source server 150 according to the second comparison. During the analysis, loss assessment server 160 may calculate an insurance premium percentage increase for the historical loss assessment profile of the second comparison with the highest confidence rating. Next, loss assessment server 160 may calculate an average insurance premium increase based on the insurance premium data included in each of the historical loss assessment profiles provided by historical data source server 150. After determining the range of accompanying insurance policy changes associated with filing a claim to cover the vehicle repair costs, loss assessment server 160 may incorporate the determined range of accompanying insurance policy changes into the fifth category occupying the fifth row and/or column of the loss assessment matrix corresponding to the loss assessment profile associated with the user.

Responsive to determining the repair costs and accompanying insurance policy changes, loss assessment server 160 may provide the determined repair cost range and the range of accompanying insurance policy changes to the user. Loss assessment server 160 may transmit the determined repair costs and the accompanying insurance policy changes to the user via email and/or text message to the email address and/or the phone number provided by the user at step 404 through contact information screen 608. Additionally and/or alternatively, loss assessment server 160 may be configured to transmit the determined repair costs and the accompanying insurance policy changes to the user via a pre-FNOL loss assessment application operating on mobile device 120 of the user and/or a pre-FNOL loss assessment web application being accessed by an internet browser application operating on mobile device 120.

In instances in which loss assessment server 160 transmits the determined repair costs and the accompanying insurance policy changes to the user via a pre-FNOL loss assessment application and/or a pre-FNOL loss assessment web application, the user may be presented with loss assessment completion screen 610 shown in FIG. 6B. The loss assessment completion screen 610 may include repair cost range field 610A, repair time range field 610B, premium impact range field 610C, "Save for Later" button 610D, and "File a Claim" button 610E.

The repair cost field 610A may include the determined repair cost range of the vehicle, the user's deducible, and the claim payment range (e.g., the numerical difference between the upper and lower bounds of the cost of repair range and the deductible) if a claim were to be filed. In regards to the user's deductible, depending on whether or not the user previously provided login information associated with an insurance policy account of the user, the deductible may be a filled entry or the deductible may be a fillable entry as shown in loss assessment completion screen 610. For example, in the event that the user has not previously provided insurance account login information to pre-FNOL system 140, the user may be able and/or required to type in their deductible into the deductible area of repair cost field 610A. Alternatively, in instances in which the user has previously provided insurance account login information to pre-FNOL system 140, the loss assessment server 160 may embed the deductible associated with the user's insurance account into the repair cost field 610A.

In instances in which the user has not previously provided insurance account login information to pre-FNOL system 140, the loss assessment server 160 may prompt the user to provide insurance account login information and/or to enter their deductible before calculating the claim payment amount. As will be discussed in further detail below, the user may be required to provide login information associated with their insurance account in order to be able to file a claim to cover the determined repairs costs.

The repair time range field 610B may include an estimated repair completion time range and a user-selectable "Find a Repair Shop" option. The estimated repair completion time range may be determined by loss assessment server 160 by extracting the completed repair time from the historical loss assessment matrices used in determining the repair cost range for the vehicle. In some instances, the estimated repair completion time may be dependent on the user's selection of a repair shop under the "Find a Repair Shop" option.

The "Find a Repair Shop" option may be a user-selectable option that, when selected, causes loss assessment server 160 to transmit the user's loss assessment profile to repair clearinghouse server 170. Upon receipt of the user's loss assessment profile, repair clearinghouse server 170 may extract geographical location information corresponding to the user and may generate a map through the pre-FNOL loss assessment application operating on mobile device 120 of the user and/or a pre-FNOL loss assessment web application being accessed by an internet browser application operating on mobile device 120. The geographical location associated with the mobile device 120 of the user may be used by repair clearinghouse server 170 to localize the map corresponding to the user's geographical location. Additionally, repair clearinghouse server 170 may render one or more pins on the map corresponding to repair shops in the user's immediate area based on the user's geographical location. Each of the pins associated with a particular repair shop may be a user-selectable pin. Once selected, repair clearinghouse server 170 may generate a repair shop specific screen on the pre-FNOL loss assessment application and/or the pre-FNOL loss assessment web application. The repair shop specific screen may provide data about the repair shop such as an address, telephone number, pictures of the repair shop, pictures of repair shop employees, types of services performed by the repair shop, and the like. Furthermore, the repair shop specific screen may display a rating and comment section wherein patrons of the repair shop may provide feedback and a repair shop availability schedule. Through the repair shop availability schedule, a user may be able to see the repair shop's availability, forecast a repair completion time for the type of repairs needed, and schedule a repair with the repair shop.

In some instances, the "Find a Repair Shop" option may be a user-selectable option that, when selected, causes repair clearinghouse server 170 to generate a sortable list through the pre-FNOL loss assessment application operating on mobile device 120 of the user and/or a pre-FNOL loss assessment web application being accessed by an internet browser application operating on mobile device 120. The sortable list may display each of the repair shops within the geographical location associated with the mobile device 120 of the user, starting with the nearest repair shop to the geographical location associated with the mobile device 120 and terminating with the repair shop furthest from the geographical location associated with the mobile device 120. The user of mobile device 120 may be able to sort the repair shop data comprised within the sortable list based on factors such as highest repair ranking, nearest location, repair color availability, and the like. In some instances, the user may be able to toggle between the map interface and the sortable list interface.

The premium impact range field 610C may include insurance policy update information that a user may expect responsive to filing a claim to cover the determined repair costs. In particular, the premium impact field 610C may include the user's current six month total premium cost and the expected rate increase range of the insurance premium. The calculation of the expected rate increase range of the insurance premium may depend on whether or not the user previously provided login information associated with an insurance policy account of the user. For example, in the event that the user has not previously provided insurance account login information to pre-FNOL system 140, the user may be able and/or required to provide login information associated with an insurance account covering the damaged vehicle in order to receive the premium increase range calculations. Alternatively, the user may be able to enter their current six month premium cost information into field 610C and loss assessment server 160 may be able to calculate the six month premium changes based on the user entered six month premium cost information.

Additionally, in the premium impact field 610C, there may be a selectable "Learn More" option that the user may be able to select in order to receive detailed information regarding the cost increases to the user's insurance premium. After user selection of the "Learn More" option, loss assessment server 160 may provide the user with detailed information about the user's insurance policy and the cost increases to the user's insurance premium. In some instances, loss assessment server 160 may provide the contact information of the user's insurance agent so that the user may discuss cost increases to the user's insurance premium associated with filing a claim.

At the bottom of loss assessment completion screen 610 there may be a "Save for Later" user-selectable button 610D and a "File a Claim" user-selectable button 610E. Responsive to a user selection of the "Save for Later" button 610D, loss assessment server 160 store the information shown in fields 610A, 610B, and 610C for later review by the user. Additionally, loss assessment server 160 may indicate a time period in which the captured repair cost information and accompanying insurance policy change information will be held. The loss assessment server 160 may further indicate to the user that after expiration of the time period, the captured repair cost information and accompanying insurance policy change information may change. At step 408, responsive to a user selection of the "File a Claim" button 610E, loss assessment server 160 may redirect the user detailed damage description screen 508 of FIG. 5B and require the user to enter detailed information about the damages to the user's vehicle.

Figure 7:
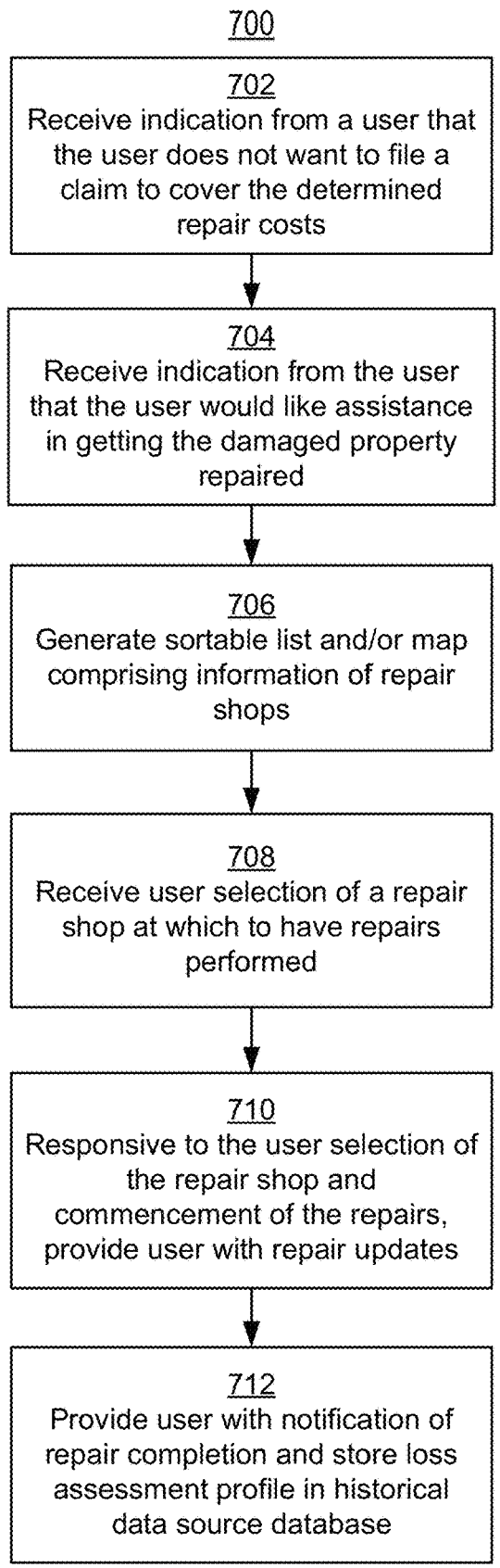
FIG. 7 depicts a flow chart for a pre-FNOL online advisor method according to one or more aspects of the present disclosure.

In some instances, each of loss assessment completion screens 510, as shown in FIG. 5C, and 610, as shown in FIG. 6B, may further include a "Do Not File Claim" user-selectable button. FIG. 7 describes a pre-FNOL online advisor method performed by pre-FNOL system 140 responsive to receiving a user selection of the "Do Not File Claim" button.

At step 702, responsive to a user selection of the "Do Not File Claim" button, loss assessment server 160 may provide a pop-up screen on either of loss assessment completion screens 510 and 610. The pop-up screen may include a prompt inquiring whether or not the user would like assistance in facilitating repair of the damages to the vehicle. Additionally, the pop-up screen may include "Yes," "No," and "Save for Later" user-selectable buttons. In instances in which the user selects the "Save for Later" button, loss assessment server 160 may perform processes similar to those described above in regards to a user selection of either "Save for Later" buttons 510D or 610D. In instances in which the user selects the "No" button, loss assessment server 160 may save the user's loss assessment profile and transmit the user's loss assessment profile to historical data source server 150. Upon receipt, historical data source server 150 may store the user's loss assessment profile in historical data source database 152. Thus, the loss assessment profile created during the pre-FNOL loss assessment method may be used as a historical loss assessment profile by pre-FNOL system 140 in a manner similar to that of the historical loss assessment profiles described above.

At step 704, loss assessment server 160 may receive a user selection of the "Yes" button and may proceed to step 706. Responsive to a user selection of the "Yes" button, loss assessment server 160 may transmit the loss assessment profile associated with the user to repair clearinghouse server 170. At step 706, upon receipt of the user's loss assessment profile, repair clearinghouse server 170 may extract geographical location data associated with the user from the user's loss assessment profile and may generate a map and/or sortable list of repair shops corresponding to the geographical location of the user through the pre-FNOL loss assessment application operating on mobile device 120 of the user and/or a pre-FNOL loss assessment web application being accessed by an internet browser application operating on mobile device 120. The geographical location associated with the mobile device 120 of the user may be used by repair clearinghouse server 170 to localize the map and/or sortable corresponding to the user's geographical location. Additionally, repair clearinghouse server 170 may render one or more pins on the map corresponding to repair shops in the user's immediate area based on the user's geographical location. Each of the pins associated with a particular repair shop may be a user-selectable pin. Once selected, repair clearinghouse server 170 may generate a repair shop specific screen on the pre-FNOL loss assessment application and/or the pre-FNOL loss assessment web application. The repair shop specific screen may provide data about the repair shop such as an address, telephone number, pictures of the repair shop, pictures of repair shop employees, types of services performed by the repair shop, and the like. Furthermore, the repair shop specific screen may display a rating and comment section wherein patrons of the repair shop may provide feedback and a repair shop availability schedule. Through the repair shop availability schedule, a user may be able to see the repair shop's availability, forecast a repair completion time for the type of repairs needed, and schedule a repair with the repair shop.

In some instances, each of the repair shops may be required to charge the user no more than the fixed bid amount determined during the high accuracy pre-FNOL loss assessment or the upper-bound bid amount determined during the low accuracy pre-FNOL loss assessment. Accordingly, the user may select a repair shop based on the rating of the repair shop, the location of the repair shop, and/or the type of repairs performed at the repair shop. At step 708, the repair clearinghouse server 170 may receive a user selection of a particular repair shop at which to have the repairs performed. In some instances, the user selection of the repair shop may further entail a time at which to have the repairs performed.

Alternatively, upon receipt of the user's loss assessment profile, repair clearinghouse server 170 may extract geographical location data associated with the user from the user's loss assessment profile and may generate a repair clearinghouse auction block associated with the user and corresponding to the geographical location of the user. In generating the repair clearinghouse auction block, repair clearinghouse server 170 initially request user permission prior to generating the auction block. After receiving the user's permission, repair clearinghouse server 170 may query the user as to a location range in which the auction block will become accessible to repair shops in the geographical vicinity of the user. For example, the query to the user may include a dropdown list including a plurality of radial distances (e.g., 10 miles, 25 miles, 50 miles, etc.) in which repair shops may be able to participate in the auction block. In some instances, the user may also be prompted to provide a zip code and/or address from which the radial distance the radial distance may be marked an a time period in which the auction block will remain open (e.g., 1 day, 3 days, 5 days, etc.).

In response to receiving a radial distance from the user, the repair clearinghouse sever 170 may activate a repair clearinghouse auction block associated with the user in which repair shops inside of the radial distance specified by the user may be able to place repair bids on the cost of repairing the damages to the vehicle of the user. In generating the repair clearinghouse auction block associated with the user, repair clearinghouse server 170 may associate information corresponding to the accident to the user's auction block. For example, the auction block may include vehicle operational data, responses to preliminary questions regarding an accident, user vehicle selection information (or vehicle profile information), detailed damage information (or general damage information) and pictures, and the like. Based on the provided information, repair shops within the user-specified vicinity may be able to place bids corresponding to the cost of repairing the vehicle. In some instances, the repair cost determined by pre-FNOL system 140 through the high accuracy pre-FNOL loss assessment may serve as an upper bound that may not be surpassed in the repair cost bids provided by the repair shops. Similarly, the upper-bound repair cost determined by the pre-FNOL system 140 through the low accuracy pre-FNOL loss assessment may serve as an upper bound that may not be surpasses in the repair cost bids provided by the repair shops.

Repair shops within the user-specified distance may be able to provide repair bids for repairing the damages to the user's vehicle. In some instances, the repair bids may include an itemized list of the repairs to be performed and the corresponding cost of each of the repairs to be performed. The user may be able to view the repair bids provided by the repair shops in real time. In some instances, the user may be required to wait until the specified auction block time period expires before accepting a repair bid. In other instances, the user may be able to terminate the auction block at any time by selecting a repair bid or without selecting a repair bid. Additionally, the user may be able to select from any of the bids placed to reach a repair agreement. For example, in the event that the user receives three bids, the user may be able to select any of the three bids. In response to selecting a bid, the user and the repair shop may enter into a contractual agreement for repairs and the repair costs specified by the selected bid.

After the user selection of a repair shop at which to have the repairs performed, in some instances, repair clearinghouse server 170 may generate a user provide the user with a sortable list and/or map of tow truck companies proximate to the geographical location associated with the mobile device 120 of the user. The presentation of the sortable list and/or map of tow truck companies and the functionality related therein may be similar to that described above in regards to the repair shops. Furthermore, repair clearinghouse sever 170 may also provide the user with a sortable list and/or map of rental car agencies proximate to the user's geographical location. In some instances, the repair clearinghouse server 170 may enable the user to populate the sortable list and/or map with both rental car agencies and tow truck companies proximate to the user. The presentation of the sortable list and/or map of rental car agencies and the functionality related therein may be similar to that described above in regards to the user selection of the repair shops.

In either instance, at step 710, responsive to the user selection of a repair shop and commencement of repairs at the repair shop, repair clearinghouse server 170 may provide periodic notifications to the user through the pre-FNOL loss assessment application operating on mobile device 120 of the user and/or a pre-FNOL loss assessment web application being accessed by an internet browser application operating on mobile device 120. The notifications may comprise a repair progress bar, a list of repairs completed, a list of upcoming repairs, and a time associated with the upcoming repairs.

At step 712, upon completion of the repairs to the user's vehicle, repair clearinghouse server 170 may provide a notification to the user that the repairs have been completed. Additionally, repair clearinghouse server 170 may update the loss assessment profile of the user with the finalized repairs performed on the vehicle, the time taken to perform the repairs, and the costs associated with the repairs. After updating the loss assessment profile, repair clearinghouse server 170 may transmit the updated loss assessment profile to historical data source server 150. Upon receipt of the loss assessment profile, historical data source server 150 may store the loss assessment profile in historical data source database 154 and the loss assessment profile may serve as a historical loss assessment profile in the manner described herein.

Figure 10:
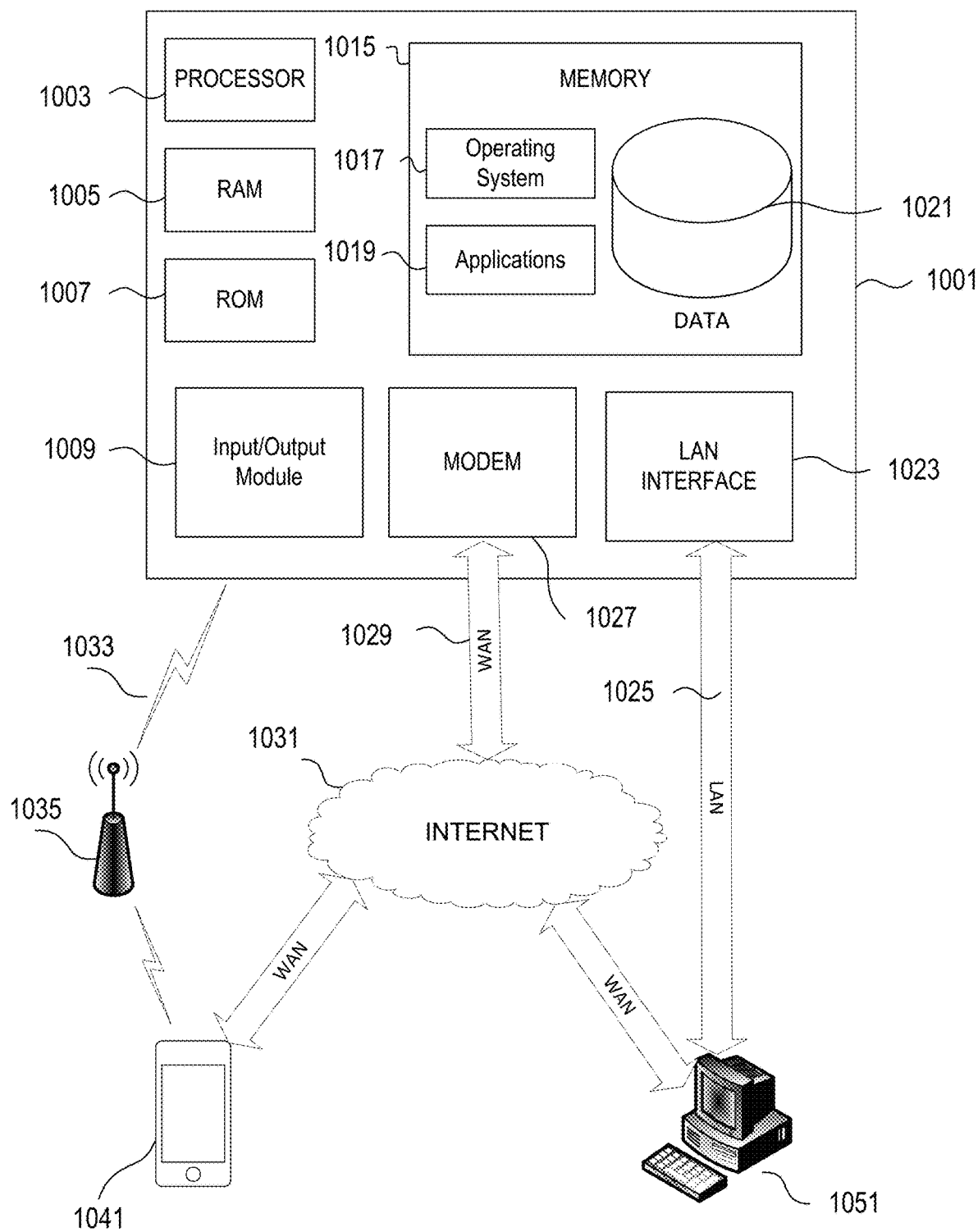
FIG. 10 depicts an illustrative operating environment in which various aspects of the present disclosure may be implemented.

FIG. 10 illustrates a block diagram of a computing device 1001 in a pre-FNOL loss assessment system 1000 that may be used according to one or more illustrative embodiments of the disclosure. The computing device 1001 may have a processor 1003 for controlling overall operation of the computing device 1001 and its associated components, including RAM 1005, ROM 1007, input/output module 1009, and memory unit 1015. The computing device 1001, along with one or more additional devices (e.g., terminals 1041, 1051) may correspond to any of multiple systems or devices, such as close call detection devices or systems, configured as described herein for receiving data from various sources, populating a rolling short term logical table with the received data, and eliciting a particular vehicular response based on the populated data items exceeding near short term (e.g., five seconds to five minutes) association thresholds.

Input/Output (I/O) module 1009 may include a microphone, keypad, touch screen, and/or stylus through which a user of the computing device 1001 may provide input, and may also include one or more of a speaker for providing audio input/output and a video display device for providing textual, audiovisual and/or graphical output. Software may be stored within memory unit 1015 and/or other storage to provide instructions to processor 1003 for enabling device 1001 to perform various functions. For example, memory unit 1015 may store software used by the device 1001, such as an operating system 1017, application programs 1019, and an associated internal database 1021. The memory unit 1015 includes one or more of volatile and/or non-volatile computer memory to store computer-executable instructions, data, and/or other information. Processor 1003 and its associated components may allow the computing device 1001 to execute a series of computer-readable instructions to perform the pre-FNOL loss assessment and online advisor methods described herein.

The computing device 1001 may operate in a networked environment 1000 supporting connections to one or more remote computers, such as terminals/devices 1041 and 1051. Close call detection device 1001, and related terminals/devices 1041 and 1051, may include devices installed in vehicles, mobile devices that may travel within vehicles, or devices outside of vehicles that are configured to receive and process vehicle and other sensor data. Thus, the computing device 1001 and terminals/devices 1041 and 1051 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 1001. The network connections depicted in FIG. 10 include a local area network (LAN) 1025 and a wide area network (WAN) 1029, and a wireless telecommunications network 1033, but may also include other networks. When used in a LAN networking environment, the computing device 1001 may be connected to the LAN 1025 through a network interface or adapter 1023. When used in a WAN networking environment, the device 1001 may include a modem 1027 or other means for establishing communications over the WAN 1029, such as network 1031 (e.g., the Internet). When used in a wireless telecommunications network 1033, the device 1001 may include one or more transceivers, digital signal processors, and additional circuitry and software for communicating with wireless computing devices 1041 (e.g., mobile phones, short-range vehicle communication systems, vehicle sensing and telematics devices) via one or more network devices 1035 (e.g., base transceiver stations) in the wireless network 1033.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and multi-dimensional risk score generation system components described herein may be configured to communicate using any of these network protocols or technologies.

Additionally, one or more application programs 1019 used by the computing device 1001 may include computer executable instructions for receiving data and performing other related functions as described herein.

As will be appreciated by one of skill in the art, the various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:

detecting, by a first computing device and based on vehicle operation sensor data received from a mobile device located in a vehicle during an accident, that the vehicle has been involved in the accident;

transmitting, to the mobile device, instructions prompting for responses to one or more questions regarding:

a macro area of the vehicle damaged in the accident, and a micro area, within the macro area, of the vehicle damaged in the accident;

in response to receiving the responses to the one or more questions:

activating a camera of the mobile device; and generating, on a display of the mobile device and based on the responses to the one or more questions, a semi-translucent overlay corresponding to the micro area of the vehicle damaged in the accident;

causing the mobile device to capture, with the activated camera, one or more pictures of the vehicle damaged in the accident and corresponding to the semi-translucent overlay;

discarding image data outside of an outer boundary of the semi-translucent overlay corresponding to the micro area of the vehicle damaged in the accident;

calculating, based on the received vehicle operation sensor data, based on the responses to the one or more questions, and based on the one or more pictures of the micro area of the vehicle damaged in the accident, repair costs for the vehicle damaged in the accident and expected insurance policy premium changes if an insurance claim is filed to cover the calculated repair costs;

receiving, from the mobile device, a request to file the insurance claim to cover the calculated repair costs; and responsive to receiving the request to file the insurance claim, electronically depositing, into a payment account associated with a driver of the vehicle damaged in the accident, a payment corresponding to the calculated repair costs for the vehicle damaged in the accident.

2. The method of claim 1, wherein causing the mobile device to capture the one or more pictures of the micro area of the vehicle damaged in the accident comprises causing the mobile device to capture image data corresponding to an entire area of the display of the mobile device,
   wherein discarding the image data outside of the semi-translucent overlay corresponding to the micro area of the vehicle damaged in the accident comprises discarding portions of the macro area of the vehicle not included in the micro area, and
   wherein the method further comprises storing remaining, non-discarded image data, wherein the stored image data is smaller in size than the captured image data.

3. The method of claim 1, further comprising:
   generating a rendering of the vehicle damaged in the accident;
   orienting the rendering based on responses to the one or more questions regarding the macro area of the vehicle damaged in the accident; and
   marking the rendering based on responses to the one or more questions regarding the micro area, within the macro area, of the vehicle damaged in the accident.

4. The method of claim 3, wherein the marking the rendering includes at least one of:
   highlighting the rendering based on the responses to the one or more questions regarding the micro area, within the macro area, of the vehicle damaged in the accident, and
   labeling the rendering based on the responses to the one or more questions regarding the micro area, within the macro area, of the vehicle damaged in the accident.

5. The method of claim 1, further comprising:
   receiving the vehicle operation sensor data from one or more sensors of the mobile device, wherein the one or more sensors collect the vehicle operation sensor data during the accident.

6. The method of claim 1, further comprising:
   providing, to emergency personnel, an alert that the accident has occurred, wherein the alert includes the vehicle operation sensor data.

7. The method of claim 1, further comprising responsive to receiving the request to file the insurance claim, further applying the expected insurance policy premium changes to an insurance policy associated with the driver of the vehicle.

8. The method of claim 1, wherein the macro area of the vehicle comprises a driver side of the vehicle, a passenger side of the vehicle, a front of the vehicle, or a rear of the vehicle, and
   wherein the micro area of the vehicle comprises a tire, a door, a tire well, a headlight, hood, a bumper, a windshield, or a taillight.

9. The method of claim 1, further comprising:
   comparing the one or more pictures of the micro area of the vehicle to one or more stored images; and
   providing, to the mobile device and based on determining that the one or more pictures of the micro area of the vehicle do not correspond to any of the one or more stored images, a notification to re-capture an image of the micro area of the vehicle damaged in the accident.

10. An apparatus comprising:
    a processor; and
    memory storing computer-readable instructions that, when executed by the processor, cause the apparatus to:
       detect, based on vehicle operation sensor data received from a mobile device located in a vehicle during an accident, that the vehicle has been involved in the accident;
       transmit, to the mobile device, instructions prompting for responses to one or more questions regarding:
          a macro area of the vehicle damaged in the accident, and
          a micro area, within the macro area, of the vehicle damaged in the accident;
       in response to receiving the responses to the one or more questions:
          activate a camera of the mobile device; and
          generate, on a display of the mobile device and based on the responses to the one or more questions, a semi-translucent overlay corresponding to the micro area of the vehicle damaged in the accident;
       cause the mobile device to capture, with the activated camera, one or more pictures of the vehicle damaged in the accident and corresponding to the semi-translucent overlay;
       discard image data outside of an outer boundary of the semi-translucent overlay corresponding to the micro area of the vehicle damaged in the accident;
       calculate, based on the received vehicle operation sensor data, based on the responses to the one or more questions, and based on the one or more pictures of the micro area of the vehicle damaged in the accident, repair costs for the vehicle damaged in the accident and expected insurance policy premium changes if an insurance claim is filed to cover the calculated repair costs;
       receive, from the mobile device, a request to file the insurance claim to cover the calculated repair costs; and
       responsive to receiving the request to file the insurance claim, electronically deposit, into a payment account associated with a driver of the vehicle damaged in the accident, a payment corresponding to the calculated repair costs for the vehicle damaged in the accident.

11. The apparatus of claim 10, wherein memory stores further computer-readable instructions that, when executed by the processor, cause the apparatus to:
    generate, on the display of the mobile device and based on responses to the one or more questions regarding the macro area of the vehicle damaged in the accident, a second semi-translucent overlay corresponding to the macro area of the vehicle damaged in the accident; and
    cause capturing, with the activated camera, of one or more pictures of the macro area of the vehicle damaged in the accident, wherein an outer boundary of the one or more pictures of the macro area of the vehicle damaged in the accident traces the second semi-translucent overlay.

12. The apparatus of claim 10, wherein the memory stores further computer-readable instructions that, when executed by the processor, cause the apparatus to:
    generate a rendering of the vehicle damaged in the accident;
    orient the rendering based on responses to the one or more questions regarding the macro area of the vehicle damaged in the accident; and
    mark the rendering based on responses to the one or more questions regarding the micro area, within the macro area, of the vehicle damaged in the accident.

13. The apparatus of claim 12, wherein the marking the rendering includes at least one of:
highlighting the rendering based on the responses to the one or more questions regarding the micro area, within the macro area, of the vehicle damaged in the accident, and
labeling the rendering based on the responses to the one or more questions regarding the micro area, within the macro area, of the vehicle damaged in the accident.

14. The apparatus of claim 10, wherein the memory stores further computer-readable instructions that, when executed by the processor, cause the apparatus to:
receive the vehicle operation sensor data from one or more sensors of the mobile device; and
receive additional vehicle operation sensor data from one or more sensors associated with the vehicle or one or more sensors associated with a telematics device associated with the vehicle.

15. The apparatus of claim 10, wherein the memory stores further computer-readable instructions that, when executed by the processor, cause the apparatus to:
provide, to emergency personnel, an alert that the accident has occurred, wherein the alert includes the vehicle operation sensor data.

16. The apparatus of claim 10, wherein the vehicle operation sensor data includes at least an indication of airbag deployment.

17. A system, comprising:
a mobile device configured to transmit vehicle operation sensor data, wherein the mobile device is located in a vehicle during an accident; and
a computing device comprising:
at least one processor; and
at least one memory storing computer-readable instructions that, when executed by the at least one processor, cause the computing device to:
detect, based on the vehicle operation sensor data received from the mobile device located in the vehicle during the accident, that the vehicle has been involved in the accident;
transmit, to the mobile device, instructions prompting for responses to one or more questions regarding:
a macro area of the vehicle damaged the accident, and
a micro area, within the macro area, of the vehicle damaged in the accident;
in response to receiving the responses to the one or more questions:
activate a camera of the mobile device; and
generate, on a display of the mobile device and based on the responses to the one or more questions, a semi-translucent overlay corresponding to the micro area of the vehicle damaged in the accident;
cause the mobile device to capture, with the activated camera, one or more pictures of the vehicle damaged in the accident and corresponding to the semi-translucent overlay;
discard image data outside of an outer boundary of the semi-translucent overlay corresponding to the micro area of the vehicle damaged in the accident;
calculate, based on the received vehicle operation sensor data, based on the responses to the one or more questions, and based on the one or more pictures of the micro area of the vehicle damaged in the accident, repair costs for the vehicle damaged in the accident and expected insurance policy premium changes if an insurance claim is filed to cover the calculated repair costs;
receive, from the mobile device, a request to file the insurance claim to cover the calculated repair costs; and
responsive to receiving the request to file the insurance claim, electronically deposit, into a payment account associated with a driver of the vehicle damaged in the accident, a payment corresponding to the calculated repair costs for the vehicle.

18. The system of claim 17, wherein the memory stores further computer-readable instructions that, when executed by the at least one processor, cause the computing device to:
cause the mobile device to capture the one or more pictures the vehicle damaged in the accident by causing the mobile device to capture image data corresponding to an entire area of the display of the mobile device;
discard the image data outside of the semi-translucent overlay corresponding to the micro area of the vehicle damaged in the accident by discarding portions of the macro area of the vehicle not included in the micro area; and
store remaining, non-discarded image data, wherein the stored image data is smaller in size than the captured image data.

19. The system of claim 17, wherein the at least one memory stores further computer-readable instructions that, when executed by the at least one processor, cause the computing device to:
generate a rendering of the vehicle damaged in the accident;
orient the rendering based on responses to the one or more questions regarding the macro area of the vehicle damaged in the accident; and
mark the rendering based on responses to the one or more questions regarding the micro area, within the macro area, of the vehicle damaged in the accident.

20. The system of claim 17, wherein the at least one memory stores further computer-readable instructions that, when executed by the at least one processor, cause the computing device to:
receive the vehicle operation sensor data from one or more sensors of the mobile device, wherein the vehicle operation sensor data includes at least an indication of airbag deployment; and
receive additional vehicle operation sensor data from one or more sensors associated with the vehicle or one or more sensors associated with a telematics device associated with the vehicle.

* * * * *